US011912545B2

(12) United States Patent
Post et al.

(10) Patent No.: US 11,912,545 B2
(45) Date of Patent: Feb. 27, 2024

(54) WIRELESS HOIST SYSTEM

(71) Applicant: MILWAUKEE ELECTRIC TOOL CORPORATION, Brookfield, WI (US)

(72) Inventors: Matthew Post, Milwaukee, WI (US); Gareth Mueckl, Milwaukee, WI (US); Matthew N. Thurin, Wauwatosa, WI (US); Joshua D. Widder, Racine, WI (US); Timothy J. Bartlett, Waukesha, WI (US); Patrick D. Gallagher, Oak Creek, WI (US); Jarrod P. Kotes, Grafton, WI (US); Karly M. Schober, Milwaukee, WI (US); Kenneth W. Wolf, Muskego, WI (US); Terry L. Timmons, Oconomowoc, WI (US); Mallory L. Marksteiner, Naperville, IL (US); Jonathan L. Lambert, Milwaukee, WI (US); Ryan A. Spiering, Milwaukee, WI (US); Jeremy R. Ebner, East Troy, WI (US); Benjamin A. Smith, Milwaukee, WI (US); James Wekwert, Wauwatosa, WI (US); Brandon L. Yahr, Slinger, WI (US); Troy C. Thorson, Cedarburg, WI (US); Connor P. Sprague, Milwaukee, WI (US); John E. Koller, Brookfield, WI (US); Evan M. Glanzer, Milwaukee, WI (US); John S. Scott, Brookfield, WI (US); William F. Chapman, III, Delavan, WI (US); Timothy R. Obermann, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 356 days.

(21) Appl. No.: 17/051,643

(22) PCT Filed: Jun. 26, 2020

(86) PCT No.: PCT/US2020/039908

§ 371 (c)(1),
(2) Date: Oct. 29, 2020

(87) PCT Pub. No.: WO2020/264359

PCT Pub. Date: Dec. 30, 2020

(65) Prior Publication Data

US 2022/0185639 A1 Jun. 16, 2022

Related U.S. Application Data

(60) Provisional application No. 62/965,676, filed on Jan. 24, 2020, provisional application No. 62/951,394,
(Continued)

(51) Int. Cl.
*B66D 3/00* (2006.01)
*B66D 3/26* (2006.01)
*B66C 13/40* (2006.01)

(52) U.S. Cl.
CPC ................ *B66D 3/26* (2013.01); *B66C 13/40* (2013.01); *B66D 2700/02* (2013.01)

(58) Field of Classification Search
CPC ... B66D 3/26; B66D 3/18; B66D 3/24; B66D 1/14; B66D 1/20; B66D 1/26; B66D 1/48;
(Continued)

(56) References Cited

U.S. PATENT DOCUMENTS 8,195,368 B1 * 6/2012 Leban ..................... B63B 27/10 212/277
9,630,810 B1 4/2017 Kinser, Jr.
(Continued)

FOREIGN PATENT DOCUMENTS

DE 3147158 A1 6/1983
JP H08324958 A 12/1996
(Continued)

OTHER PUBLICATIONS

International Search Report and Written Opinion for Application No. PCT/US2020/039908 dated Oct. 22, 2020 (16 pages).
(Continued)

*Primary Examiner* — Emmanuel M Marcelo
(74) *Attorney, Agent, or Firm* — Michael Best & Friedrich LLP

(57) ABSTRACT

A wireless hoist system including a first hoist device having a first motor and a first wireless transceiver and a second hoist device having a second motor and a second wireless transceiver. The wireless hoist system includes a controller
(Continued)

in wireless communication with the first wireless transceiver and the second wireless. The controller is configured to receive a user input and determine a first operation parameter and a second operation parameter based on the user input. The controller is also configured to provide, wirelessly, a first control signal indicative of the first operation parameter to the first hoist device and provide, wirelessly, a second control signal indicative of the second operation parameter to the second hoist device. The first hoist device operates based on the first control signal and the second hoist device operates based on the second control signal.

19 Claims, 55 Drawing Sheets

Related U.S. Application Data filed on Dec. 20, 2019, provisional application No. 62/868,297, filed on Jun. 28, 2019.

(58) Field of Classification Search
CPC . B66D 1/485; B66D 1/56; B66D 5/02; B66D 5/30; B66D 2700/02
See application file for complete search history.

(56) References Cited

U.S. PATENT DOCUMENTS

| | | | |
|---|---|---|---|
| 2005/0179020 | A1 | 8/2005 | Taylor et al. |
| 2006/0102578 | A1 | 5/2006 | Zakula, Sr. et al. |
| 2014/0251935 | A1 | 9/2014 | Behnke |
| 2018/0346294 | A1 | 12/2018 | Shely et al. |
| 2019/0041821 | A1 | 2/2019 | Stagg et al. |

FOREIGN PATENT DOCUMENTS

| | | | | |
|---|---|---|---|---|
| WO | WO-0214202 | A1 * | 2/2002 | ........... B65G 63/002 |
| WO | WO-2015173773 | A2 * | 11/2015 | ......... G05B 19/0426 |
| WO | 2016153814 | A1 | 9/2016 | |
| WO | WO-2017072051 | A1 * | 5/2017 | ............. B66C 13/08 |

OTHER PUBLICATIONS

Partial Supplementary European Search Report for Application No. 20830553.2 dated Aug. 8, 2023 (19 pages).
Konecranes, "Crane Radio Control," brochure @ 2013 (12 pages).
Extended European Search Report for Application No. 20830553.2 dated Nov. 20, 2023 (16 pages).

* cited by examiner

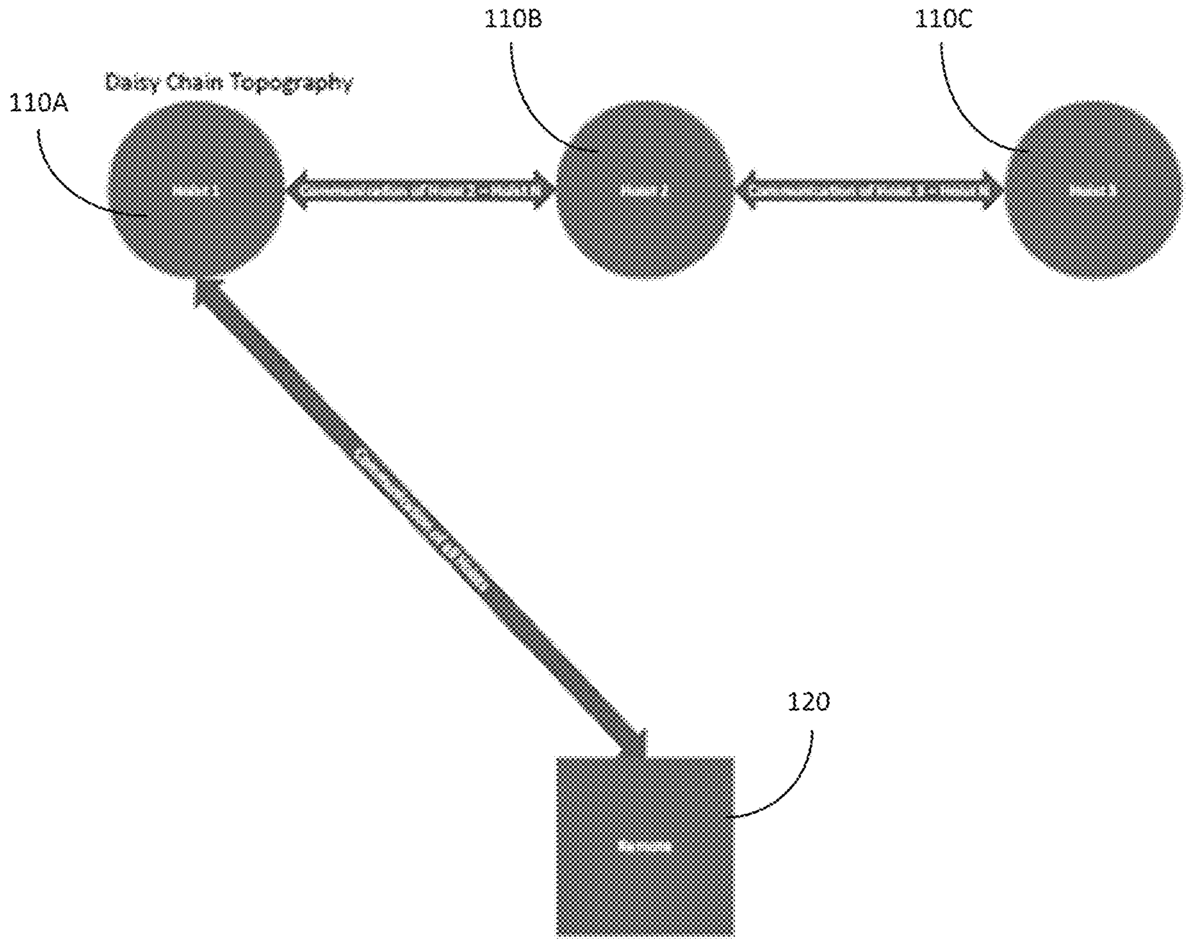
*FIG. 28B*
Broadcast Packet Example:
| | | | | |
|---|---|---|---|---|
| Identifier | Command | Timestamp | Padding | Checksum |
Service Packet Example from Hoist
| | | | | |
|---|---|---|---|---|
| Identifier | Distance of Hoist | Operation in Progress | Statuses | Checksum |
*FIG. 28C*
Pairing Process
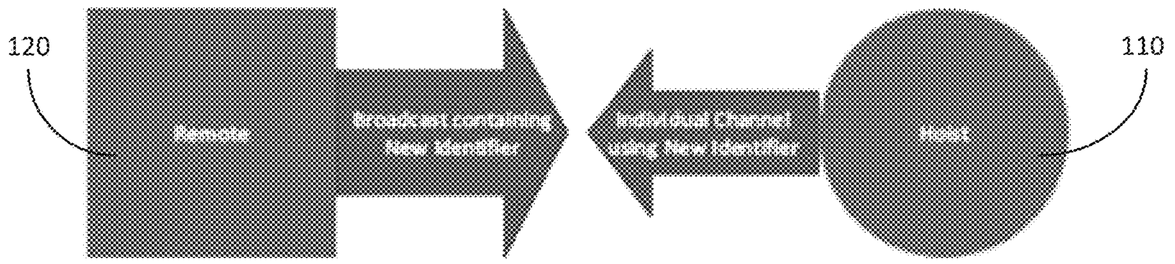
*FIG. 28D*

WIRELESS HOIST SYSTEM

CROSS-REFERENCE TO RELATED APPLICATIONS

This application is a national phase filing under 35 U.S.C. § 371 of International Application No. PCT/US2020/039908, filed Jun. 26, 2020, which claims priority to U.S. Provisional Patent No. 62/868,297, filed Jun. 28, 2019, U.S. Provisional Patent No. 62/951,394, filed Dec. 20, 2019, and U.S. Provisional Patent No. 62/965,676, filed Jan. 24, 2020, the entire contents of all of which are incorporated by reference herein.

FIELD

This application relates to a wireless hoist system and is directed to wirelessly controlling hoist devices for moving workpieces as well as other hoist systems.

BACKGROUND

Hoist devices are used for lifting or lowering workpieces. The hoist devices may be manually operated, electrically or pneumatically driven, and may use chain or chain rope to move the workpieces.

SUMMARY

For complex movements, precise placements, or moving complex objects (for example, in terms of weight distribution and shape), two or more hoist devices can be used to move the workpiece from one location to another location. The hoist devices may be moved in a coordinated manner by multiple users to ensure that the workpiece is not damaged. However, without communication between the hoist devices, the hoist systems are prone to user error in coordinating the hoist devices.

One embodiment provides a wireless hoist system including a first hoist device having a first motor and a first wireless transceiver and a second hoist device having a second motor and a second wireless transceiver. The first hoist device and the second hoist device are configured to be coupled to a workpiece to raise or lower the workpiece. The wireless hoist system also includes a controller in wireless communication with the first wireless transceiver of the first hoist device and the second wireless transceiver of the second hoist device. The controller is configured to receive user input and determine a first operation parameter and a second operation parameter based on the user input. The controller is also configured to provide, wirelessly, a first control signal indicative of the first operation parameter to the first hoist device and provide, wirelessly, a second control signal indicative of the second operation parameter to the second hoist device. The first hoist device operates based on the first control signal and the second hoist device operates based on the second control signal.

In some examples, the controller communicates with the first hoist device over a first wireless channel and wherein the controller communicates with the second hoist device over a second wireless channel.

In some examples, the system further comprises a third hoist device, and the first hoist device is further configured to: determine a third operation parameter based on the first operation parameter; and provide a third control signal indicative of the third operation parameter to the third hoist device, wherein the third hoist device operates based on the third control signal.

In some examples, the controller communicates with the first hoist device over a first wireless channel, and the first hoist device communicates with the third hoist device over a second wireless channel.

In some examples, the first hoist device further comprises: a chain connectable to the workpiece to raise and lower the workpiece, the first motor coupled to the chain to release and retract the chain; a sensor for detecting a chain length of the chain indicative of a length of chain released from the first hoist device; and a motor drive coupled to the sensor and the motor and configured to: receive the chain length from the sensor; receive the first control signal from the controller; and drive the motor based on the first control signal and the chain length.

In some examples, the motor drive is further configured to: receive a level input from a level, the level placed on the workpiece and the level input indicating an angle of the level with respect to ground, wherein driving the motor is further based on the level input.

In some examples, the controller is further configured to: receive a level input from a level, the level placed on the workpiece and the level input indicating an angle of the level with respect to ground, wherein determining the first control signal and the second control signal are further based on the level input.

In some examples, the first operation parameter includes one or more selected from a group consisting of: speed, direction, and chain length.

In some examples, the user input is a desired movement of the workpiece.

In some examples, the user input includes a position of the first hoist device, a position of the second hoist device, and a desired end position of the workpiece.

Another embodiment provides a wireless hoist system including a first hoist device having a first motor and a first wireless transceiver and a second hoist device having a second motor and a second wireless transceiver. The first hoist device and the second hoist device are configured to be coupled to a workpiece to raise or lower the workpiece. The wireless hoist system also includes a controller in wireless communication with the first wireless transceiver of the first hoist device and the second wireless transceiver of the second hoist device. The controller is configured to receive user input and determine a first operation parameter based on the user input. The controller is also configured to provide, wirelessly, a first control signal indicative of the first operation parameter to the first hoist device and provide, wirelessly, a second control signal indicative of the first operation parameter to the second hoist device. The first hoist device operates based on the first control signal and the second hoist device operates based on the second control signal.

In some examples, the first control signal is provided to the first hoist device in response to determining that a first channel associated with the first hoist device is enabled, and the second control signal is provided to the second hoist device in response to determining that a second channel associated with the second hoist device is enabled.

In some examples, the system further comprises a third hoist device including a third motor and a third wireless transceiver, and the third hoist device is associated with a third channel. Further, the controller, in response to determining that the third channel is disabled, does not provide a control signal indicative of the first operation parameter to the third hoist device.

Another embodiment provides a wireless hoist system including a first hoist device having a first motor and a first wireless transceiver. The first hoist device is configured to be coupled to a workpiece to raise or lower the workpiece. The wireless hoist system also includes a level configured to be placed on the workpiece, to sense an angle of the level with respect to gravitational pull when the level is on the workpiece and to wirelessly output a level signal indicative of the angle. The wireless hoist system further includes a controller in wireless communication with the first wireless transceiver of the first hoist device and the level. The controller is configured to receive user input and determine a first operation parameter based on the user input. The controller is also configured to receive the level signal and provide, wirelessly to the first hoist device, a first control signal that is based on the first operation parameter and the level signal. The first hoist device operates based on the first control signal.

In some examples, the system further comprises a second hoist device including a second motor and a second wireless transceiver, and the second hoist device is configured to be coupled to the workpiece to raise or lower the workpiece. Further, the controller is configured to: determine a second operation parameter based on the user input, and provide, wirelessly to the second hoist device, a second control signal that is based on the second operation parameter and the level signal. Further, the second hoist device operates based on the second control signal.

Another embodiment provides a wireless hoist system including a first hoist device having a first motor and a first wireless transceiver and a second hoist device having a second motor and a second wireless transceiver. The second wireless transceiver is in wireless communication with the first wireless transceiver and the first hoist device and the second hoist device are configured to be coupled to a workpiece to raise or lower the workpiece. The wireless hoist system also includes a controller in wireless communication with the first wireless transceiver of the first hoist device. The controller is configured to receive user input and determine a first operation parameter based on the user input. The controller is also configured to provide, wirelessly, a first control signal indicative of the first operation parameter to the first hoist device. The first hoist device is configured to provide, wirelessly, a second control signal to the second hoist device and the second control signal is based on the first control signal. The first hoist device operates based on the first control signal and the second hoist device operates based on the second control signal.

In some examples, the first wireless transceiver, the second wireless transceiver, and the controller communicate via an RF communication protocol. The RF communication protocol uses dual identifiers, one broadcast from the controller, and an individual identifier for each of the first wireless transceiver and the second wireless transceiver.

In some examples, the RF communication protocol initiates a pairing between the controller and the first wireless transceiver. The pairing includes broadcasting a first pairing signal from the controller to the first wireless transceiver, wherein the first pairing signal includes an identifier of the controller, and storing, at the first wireless transceiver, the identifier of the controller. The pairing also includes transmitting, by the first wireless transceiver in response to receiving the pairing signal, an identifier of the first wireless transceiver, storing at the controller the identifier of the first wireless transceiver, and generating a paired identifier including at least the identifier of the controller and the identifier of the first wireless transceiver for performing future communications between the controller and the first wireless transceiver.

In some examples, the RF communication protocol initiates a pairing between the controller and the second wireless transceiver. The pairing includes broadcasting a second pairing signal from the controller to the second wireless transceiver, wherein the second pairing signal includes an identifier of the controller, and storing, at the second wireless transceiver, the identifier of the controller. The pairing also includes transmitting, by the second wireless transceiver in response to receiving the pairing signal, an identifier of the second wireless transceiver, storing at the controller the identifier of the second wireless transceiver, and generating a paired identifier including at least the identifier of the controller and the identifier of the second wireless transceiver for performing future communications between the controller and the second wireless transceiver.

Another embodiment includes a hoist device having a power source, a motor having an output shaft, a transmission coupled to the output shaft, and a controller configured to control an operation of the motor. The transmission is configured to interface with a chain, and to transfer rotational motion of the output shaft of the motor to the chain to one of release or retract the chain. The hoist device is configured to one of raise and lower a workpiece coupled to the chain based on a user command signal received at the controller In some examples, the hoist device also includes a limit sensor configured to detect an end of the chain. The limit sensor is further configured to provide an input to the controller to stop the motor in response to detecting the end of the chain.

In some examples, the limit sensor is one or more of a mechanical limit switch, a hall sensor, a time-of-flight sensor, a chain speed sensor, an ultrasonic pulse transceiver, and a distance run sensor.

In some examples, the limit sensor is configured to detect a change in the size of one or more links in the chain indicating the end of the chain.

In some examples, the limit sensor is configured to detect a change in the color of one or more links in the chain indicating the end of the chain.

In some examples, the limit sensor is a mechanical limit switch configured to be actuated by a feature of the chain used to indicate the end of the chain.

In some examples, the hoist device includes a wireless transceiver and a remote controller in communication with the wireless transceiver.

In some examples, the controller is configured to determine a distance between the hoist device and the remote controller using a distance determination protocol. The distance determination protocol includes receiving, from the remote controller, a data packet including a sent time message, determining a receive time at the data packet using the controller, and determining a distance between the remote controller and the hoist device. The distance is determined based on the speed of the transmission and the difference between the receive time and the sent time.

In some examples, a first internal clock of the remote controller and a second internal clock of the controller are synchronized.

In some examples, the remote controller includes a display device configured to display one or more parameters associated with the hoist device.

In some examples, the parameters include one or more of an overload condition, an ability to complete lift condition, a system health, an individual hoist battery charge level, a remote battery charge level, a secured load indication, and a distance between the hoist device and the remote controller.

In some examples, the remote controller further includes an input to provide a variable speed input to the controller for controlling a speed of the motor.

In some examples, the controller is additionally configured to determine a magnitude of a load associated with the workpiece, and control a rate of acceleration of the motor based on the determined magnitude. The rate of acceleration is reduced in response to an increase in the magnitude of the load.

In some examples, the hoist device includes a load detection device in communication with the controller.

In some examples, the load detection device is a hydraulic cylinder coupled between the hoist device and a hoist support point, the hydraulic cylinder including a pressure sensor in communication with the controller.

In some examples, the pressure sensor outputs a pressure reading indicative of a load coupled to the hoist device.

In some examples, the load detection device is a load cell coupled between the hoist device and a hoist support point, the load cell configured to communicate a load reading to the controller.

In some examples, the load detection device is a current sensor configured to determine a current consumption of the motor, wherein the current consumption is indicative of a load coupled to the hoist device.

In some examples, the load detection device is a speed sensor configured to determine a speed of the motor and in communication with the controller. The controller is configured to determine a load based on a decrease in speed of the motor from a no-load speed.

In some examples, the hoist device further includes a load hook coupled to a first end of the chain. The load hook is configured to couple the workpiece to the chain.

In some examples, the load hook includes a security hasp. The security hasp comprises an electronic sensor to determine whether the hasp has been closed.

In some examples, the load hook includes a motion sensor configured to determine a change in a balance of the workpiece when the workpiece is suspended.

In some examples, the motion sensor is one or more of an accelerometer and a gyroscope.

In some examples, the controller is further configured to determine a number of lifts remaining in the power supply based on one or more parameters of the power supply, a current draw during a lifting operation, and a voltage drop during the lifting operation.

In some examples, the controller is configured to receive redundant data signals containing commands from the remote controller in communication with the hoist device.

In some examples, the controller monitors the redundant data signals from the remote controller to verify the accuracy of a received command.

In some examples, the controller is configured to evaluate commands received from the remote controller to verify that the commands are within a predetermined specification.

In some examples, the remote controller includes one or more double activation inputs requiring a user to perform two independent actions in order to transmit a command associated with the user actions.

In some examples, the remote controller includes one or more triple activation inputs requiring a user to perform three independent actions in order to transmit a command associated with the user actions.

In some examples, one of the activation inputs is a capacitive hand sensor for sensing the presence of a user's hand.

In some examples, the hoist device includes a mechanical brake configured to stop and maintain a position of the workpiece during a lifting operation or a lowering operation.

In some examples, the mechanical brake is a friction brake.

In some examples, the friction brake is actuated based on a command from the controller.

In some examples, hoist device includes an electro-mechanical brake configured to stop and maintain a position of the workpiece during a lifting operation or a lower operation.

In some examples, the electro-mechanical brake is controller based on an output from the controller.

In some examples, the hoist device includes a chain locking device configured to prevent movement of the workpiece during a loss of power.

In some examples, the chain locking device includes a first pawl configured to engage a first ratchet wheel of the transmission to prevent operation of the hoist device in a first direction.

In some examples, the first pawl is moved into and out of engagement with the first ratchet wheel by one or more solenoid devices.

In some examples, the solenoid is configured to move the first pawl into engagement with the ratchet wheel when power is removed to the solenoid device.

In some examples, the chain locking device further includes a second pawl configured to engage a second ratchet wheel of the transmission to prevent operation of the hoist device in a second direction.

In some examples, the chain locking device includes a worm gear coupled to one or more gears of the transmission to prevent movement of the load by preventing undesired movement of a main drive gear of the transmission.

In some examples, the chain locking device is an inertial lock configured to prevent movement of the chain if a speed of the chain release exceeds a predetermined speed.

In some examples, the controller is configured to stop operation of the hoist device when a voice command indicting a stop is received by one or more components of the hoist device.

In some examples, the controller is configured to determine a distance between the remote controller and the hoist device.

In some examples, the controller is configured to not accept commands from the remote controller when the determined distance exceeds a predetermined threshold.

In some examples, the remote controller uses a line-of-sight communication signal to communicate with the hoist device.

In some examples, the hoist device further includes a manual hoist input configured to accept a manual operating mechanism. The manual operating mechanism interfaces with one or more ratcheting interfaces of the transmission to allow a user to manually raise or lower the workpiece using the manual operating mechanism.

In some examples, the controller is configured to stop an operation of the hoist device in response to determining a current increase that exceeds a predetermined threshold.

In some examples, the controller is configured to stop an operation of the hoist device in response to determining a current decrease that exceeds a predetermined threshold.

In some examples, the power source is a removable battery pack.

In some examples, the removable battery pack is a power tool battery pack.

Other aspects of the application will become apparent by consideration of the detailed description and accompanying drawings.

BRIEF DESCRIPTION OF THE DRAWINGS

FIGS. 28A, 28B, 28C, and 28D illustrate exchange of signals between a controller and a hoist devices of FIG. 1 and FIG. 20 using a proprietary RF communication protocol in accordance with some embodiments.

Figure 1:
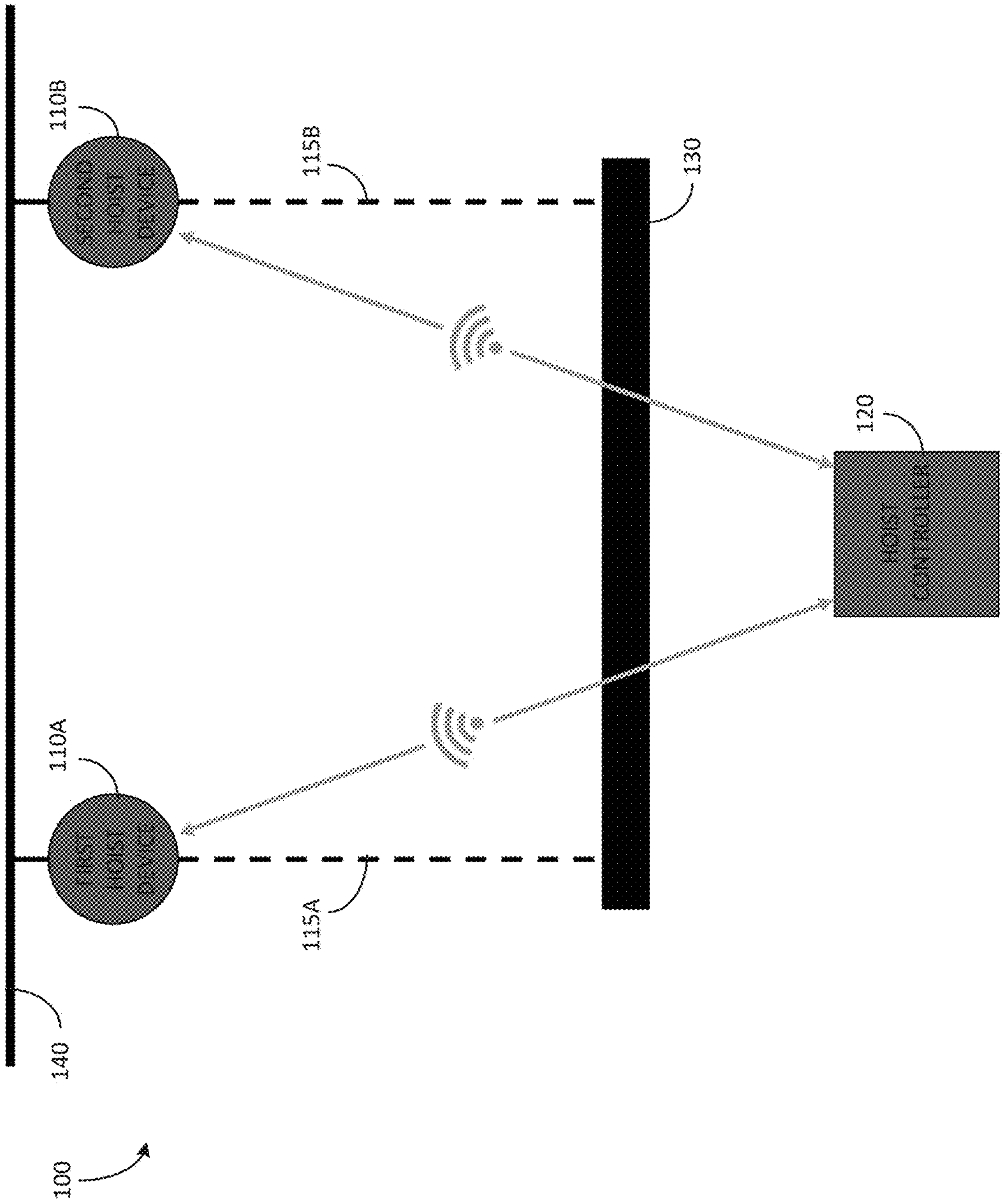
FIG. 1 illustrates a wireless hoist system in accordance with some embodiments.

Before any embodiments are explained in detail, it is to be understood that the included embodiments are not to be limited to the details of construction and the arrangement of components set forth in the following description or illustrated in the following drawings. The embodiments are capable of being practiced or carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Additionally, as used herein with a list of items, "and/or" means that the items may be taken all together, in sub-sets, or as alternatives (for example, "A, B, and/or C" means A; B; C; A and B; B and C; A and C; or A, B, and C).

It should be noted that a plurality of hardware and software based devices, as well as a plurality of different structural components may be utilized to implement the described embodiments. Furthermore, and as described in subsequent paragraphs, the specific configurations illustrated in the drawings are intended as example embodiments and other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

DETAILED DESCRIPTION

FIG. 1 illustrates one example embodiment of a wireless hoist system 100 including a plurality of hoist devices 110, for example, a first hoist device 110A and a second hoist device 110B, a hoist controller 120, and a workpiece 130. The first hoist device 110A and the second hoist device 110B are mounted on a support surface 140. The support surface 140 is, for example, a ceiling, wall, beam, or another structure of a work shop. The first hoist device 110A and the second hoist device 110B may be singularly referred to as a hoist device 110. The hoist controller 120 is, for example, a hand-held device such as a joystick controller (see FIGS. 20 and 25A-C), a smart telephone (see FIG. 24), a tablet computer, and the like.

The first hoist device 110A is connected to the workpiece 130 by a first chain 115A of the first hoist device 110A. The second hoist device 110B is connected to the workpiece 130 by a second chain 115B of the second hoist device 110B. The first hoist device 110A and the second hoist device 110B move the workpiece 130 by operating the first chain 115A and the second chain 115B respectively. The first chain 115A and the second chain 115B may be singularly referred to as a chain 115. The hoist controller 120 can control one or more of the first hoist device 110A and the second hoist device 110B (for example, the plurality of hoist devices 110) to move the workpiece 130 between different locations. FIG. 1 illustrates only one example embodiment of the wireless hoist system 100. The wireless hoist system 100 may include more or fewer components and may perform functions other than those explicitly disclosed herein.

Figure 2A:
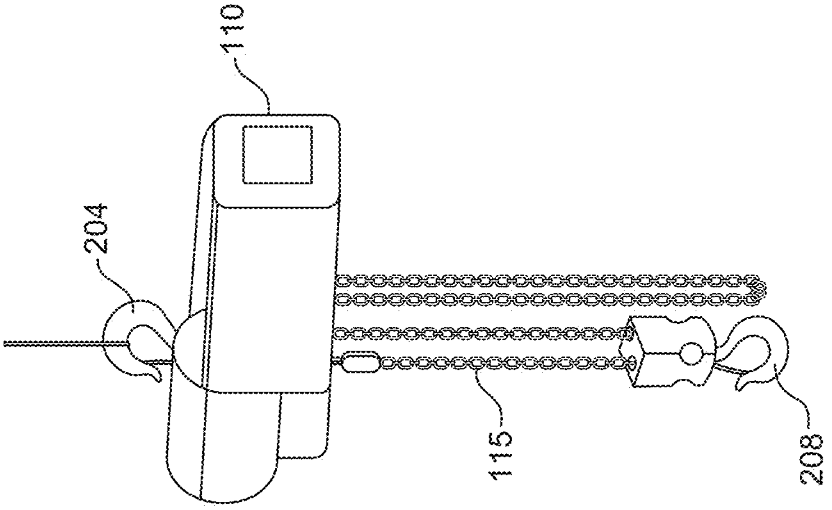
FIG. 2A illustrates a hoist device of the wireless hoist system of FIG. 1 in accordance with some embodiments.

FIG. 2A illustrates one example embodiment of the hoist device 110. The hoist device 110 may be mounted to the support surface 140 (see FIG. 1). The hoist device 110 includes a first hook 204 used for mounting the hoist device 110 to a support surface, such as the support surface 140. In some embodiments, other mounting elements, for example, fasteners, may be used to mount the hoist device 110 to the support surface 140. The hoist device 110 also includes a second hook 208 used for connecting the hoist device 110 to the workpiece 130. The hoist device 110 releases and retracts the chain 115 to raise and lower a workpiece, such as the workpiece 130. In other embodiments, the hoist device 110 may be mounted to a floor or other ground level support, and a pulley or other device may be coupled to the support surface 140, and coupled via the chain 115. Operation of the hoist device 110 releases and retracts the chain to raise and lower the workpiece via the pulley. By mounting the hoist device to the floor or other ground level support, more convenient access to the hoist is provided, thereby allowing maintenance to be performed without a lift or removing the hoist from the support surface 140.

Figure 2B:
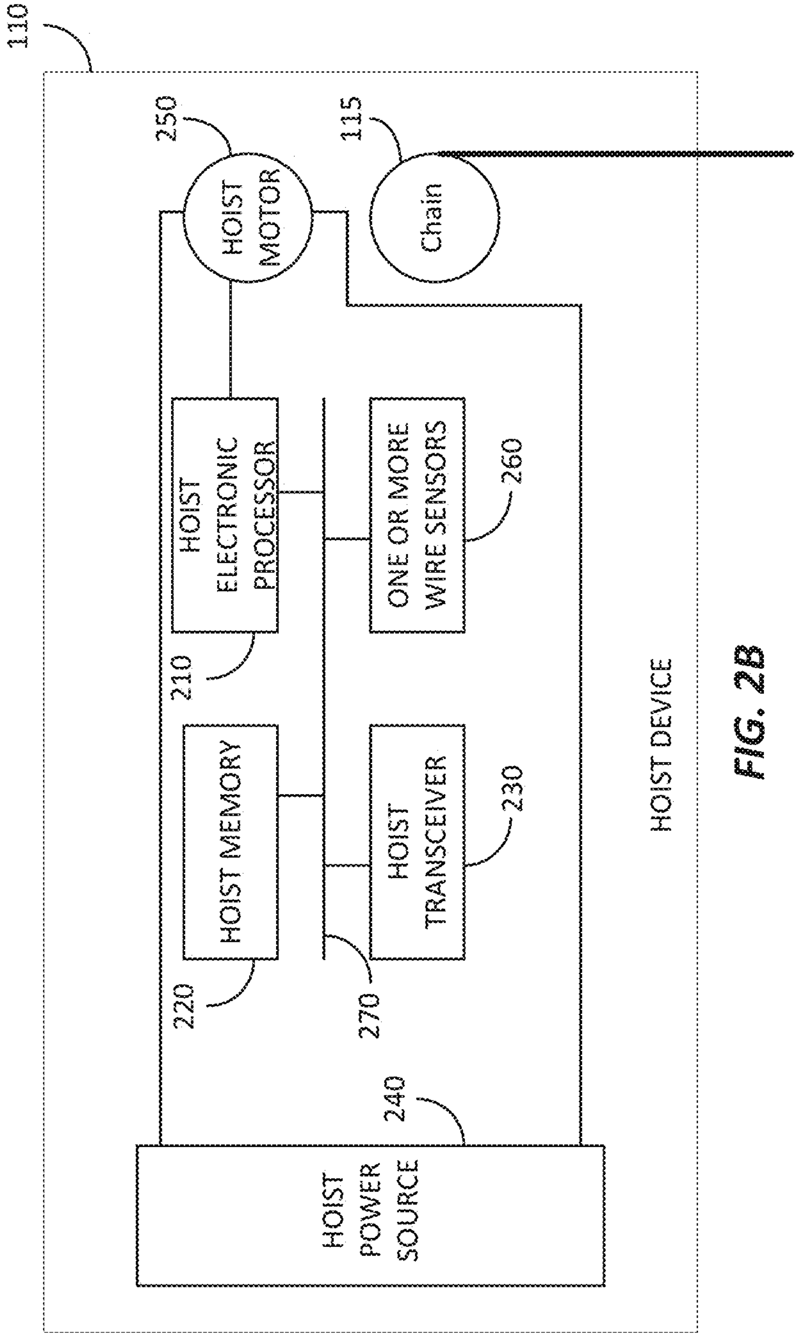
FIG. 2B is a block diagram of a hoist device of the wireless hoist system of FIG. 1 in accordance with some embodiments.

FIG. 2B is a block diagram of one example embodiment of the hoist device 110. The hoist device 110 includes a hoist electronic processor 210 (for example, a motor drive), a hoist memory 220, a hoist transceiver 230 (for example, a first wireless transceiver and a second wireless transceiver), a hoist power source 240, a hoist motor 250 (for example, a first motor and a second motor), and one or more hoist sensors 260. The hoist electronic processor 210 communicates with the hoist memory 220, the hoist transceiver 230, the hoist motor 250, and the one or more hoist sensors 260 over one or more control and/or data buses (for example, hoist communication buses 270). FIGS. 2A-2B illustrates only one example embodiment of a hoist device 110. The hoist device 110 may include more or fewer components and may perform functions other than those explicitly described herein.

In some embodiments, the hoist electronic processor 210 is implemented as a microprocessor with separate memory, such as the hoist memory 220. In other embodiments, the hoist electronic processor 210 may be implemented as a microcontroller (with hoist memory 220 on the same chip). In other embodiments, the hoist electronic processor 210 may be implemented using multiple processors. In addition, the hoist electronic processor 210 may be implemented partially or entirely as, for example, a field-programmable gate array (FPGA), and application specific integrated circuit (ASIC), and the like and the hoist memory 220 may not be needed or be modified accordingly. In the example illustrated, the hoist memory 220 includes non-transitory, computer-readable memory that stores instructions that are received and executed by the hoist electronic processor 210 to carry out functionality of the hoist device 110 described herein. The hoist memory 220 may include, for example, a program storage area and a data storage area. The program storage area and the data storage area may include combinations of different types of memory, such as read-only memory and random-access memory.

The hoist transceiver 230 enables wireless communication between the hoist device 110 and other devices, for example, other hoist devices 110, the hoist controller 120 and the like. In some embodiments, the hoist transceiver 230 includes a combined transmitter and receiver, while in other embodiments, the hoist transceiver 230 includes a separate transmitter and receiver.

The hoist power source 240 may be a DC power source, for example, a power tool battery pack coupled to the hoist device 110, or may be an AC power source, for example, a power cord that plugs into an AC outlet (for example, a wall outlet). In one example, the hoist power source 240 is an M18 REDLITHIUM Battery Pack sold and marketed by Milwaukee®. The hoist power source 240 provides operating electric power to the hoist motor 250 and other electrical components, for example, the hoist electronic processor 210, the hoist transceiver 230, and the like. The electrical connections between the hoist power source 240 and other components of the hoist device 110 are not shown to simplify the illustration. The hoist motor 250 is, for example, an AC motor, a brushless DC motor, a brushed motor, or the like, powered by the hoist power source 240. The hoist motor 250 is controlled by the hoist electronic processor 210 to release or retract the chain 115 from the hoist device 110. The hoist device 110 includes a transmission mechanism for connecting the output shaft of the hoist motor 250 to the chain 115. The one or more hoist sensors 260 include, for example, a length sensor to detect the amount of chain 115 released, a tension sensor to detect the tension in the chain 115, a resolver to detect motor position, a torque or current sensor to detect torque of the hoist motor 250, and the like.

Figure 3:
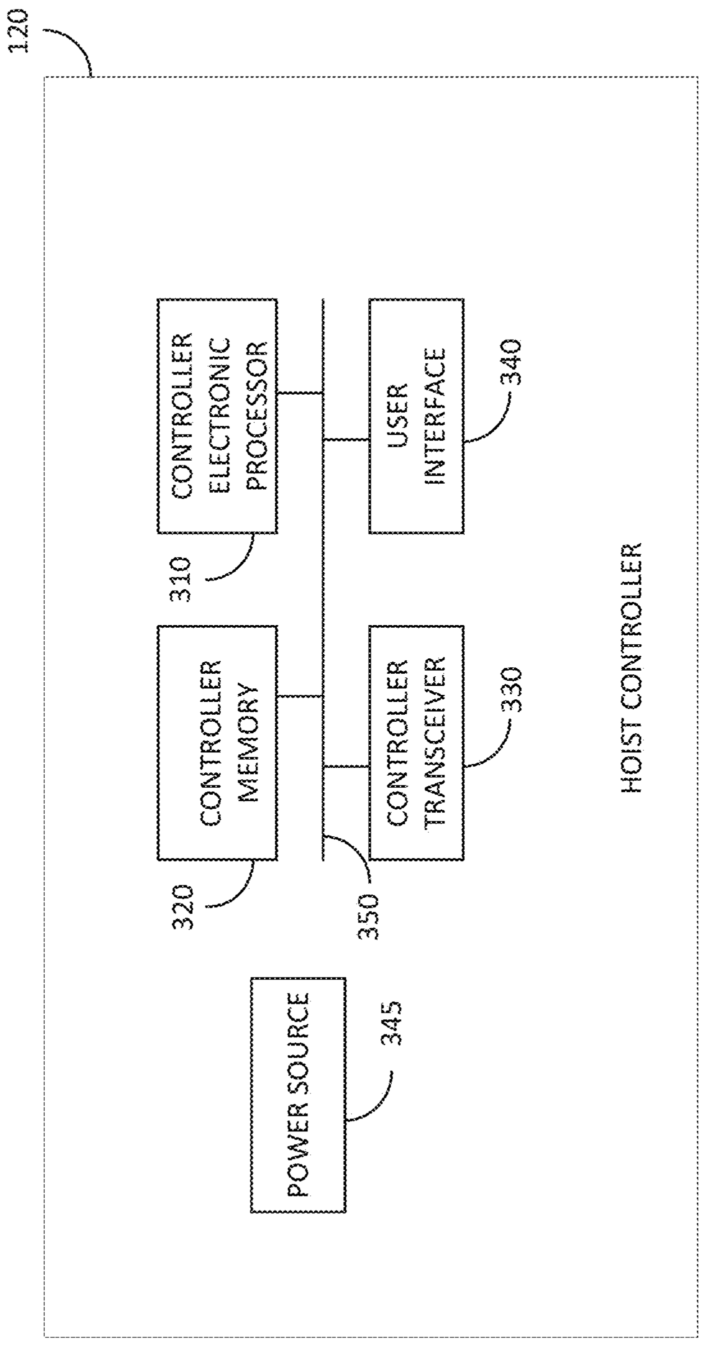
FIG. 3 is a block diagram of a hoist controller of the wireless hoist system of FIG. 1 in accordance with some embodiments.

FIG. 3 is a block diagram of one example embodiment of the hoist controller 120. The hoist controller 120 includes a controller electronic processor 310, a controller memory 320, a controller transceiver 330, a user interface 340, and a power source 345. The hoist controller 120 may include a housing (shown diagrammatically at least in FIG. 1) that supports the elements of the hoist controller 120 described herein. The controller electronic processor 310 communicates with the controller memory 320, the controller transceiver 330, and the user interface 340 over one or more control and/or data buses (for example, controller communication buses 350). FIG. 3 illustrates only one example embodiment of a hoist controller 120. The hoist controller 120 may include more or fewer components and may perform functions other than those explicitly described herein.

The controller electronic processor 310, the controller memory 320, and the controller transceiver 330 may implemented similarly as the hoist electronic processor 210, the hoist memory 220, and the hoist transceiver 230. The controller transceiver 330 enables wireless communication between the hoist controller 120 and other devices, for example, the plurality of hoist devices 110. The hoist controller 120 and the plurality of hoist devices 110 may communicate over, for example, a Bluetooth network, a Wi-Fi network, or the like. The hoist controller 120 and the plurality of hoist devices 110 may communicate over the same channel or different channels as further described below.

The user interface 340 may include one or more input devices (for example, pushbutton, a trigger, a joystick, a keyboard, and the like), one or more output devices (for example, light emitting diodes (LEDs), a speaker, a display, and the like), and/or one or more input/output devices (for example, a touch screen display). The hoist controller 120 may receive control inputs (for example, a user input) from a user through the user interface 340. For example, the user may move the joystick to control release or retraction of the chain 115 from one or more of the hoist devices 110.

The power source 345 is coupled to and powers the components of the hoist controller 120 including the controller electronic processor 310, the controller memory 320, the controller transceiver 330, and the user interface 340. The electrical connections between the power source 345 and other components of the hoist controller 120 are not illustrated to simplify the illustration. In some embodiments, the power source 345 is a DC power source including, for example, one or more battery cells (e.g., AA type, AAA type, 9V type) or a battery pack including one or more battery cells (e.g., a power tool battery pack or a USB power source). In one example, the power source 345 is an M12 Battery Pack sold and marketed by Milwaukee®. The DC power source, in contrast to a corded AC power source, increases the portability and mobility of the hoist controller 120. However, in some embodiments, the power source 345 is an AC power supply circuit that receives AC power via a cord coupled to an AC power source (e.g., a wall outlet), converts the AC power to DC power (e.g., via a rectifier or power switching elements), and outputs DC power.

Figure 4A:
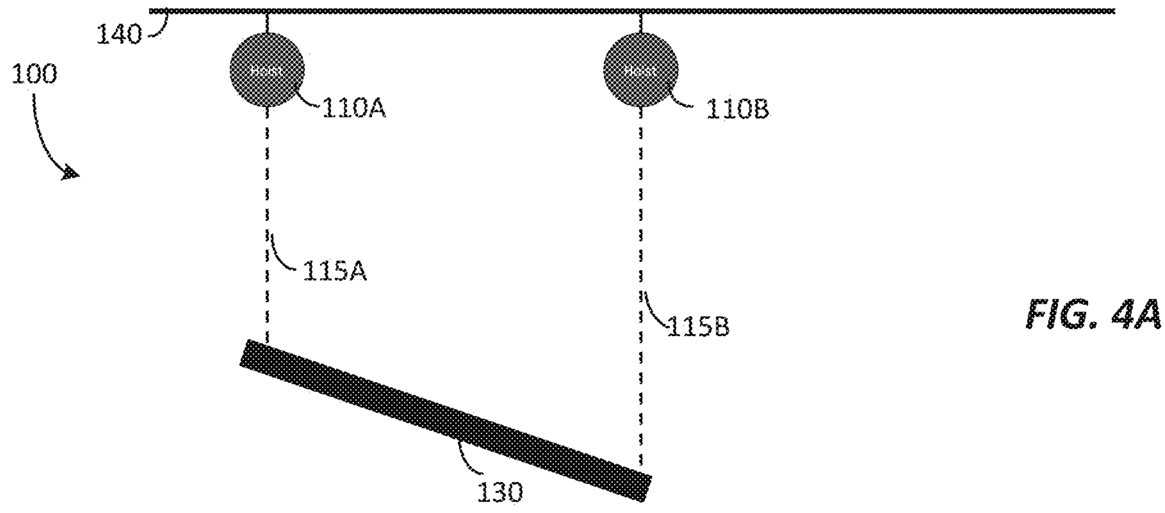
FIGS. 4A-4C illustrate example implementations of the wireless hoist system of FIG. 1 in accordance with some embodiments.
Figure 4B:
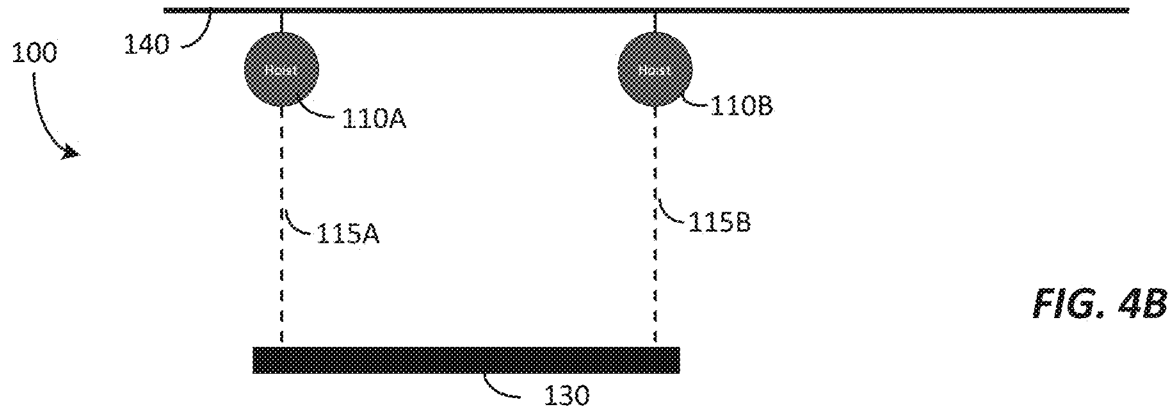
Figure 4C:
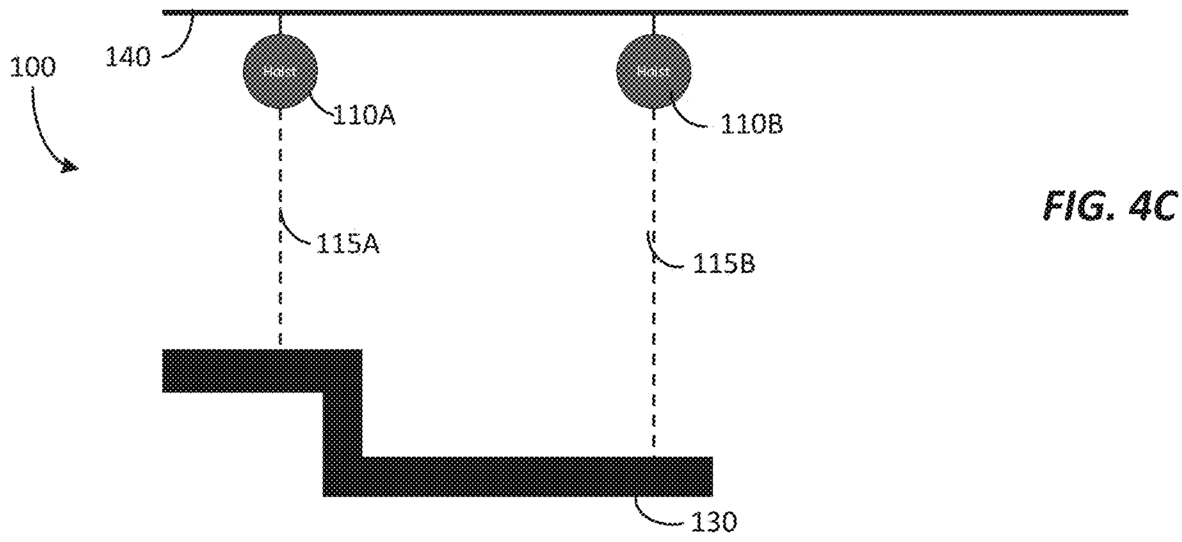

FIGS. 4A-4C illustrate several example implementations of the wireless hoist system 100. The wireless hoist system 100 is used to lift or lower the workpiece 130 using the first hoist device 110A and the second hoist device 110B. The first chain 115A and the second chain 115B are coupled to different locations on the workpiece 130 to place the workpiece at an angle. In FIG. 4A, the workpiece 130 is lifted or lowered at an angle from ground (for example, a non-zero angle from the ground). The first hoist device 110A and the second hoist device 110B are controlled by the hoist controller 120 to have differing chain lengths to maintain the non-zero angle. In FIG. 4B, the workpiece 130 is lifted or lowered at a level angle (for example, 0 degrees from the ground). The first hoist device 110A and the second hoist device 110B are controlled by the hoist controller 120 to have the same chain length to maintain the level angle. In FIG. 4C, the wireless hoist system 100 is used to lift or lower a workpiece 130 having an irregular shape such that the first hoist device 110A and the second hoist device 110B may have different chain lengths to maintain the angle of lift of the workpiece 130.

Figure 5:
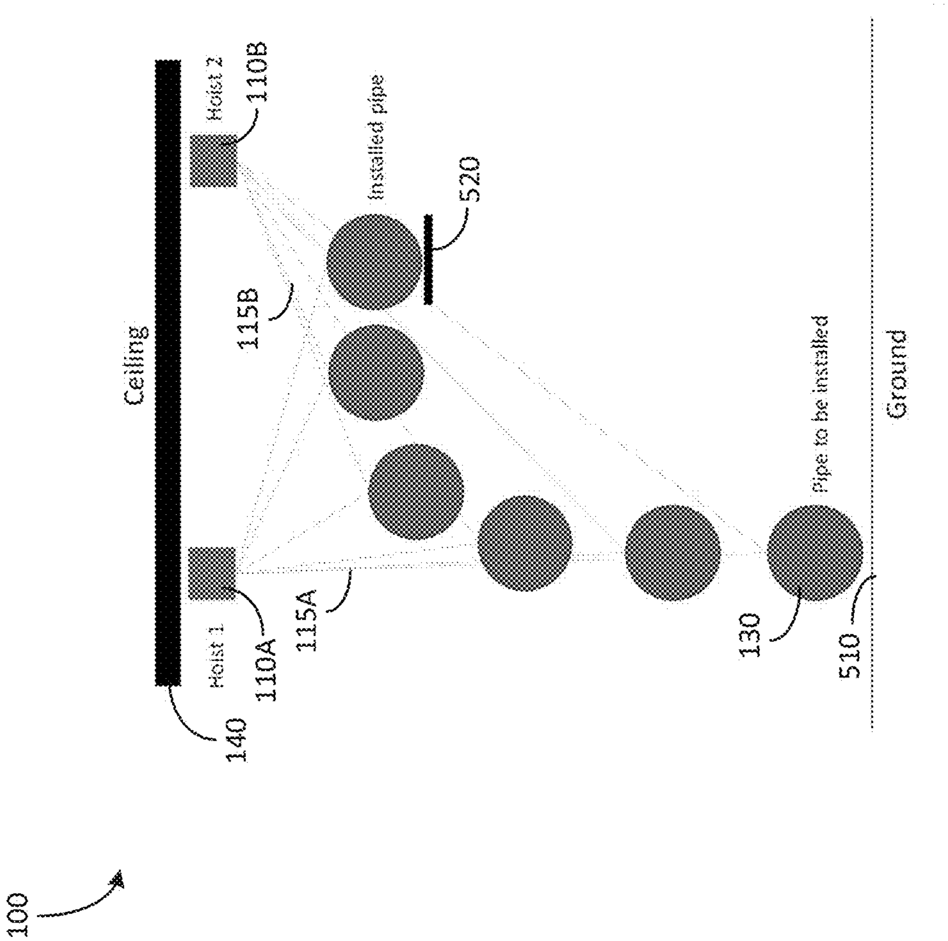
FIG. 5 illustrates an example implementation of the wireless hoist system of FIG. 1 to install a workpiece in accordance with some embodiments.

FIG. 5 illustrates another example implementation of the wireless hoist system 100. The wireless hoist system 100 is used to lift the workpiece 130 from a first location 510 and install the workpiece 130 at a second location 520. The first chain 115A and the second chain 115B are coupled at the same location or at nearby locations to install the workpiece 130. Particularly, the first hoist device 110A and the second hoist device 110B work together to move the workpiece 130 vertically and laterally to install the workpiece 130 at the second location 520.

Figure 6A:
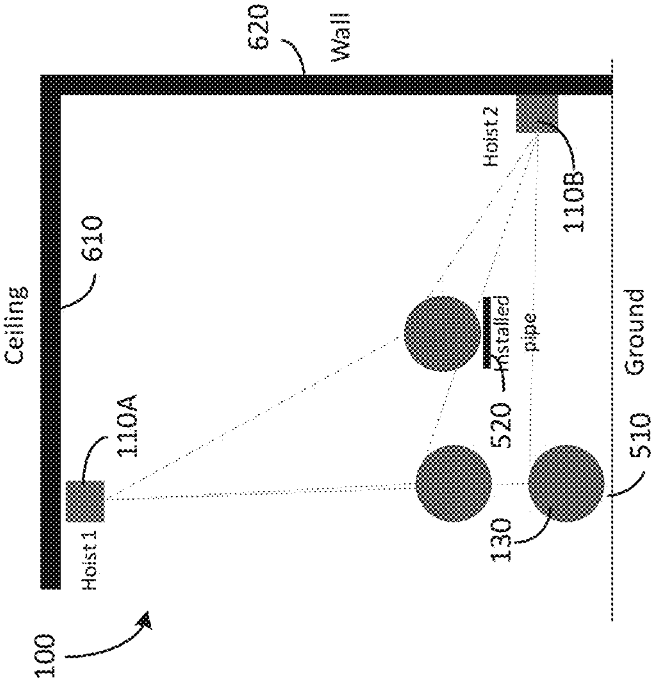
FIGS. 6A-6B illustrate an example implementation of the wireless hoist system of FIG. 1 with different mounting positions of the hoist devices of FIG. 1 in accordance with some embodiments.
Figure 6B:
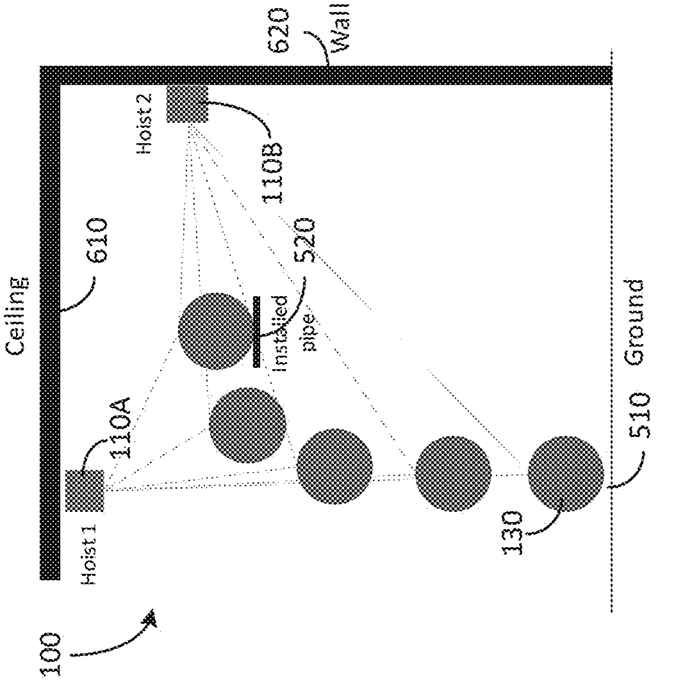

FIGS. 6A-6B illustrate different mounting positions of the hoist devices 110. The first hoist device 110A is mounted to a first support surface 610 (for example, a ceiling) of a workshop and the second hoist device 110B is mounted to a second support surface 620 (for example, a wall) of the workshop. The mounting location of the first hoist device 110A and the second hoist device 110B may be varied depending on the installation location 520 and barriers in the workshop.

Figure 7:
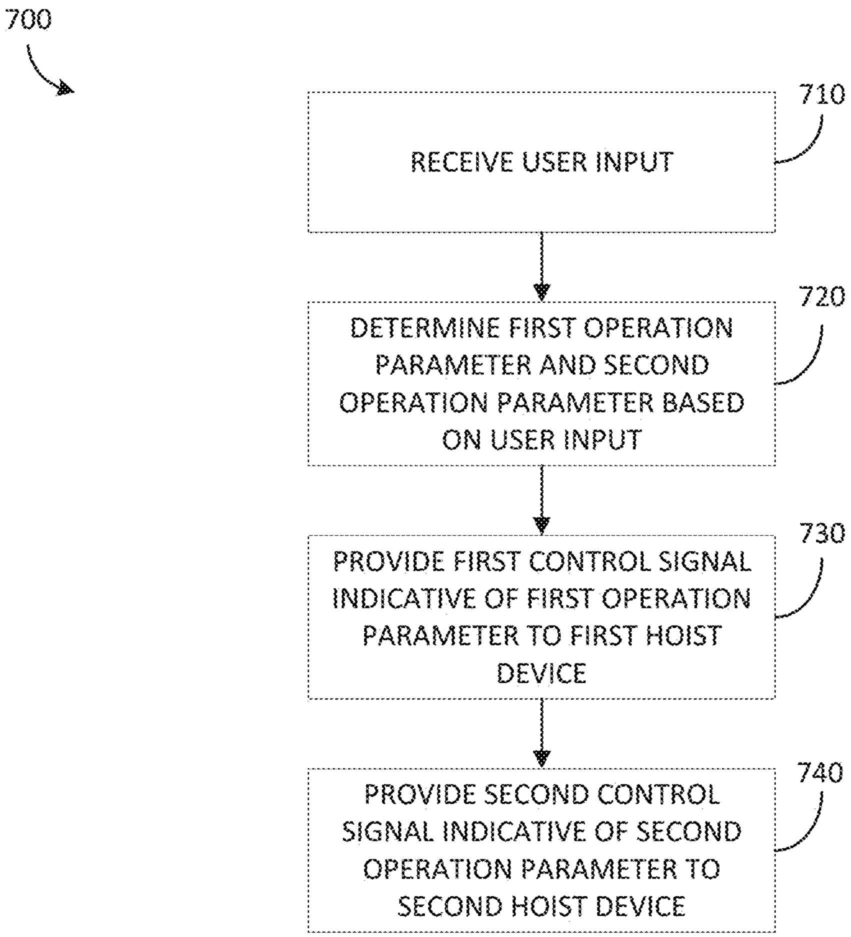
FIG. 7 is a flowchart of a method for operating the wireless hoist system of FIG. 1 in accordance with some embodiments.

FIG. 7 illustrates a flowchart of one example method 700 of operating the wireless hoist system 100. In the example illustrated, the method 700 includes receiving, at user interface 340 of the hoist controller 120, user input (at block 710). A user of the wireless hoist system 100 controls the hoist devices 110 using the hoist controller 120. The user provides control inputs to the hoist controller 120 over the user interface 340. For example, the user interface 340 includes a joystick controller and the user moves the joystick controller to produce movements of the workpiece through the hoist devices 110. The user interface 340 may receive user input from the user including several operational parameters for the work to be performed by the wireless hoist system 100. The user input may include a desired movement of the workpiece 130, for example, a direction of movement, a speed of movement, a start point, an end point, or the like of the workpiece 130. The user interface 340 may also receive as user input from the a position of the first hoist device 110A, a position of the second hoist device 110B, and a desired end position of the workpiece 130.

The method 700 includes determining, using the controller electronic processor 310, a first operation parameter and a second operation parameter based on the user input (at block 720). The first operation parameter corresponds to the first hoist device 110A and the second operation parameter corresponds to the second hoist device 110B. The controller electronic processor 310 receives the user input, for example, the desired movement of the workpiece, the positions of the hoist devices 110 and the workpiece, and determines the operation parameters of the first hoist device 110A and the second hoist device 110B based on the user input. For example, the controller electronic processor 310 receives a desired movement of the workpiece as the user input and determines a direction and/or speed of movement and/or chain length of the first chain 115A of the first hoist device 110A and a direction and/or speed of movement and/or chain length of the second chain 115B of the second hoist device 110B. The direction and/or speed of movement and/or chain length of the first chain 115A corresponds to the first operation parameter and the direction and/or speed of movement and/or chain length of the second chain 115B corresponds to the second operation parameter. In another example, the controller electronic processor 310 receives the respective positions of the first hoist device 110A and the second hoist device 110B and the desired end position of the workpiece as the user input and determines the direction and/or speed of movement and/or chain length of the first chain 115A of the first hoist device 110A and the direction and/or speed of movement and/or chain length of the second chain 115B of the second hoist device 110B. In this example, the controller electronic processor 310 may also use the respective chain lengths of the first chain 115A and the second chain 115B from the first hoist device 110A and the second hoist device 110B for determining the first operation parameter and the second operation parameter. For example, the controller electronic processor 310 may determine the initial position of the workpiece based on the positions of the hoist devices 110 (which may be entered in a set up stage) and the respective chain lengths (which may be determined using the respective sensors 260). The controller electronic processor 310 finds the distance and direction between the initial position determined above and the desired end position received from the user input. The positions of the hoist devices 110 and the initial positions of the workpiece may, for example, be provided or determined with respect to a common reference point (e.g., a point on the floor) or multiple reference points with known relative positions. The controller electronic processor 310 uses the distance and direction to calculate the direction and/or speed of movement and/or chain length of the first chain 115A and the second chain 115B. For example, the positions may be expressed one of various formats, such as using the Cartesian coordinate system or another coordinate system. Then, for example, the direction and chain length for each hoist device 110 to move a workpiece from an initial position to an end position may be calculated by determining differences between the coordinates of the initial and end positions with respect to the positions of the hoist devices 110.

The method 700 includes providing, wirelessly using the controller electronic processor 310, a first control signal indicative of the first operation parameter to the first hoist device 110A (at block 730). The controller electronic processor 310 provides the control signals that correspond to the first operation parameter via the controller transceiver 330 to the first hoist device 110A. The first hoist device 110A receives the first control signal over the hoist transceiver 230 (that is, the first wireless transceiver). The first hoist device 110A operates based on the first control signal. That is, the first hoist device 110A controls the hoist motor 250 (that is, the first motor) of the first hoist device 110A based on the first control signal. For example, the hoist electronic processor 210 of the first hoist device 110A controls the hoist motor 250 of the first hoist device 110A to match the direction, chain length, and/or speed indicated by the first control signal.

The method 700 also includes providing, wirelessly using the controller electronic processor 310, a second control signal indicative of the second operation parameter to the second hoist device 110B (at block 740). The controller electronic processor 310 provides the control signals that correspond to the second operation parameter via the controller transceiver 330 to the second hoist device 110B. The second hoist device 110B receives the second control signal over the hoist transceiver 230 (that is, the second wireless transceiver). The second hoist device 110B operates based on the second control signal. That is, the second hoist device 110B controls the hoist motor 250 (that is, the second motor) of the second hoist device 110B based on the second control signal. For example, the hoist electronic processor 210 of the second hoist device 110B controls the hoist motor 250 of the second hoist device 110B to match the direction, chain length, and/or speed indicated by the second control signal.

In some embodiments, the method 700 may include determining the first operation parameter based on the user input rather than both the first operation parameter and the second operation parameter at block 720. This embodiment may be applicable in, for example, situations where the first hoist device 110A and the second hoist device 110B include similar operation to move the workpiece as shown in FIGS. 1 and 4A-C. In these embodiments, the method 700 further includes providing, wirelessly, a first control signal indicative of the first operation parameter to the first hoist device 110A (at block 730) and providing, wirelessly, a second control signal indicative of the first operation parameter to the second hoist device 110B (at block 740).

In some embodiments, the user may provide signals continuously until the workpiece 130 reaches the desired end position. For example, the user may move the joystick controller until the workpiece 130 reaches the desired end position. In these embodiment, the method 700 repeats to continuously provide the first control signal and the second control signal (which may vary over time) to the first hoist device 110A and the second hoist device 110B until the user terminates providing the user input (e.g., releases the joystick). In some embodiments, the user may provide the desired end position along with other inputs and the method 700 may continuously provide the first control signal and the second controls signal until the desired end position is reached. Alternatively, the method 700 may provide the first control signal and the second control signal once to the first hoist device 110A and the second hoist device 110B and the first hoist device 110A and the second hoist device 110B operate until the workpiece 130 is at the desired location.

Figure 8:
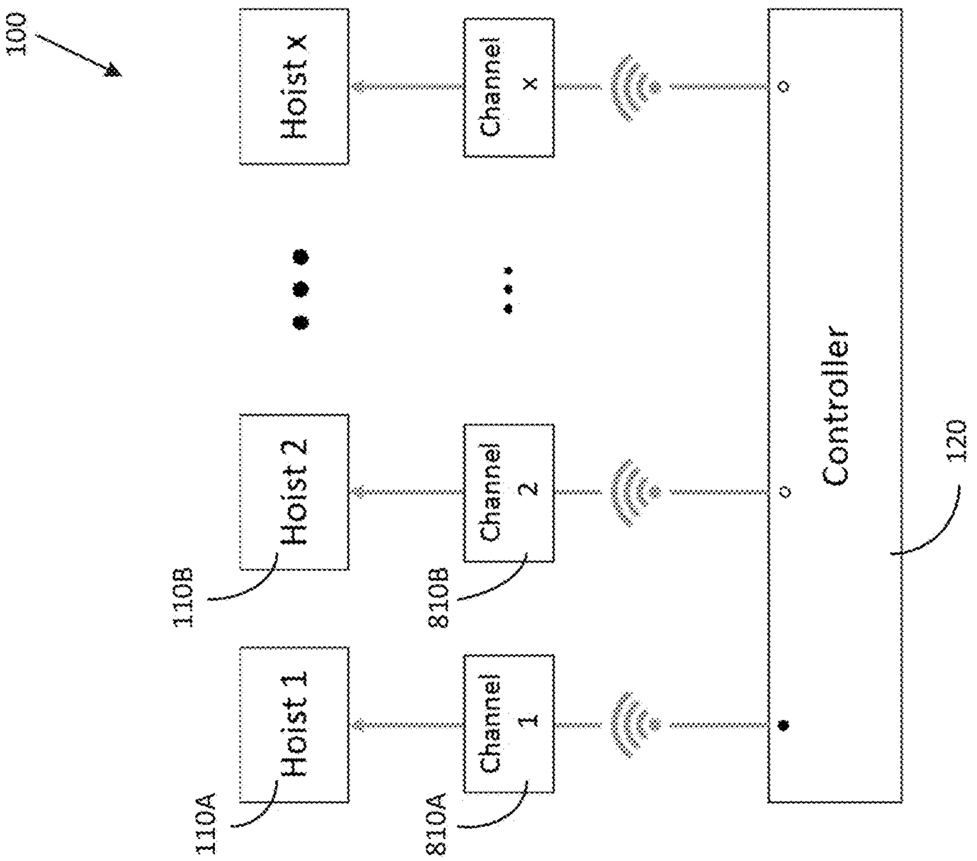
FIG. 8 is a block diagram of a communication scheme of the wireless hoist system of FIG. 1 in accordance with some embodiments.

As shown in FIG. 8, the hoist controller 120 communicates with different hoist devices 110 over different wireless communication channels 810. For example, the hoist controller 120 communicates with the first hoist device 110A over a first channel 810A (i.e., first wireless channel), with the second hoist device 110B over a second channel 810B (i.e., a second wireless channel), and so on. Communicating with different hoist devices 110 over different communication channels 810 prevents interference between the different hoist devices. The user may selectively activate the channels 810 depending on the implementation of the wireless hoist system 100. For example, for a certain time period or operation, the user may activate only the first channel 810A to enable communication with the first hoist device 110A and deactivate all other channels 810. A wireless network may operate over a certain radio signal frequency bandwidth. That is the wireless network includes a minimum radio frequency and a maximum radio frequency and the wireless network utilizes the band of frequencies between the minimum and the maximum radio frequency to send and receive radio signals. The wireless bandwidth may be further divided into several channels, for example, by dividing the bandwidth into smaller frequency intervals. For example, a 20 MHz wireless band may be divided into several 5 GHz channels. A host device may communicate with several other devices over a single channel or over the complete range of the wireless network. However, communicating over a single channel or the complete range of the wireless network may cause interference between different communication paths (i.e., communication paths between the host device and guest devices) or may require special addressing to avoid interference. By communicating with different devices over different channels, interference and special addressing may be avoided.

Figure 9:
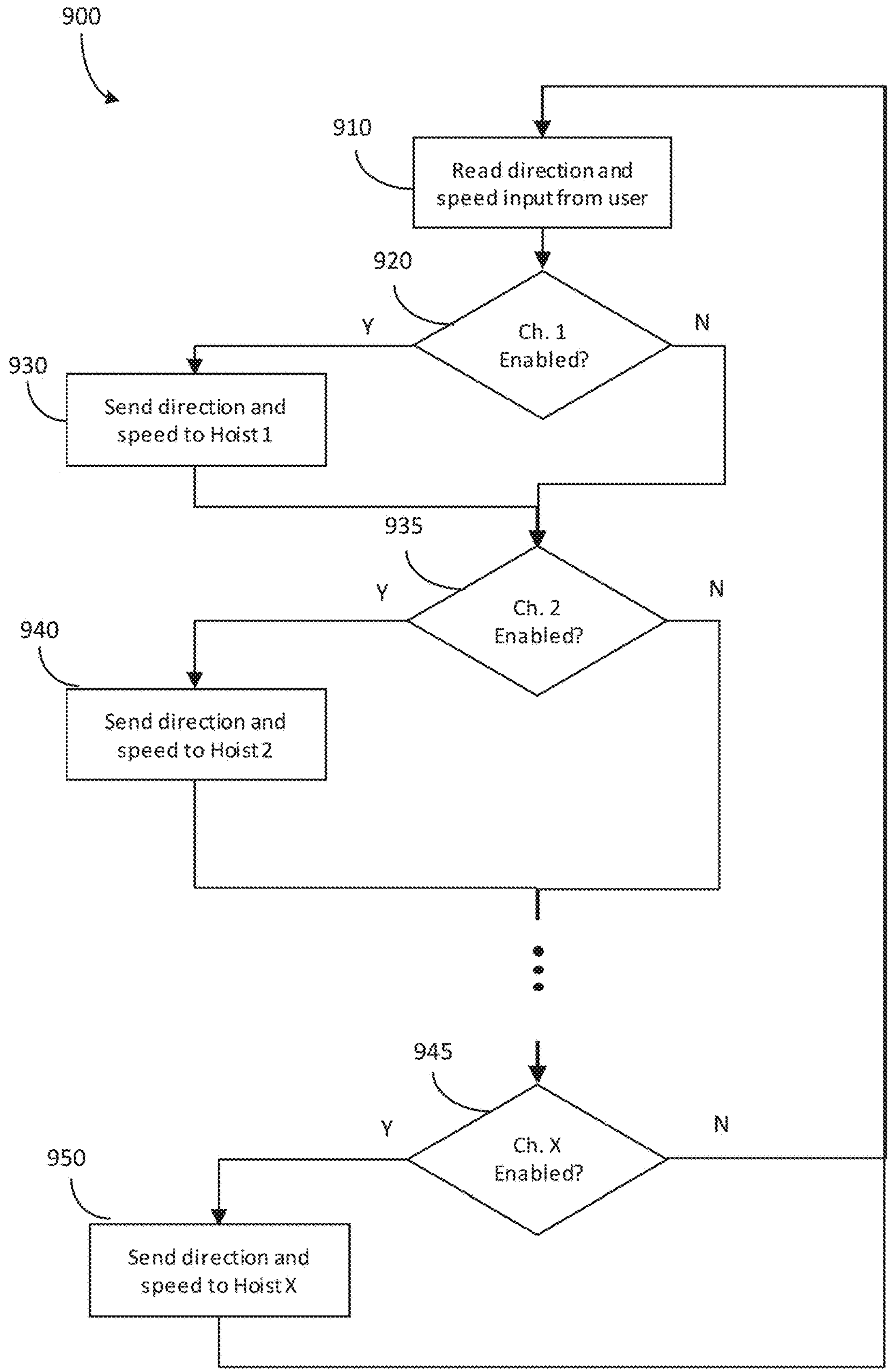
FIG. 9 is a flowchart of the communication scheme of FIG. 8 in accordance with some embodiments.

FIG. 9 illustrates a flowchart of a method 900 of communication between the hoist controller 120 and the plurality of hoist devices 110. In the example illustrated, the method 900 includes reading, using the controller electronic processor 310, a direction and speed input from a user over the user interface 340 (at block 910). A user may input the desired direction and speed for moving the workpiece 130 using the user interface 340. The method 900 also includes determining, using the controller electronic processor 310, whether the first channel 810A is enabled (at block 920). When the first channel 810A is enabled, the method 900 includes providing, using the controller electronic processor 310 via the controller transceiver 330 and the first channel 810A, the direction and speed information to the first hoist device 110A (at block 930). That is, the first control signal is provided to the first hoist device 110A in response to determining that a first channel 810A associated with the first hoist device 110A is enabled. The method 900 similarly includes determining whether the other channels 810 are enabled (at blocks 935 and 945) and providing the direction and speed information to the respective hoist devices 110 when the respective channels 810 are enabled (at blocks 940 and 950). The second control signal is provided to the second hoist device 110B in response to determining that a second channel 810B associated with the second hoist device 110B is enabled. When a channel 810 is disabled (not enabled), the hoist controller 120 does not provide a direction and speed information to the hoist device 110 associated with the disabled channel. That is, the hoist controller 120, in response to determining that the third channel is disabled, does not provide a control signal indicative of the first operation parameter to the third hoist device 110.

Figure 10:
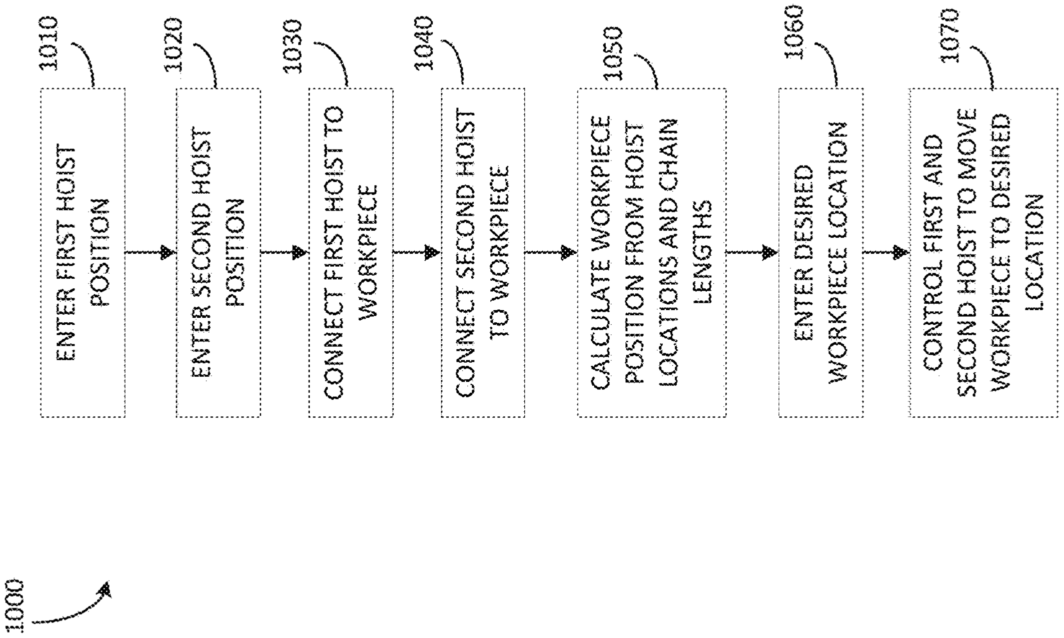
FIG. 10 is a flowchart of another method for operating the wireless hoist system of FIG. 1 in accordance with some embodiments.
Figure 11:
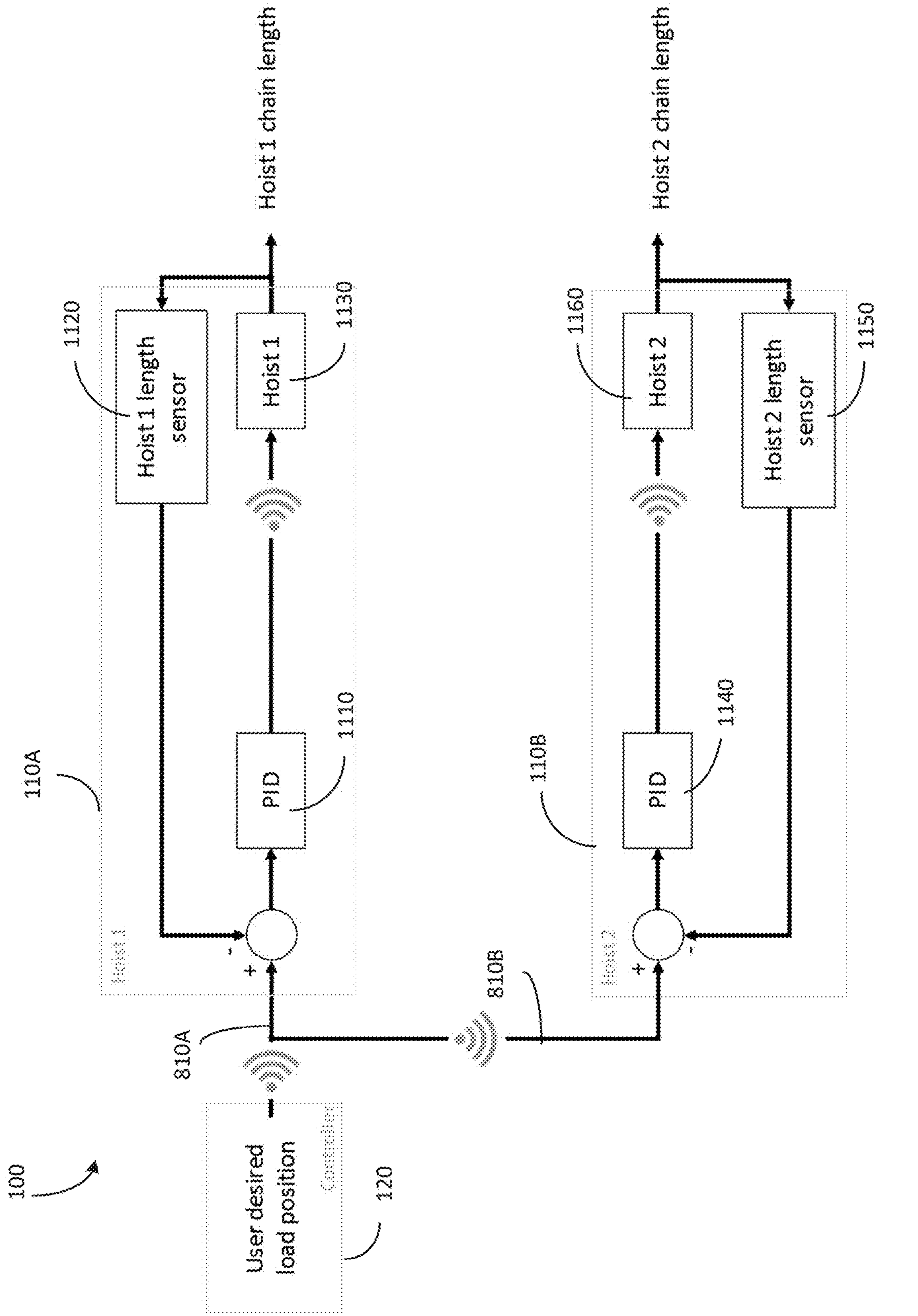
FIG. 11 illustrates an example implementation of the wireless hoist system of FIG. 1 with a hoist controller in communication with two or more hoist devices in accordance with some embodiments.

FIGS. 10-11 illustrate one example implementation of the wireless hoist system 100 where two or more hoist devices 110 are controlled by the hoist controller 120 to install a workpiece 130. In the example illustrated, the hoist controller 120 communicates wirelessly with the first hoist device 110A over a first wireless communication channel 810A and communicates with the second hoist device 110B over a second wireless communication channel 810B.

FIG. 10 illustrates a method 1000 for the wireless hoist system 100. In the example illustrated, the method 1000 includes receiving, using the controller electronic processor 310, a first position of the first hoist device 110A (at block 1010). The method 1000 also includes receiving, using the controller electronic processor 310, a second position of the second hoist device 110B (at block 1020). A user may enter the first position data and the second position data using the user interface 340. The position may be represented in various coordinate system formats (e.g., Cartesian) using a common reference point or multiple reference points with known or indicated relative positions.

The method 1000 further includes connecting the first hoist device 110A to the workpiece 130 (at block 1030) and connecting the second hoist device 110B to the workpiece 130 (at block 1040). The user may connect the first hoist device 110A and the second hoist device 110B to the workpiece 130 using the second hooks of the first hoist device 110A and the second hoist device 110B respectively.

The method 1000 includes calculating, using the controller electronic processor 310, a workpiece position based on the first position, the second position, and chain length information (at block 1050). As discussed above, the controller electronic processor 310 receives the first position information and the second position information from the user through the user interface 340. Additionally, the hoist controller 120 communicates with the first hoist device 110A to determine the released chain length of the first chain 115A (determined by the first hoist device 100A based on sensors 260) and communicates with the second hoist device 110B to determine the released chain length of the second chain 115B (determined by the first hoist device 100A based on sensors 260). The controller electronic processor 310 determines the workpiece position based on the position information of the hoist devices 110 and the respective chain lengths.

The method 1000 also includes receiving, using the controller electronic processor 310, a desired workpiece location (at block 1060). The user may enter the desired workpiece location using the user interface 340. For example, the location may be specified using the same coordinate system used to specify the first and second hoist positions. Based on the workpiece position and the desired workpiece location, the hoist controller 120 may automatically provide control signals to the first hoist device 110A and the second hoist device 110B (at block 1070). FIG. 11 illustrates an example technique to implement block 1070 in which the hoist controller 120 provides a user desired workpiece position to the first hoist device 110A and the second hoist device 110B.

The control of the first hoist device 110A and the second hoist device 110B based on the first control signal and the second control signal is further explained with respect to FIG. 11. The first hoist device 110A includes a proportional-integral-derivative (PID) controller 1110, for example, implemented by the hoist electronic processor 210 of the first hoist device 110A. The PID controller 1110 or the hoist electronic processor 210 forms the motor drive of the first hoist device 110A. The PID controller 1110 is coupled to a length/speed sensor 1120 (for example, a sensor for detecting chain length). The PID controller 1110 receives sensor data from the length/speed sensor 1120. For example, the PID controller 1110 receives chain length information from the length/speed sensor 1120 indicating the amount of chain released from the first hoist device 110A. The PID controller 1110 also receives the first control signal from the hoist controller 120. The PID controller 1110 controls the motor 1130 (for example, the motor 250 of the first hoist device 110A) based on the first control signal and the chain length information to install the workpiece 130.

Similarly, the second hoist device 110B includes a proportional-integral-derivative (PID) controller 1140, for example, implemented by the hoist electronic processor 210 of the second hoist device 110B. The PID controller 1140 or the hoist electronic processor 210 forms the motor drive of the second hoist device 110B. The PID controller 1140 is coupled to a length/speed sensor 1150 (for example, a sensor for detecting chain length). The PID controller 1140 receives sensor data from the length/speed sensor 1150. For example, the PID controller 1140 receives chain length information from the length/speed sensor 1150 indicating the amount of chain released from the second hoist device 110B. The PID controller 1140 also receives the second control signal from the hoist controller 120. The PID controller 1140 controls the motor 1160 (for example, the motor 250 of the second hoist device 110B) based on the second control signal and the chain length information to install the workpiece 130.

Figure 12:
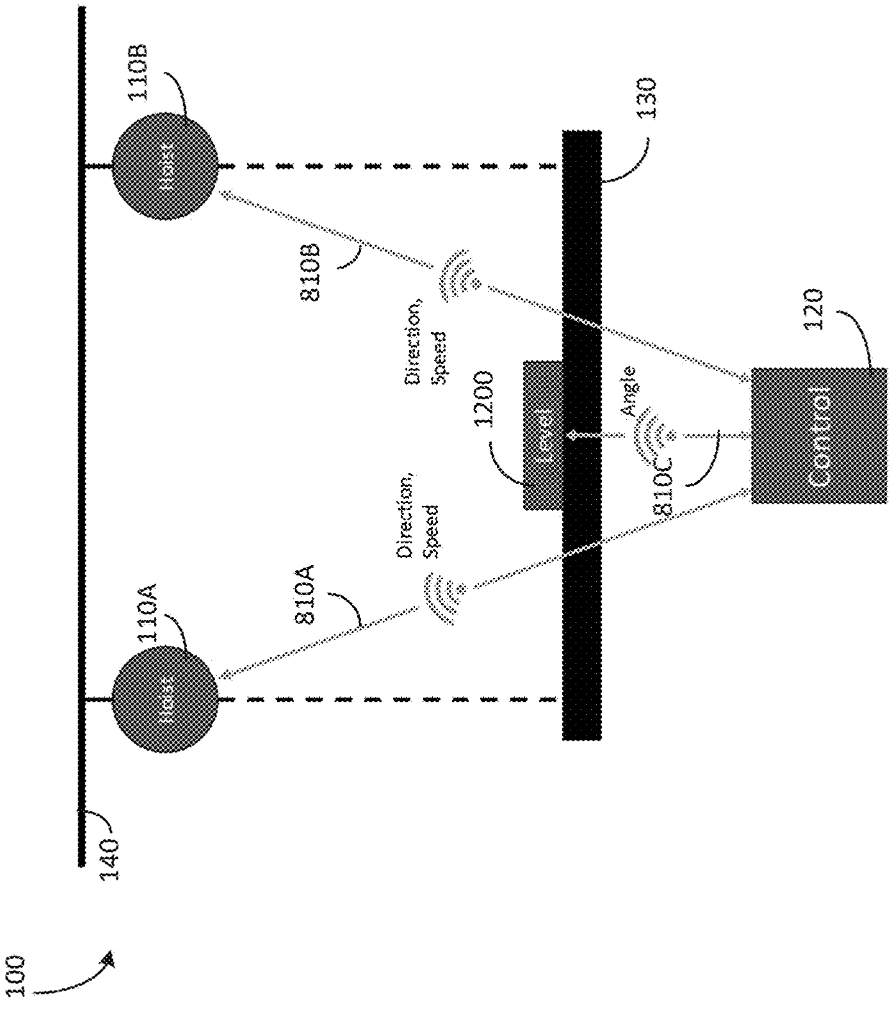
FIG. 12 illustrates another example implementation of the wireless hoist system of FIG. 1 with control of one or more hoist devices to maintain a desired angle in accordance with some embodiments.
Figure 13:
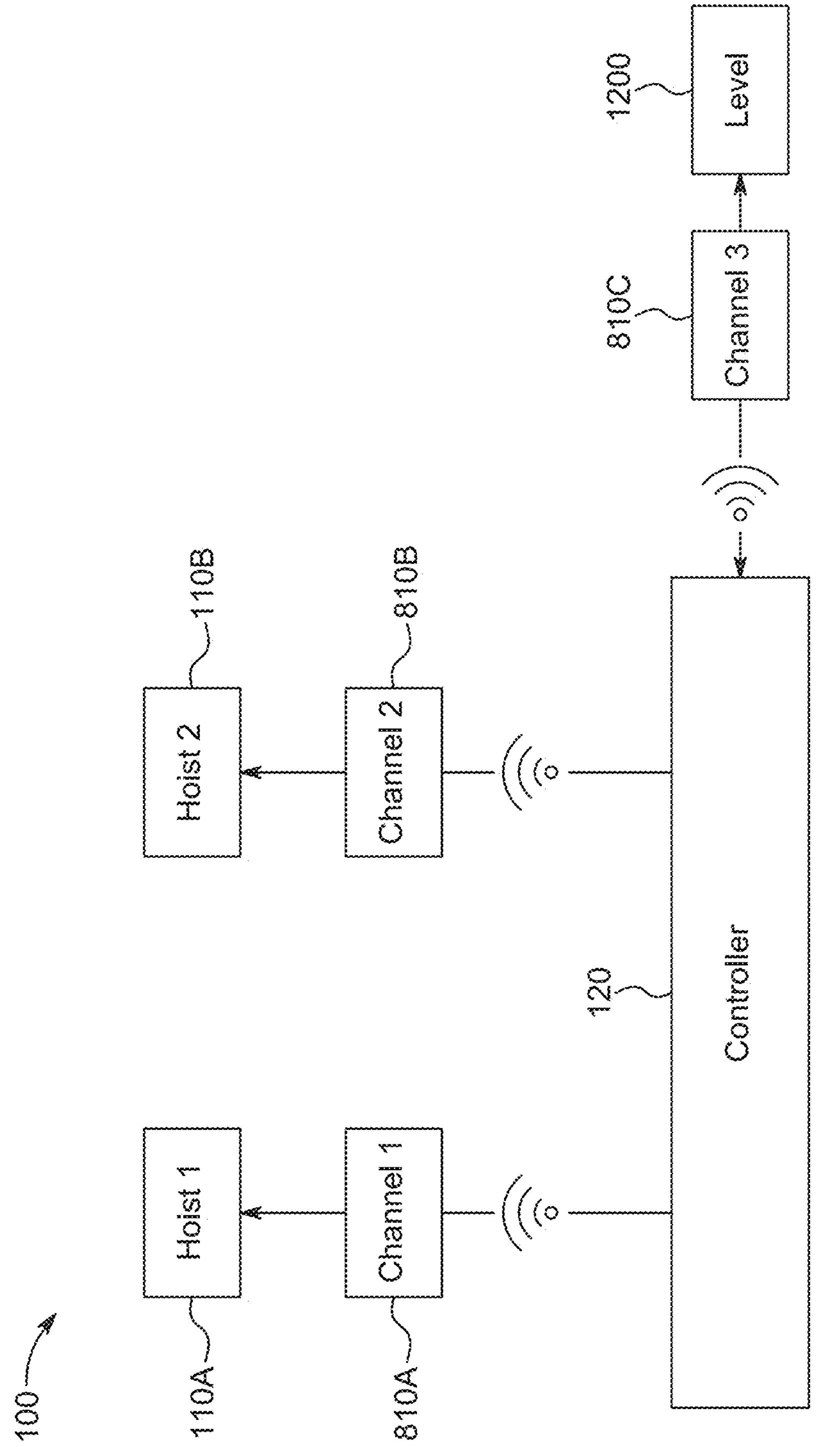
FIG. 13 illustrates a block diagram for the implementation of the wireless hoist system shown in FIG. 12.
Figure 14:
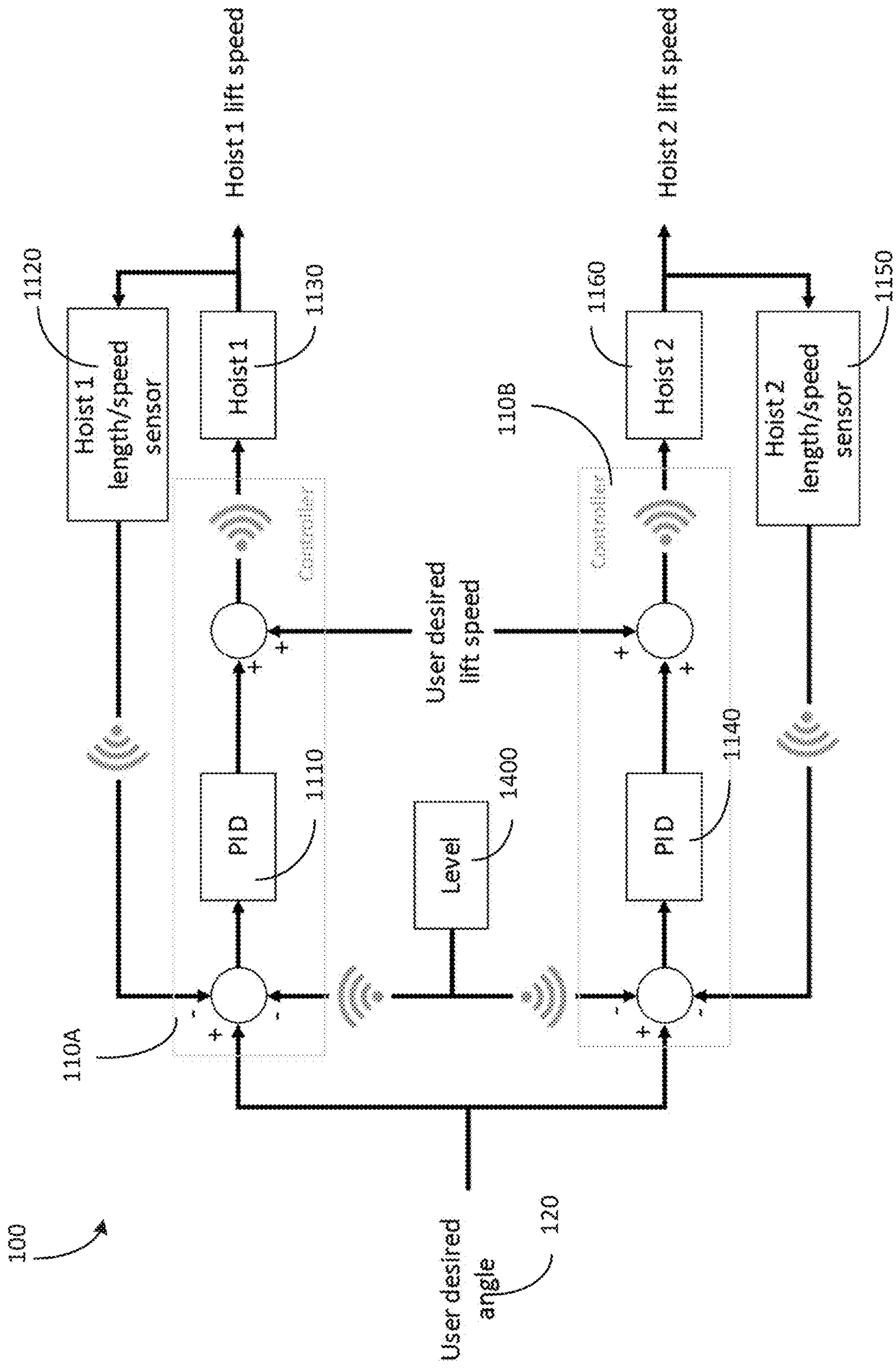
FIG. 14 illustrates a control diagram for the implementation of the wireless hoist system shown in FIG. 12.

FIGS. 12, 13, and 14 illustrate one example implementation of the wireless hoist system 100 where one or more hoist devices 110 are controlled by the hoist controller 120 to install a workpiece 130. The wireless hoist system 100 additionally includes a level sensor 1200 mounted to the workpiece 130 to measure an angle or orientation of the workpiece 130 with respect to gravitational pull (or ground). In the example illustrated, the hoist controller 120 communicates wirelessly with the first hoist device 110A over a first wireless communication channel 810A, communicates with the second hoist device 110B over a second wireless communication channel 810B, and communicates with the level sensor 1200 over a third wireless communication channel 810C. The level sensor 1200 may include an electronic processor, memory, and transceiver (e.g., each similar to similarly named components of the hoist controller 120), as well as a sensor (e.g., accelerometer, gyroscope, or the like) configured to generate level data and that is in communication with the electronic processor. The electronic processor of the level sensor 1200 may receive level data from the level sensor and communicate the level data to other devices (e.g., the hoist controller 120 or hoist device 110) via the transceiver of the level sensor 1200.

Figure 15:
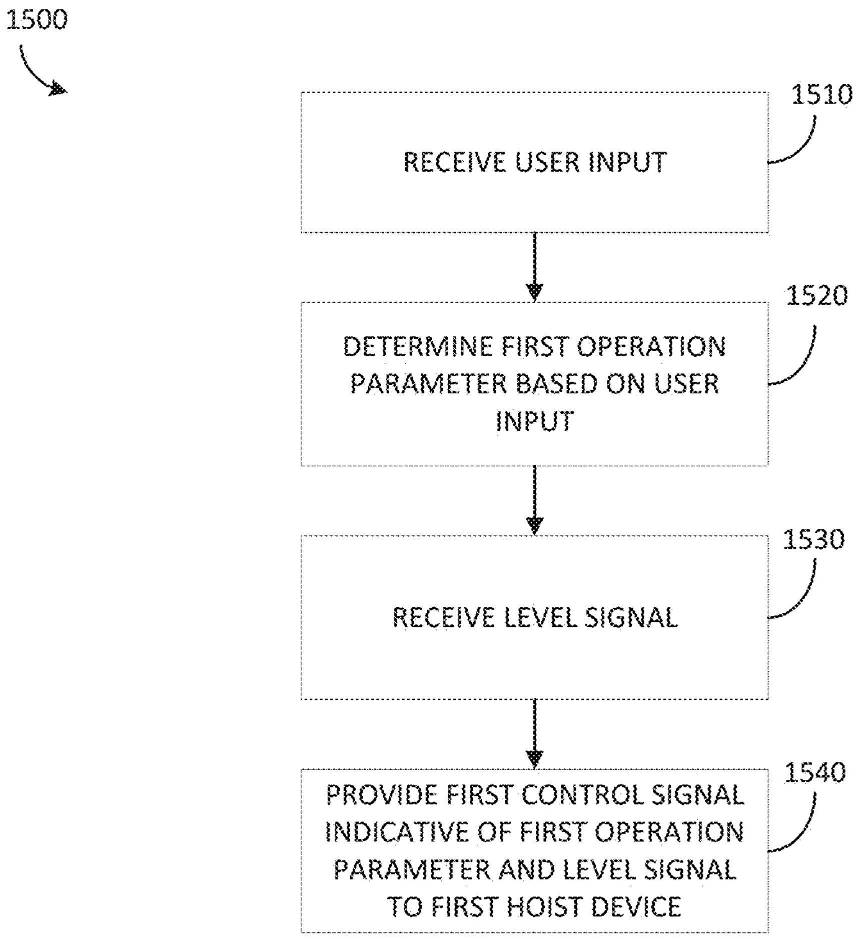
FIG. 15 is a flowchart of a method for operating the wireless hoist system of FIGS. 12-14 in accordance with some embodiments.

FIG. 15 illustrates a flowchart of one example method 1500 of operating the wireless hoist system 100 of FIGS. 12-14. In the example illustrated, the method 1500 includes receiving, at user interface 340 of the hoist controller 120, user input (at block 1510). A user of the wireless hoist system 100 controls the hoist devices 110 using the hoist controller 120. The user provides control inputs to the hoist controller 120 over the user interface 340. For example, the user interface 340 includes a joystick controller and the user moves the joystick controller to produce movements of the workpiece through the hoist devices 110. The user interface 340 may receive user input from the user including several operational parameters for the work to be performed by the wireless hoist system 100. The user input may include a desired movement of the workpiece 130, for example, a direction of movement, a speed of movement, a start point, an end point, or the like of the workpiece 130. The user input may also include a position of the first hoist device 110A, a desired angle of the level 1200, a desired end position of the workpiece 130, and the like.

The method 1500 includes determining, using the controller electronic processor 310, a first operation parameter based on the user input (at block 1520). The first operation parameter may correspond to the operation of the first hoist device 110A and/or the second hoist device 110B. The controller electronic processor 310 receives the user input, for example, the desired movement of the workpiece, the desired angle of the level 1200, the positions of the hoist devices 110 and the workpiece, and determines the operation parameters of the first hoist device 110A and/or the second hoist device 110B based on the user input. For example, the controller electronic processor 310 receives a desired movement of the workpiece as the user input and determines a direction and/or speed of movement and/or chain length of the first chain 115A of the first hoist device 110A and the second chain 115B of the second hoist device 110B. The direction and/or speed of movement and/or chain length of the first chain 115A and the second chain 115B corresponds to the first operation parameter. In another example, the controller electronic processor 310 receives the respective positions of the first hoist device 110A and the second hoist device 110B and the desired end position of the workpiece as the user input and determines the direction and/or speed of movement and/or chain length of the first chain 115A of the first hoist device 110A and/or the second chain 115B of the second hoist device 110B. In this example, the controller electronic processor 310 may also use the respective chain lengths of the first chain 115A and the second chain 115B from the first hoist device 110A and the second hoist device 110B for determining the first operation parameter. For example, the controller electronic processor 310 may determine the initial position of the workpiece based on the positions of the hoist devices 110 and the respective chain lengths. The controller electronic processor 310 finds the distance and direction between the initial position determined above and the desired end position received from the user input. The controller electronic processor 310 uses the distance and direction to calculate the direction and/or speed of movement and/or chain length of the first chain 115A and the second chain 115B.

The method 1500 includes receiving, from the level sensor 1200, the level signal (at block 1530). As described above, the level sensor 1200 measures an angle of the level sensor against the gravitational pull and continuously provides the measured angle to the hoist controller 120. The method 1500 includes providing, wirelessly using the controller electronic processor 310, a first control signal indicative of the first operation parameter and the level signal to the first hoist device 110A (at block 1540). The controller electronic processor 310 provides the control signals that correspond to the first operation parameter and the level signal via the controller transceiver 330 to the first hoist device 110A. The first hoist device 110A receives the first control signal over the hoist transceiver 230 (that is, the first wireless transceiver). The first hoist device 110A operates based on the first control signal. That is, the first hoist device 110A controls the hoist motor 250 (that is, the first motor) of the first hoist device 110A based on the first control signal. For example, the hoist electronic processor 210 of the first hoist device 110A controls the hoist motor 250 of the first hoist device 110A to match the direction, chain length, and/or speed indicated by the first control signal. The first control signal may take into account the desired level angle provided by the user through the user input and indicate the direction, chain length, and/or speed such that the user desired level angle is maintained during the operation. The method 1500 may repeat until the workpiece 130 is installed at the desired location. Additionally, in some embodiments, in addition to providing a first control signal indicative of the first operation parameter and level signal to the first hoist device, in block 1540, the controller 120 may provide a second control signal indicative of a second operation parameter and level signal to the second hoist device 110B using similar principals of operation.

FIG. 14 illustrates another control diagram for the wireless hoist system 100 that may be used to implement the method 1500, as well as additional methods. The diagram of FIG. 14 includes determining, using the controller electronic processor 310, a desired parameter information (for example, a desired angle of the workpiece 130 and a desired speed of operation). The controller electronic processor 310 further provides, via a communication channel, control signals indicating the desired parameter information to the first hoist device 110A and the second hoist device 110B. For the first hoist device 110A, the PID controller 1110 receives the control signals from the hoist controller 120 and the chain length and/or motor speed information from the length/speed sensor 1120 and controls the motor 1130 based on the control signals and the sensor signals to install the workpiece 130. Similarly, for the second hoist device 110B, the PID controller 1140 receives the control signals from the hoist controller 120 and the chain length and/or motor speed information from the length/speed sensor 1150 and controls the motor 1160 based on the control signals and the sensor signals to install the workpiece 130. In some embodiments, rather than receiving the level signal through the hoist controller 120, the first hoist device 110A and/or the second hoist device 110B may communicate directly with the level sensor 1200 over a separate channel to receive the level signal and adjust the operation accordingly.

Figure 16:
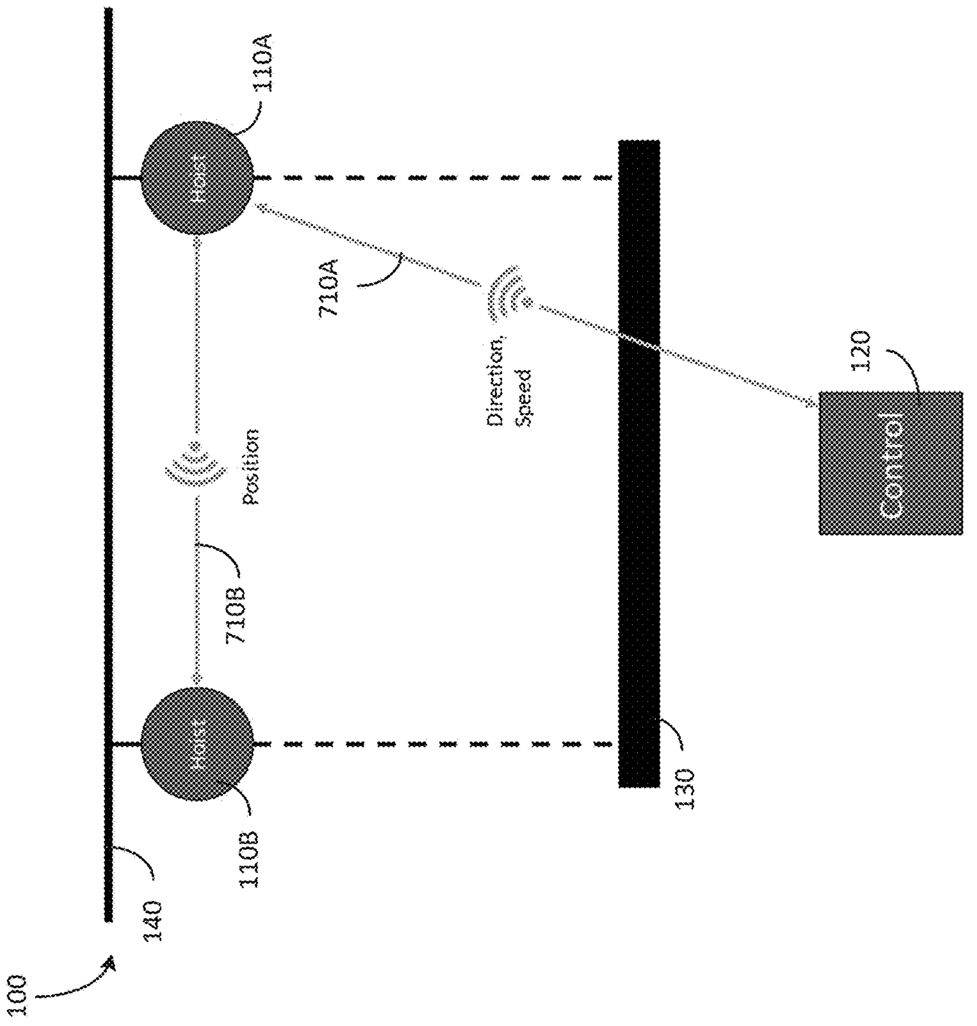
FIG. 16 illustrates an example implementation of the wireless hoist system of FIG. 1 with a hoist controller in communication with a single hoist device in accordance with some embodiments.
Figure 17:
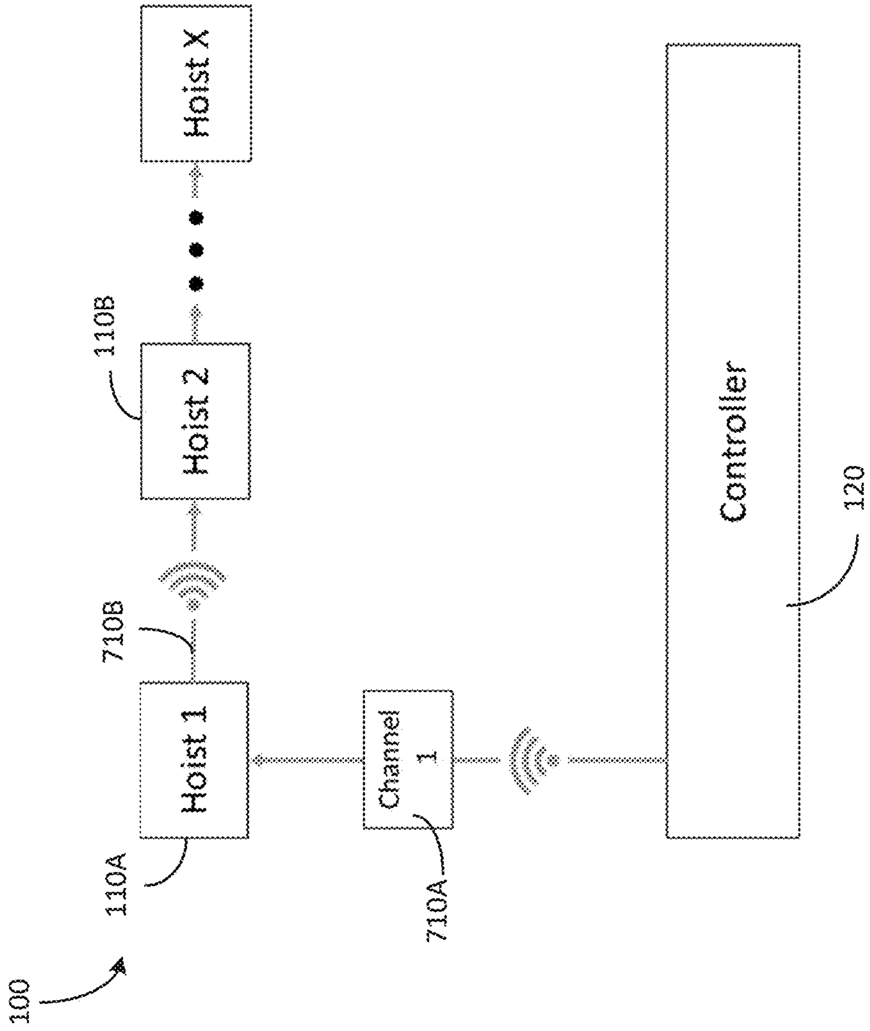
FIG. 17 illustrates a block diagram for the implementation of the wireless hoist system shown in FIG. 16.
Figure 18:
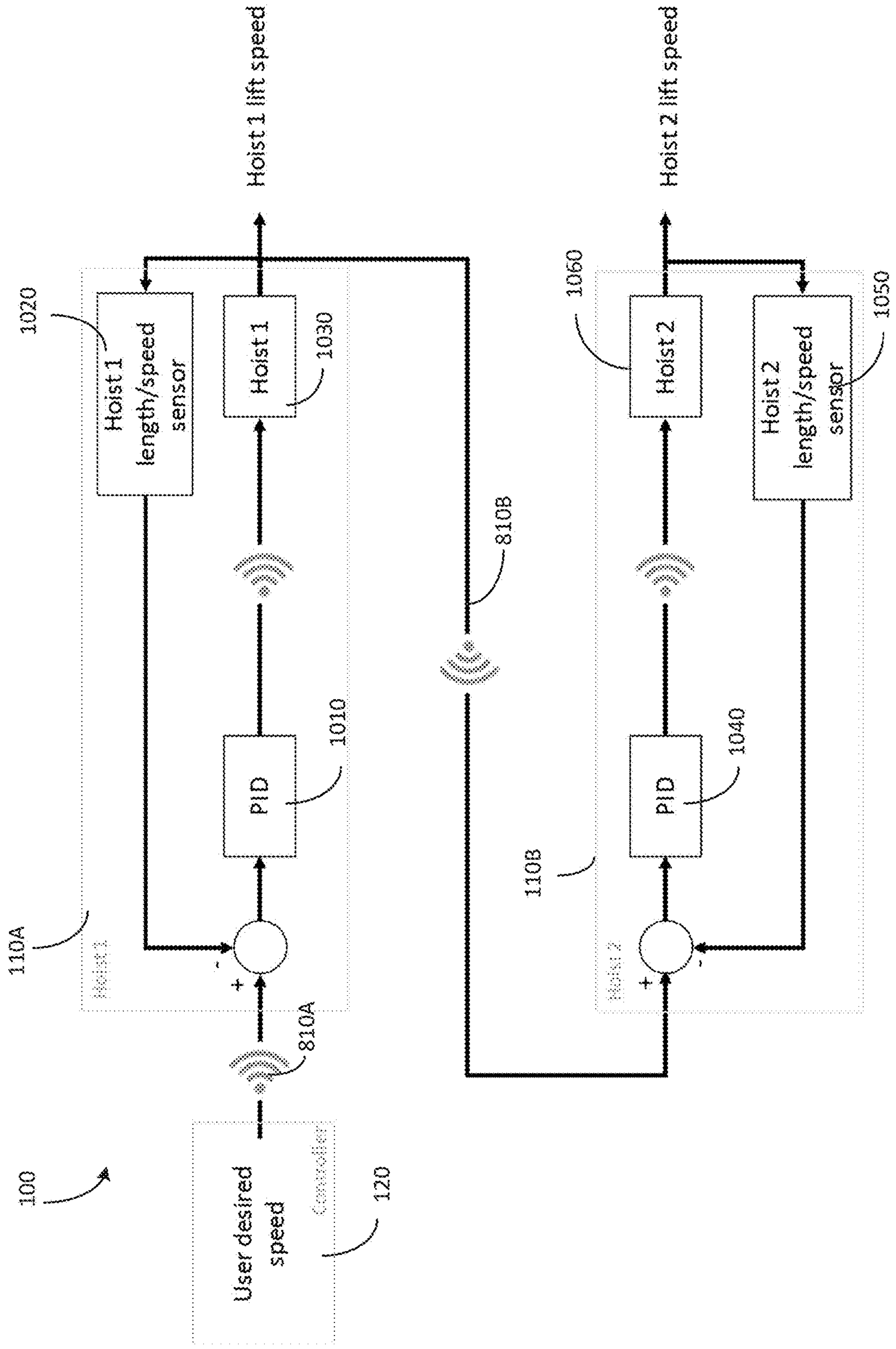
FIG. 18 illustrates a control diagram for the implementation of the wireless hoist system shown in FIG. 16.

FIGS. 16-18 illustrate one example implementation of the wireless hoist system 100 where the hoist controller 120 sends commands to a first hoist device 110 to install a workpiece 130, and the first hoist device 110 relays or generates further commands for at least the second hoist device 110B or provides operational information (e.g., motor speed, chain length) that form that basis for operation of the second hoist device 110B. In the example illustrated, the hoist controller 120 communicates wirelessly with the first hoist device 110A. The first hoist device 110A in turn communicates with the second hoist device 110B to install the workpiece 130. For example, the hoist controller 120 communicates with the first hoist device 110A over a first wireless communication channel 810A and the first hoist device 110A communicates with the second hoist device 110B over a second wireless communication channel 810B.

Figure 19:
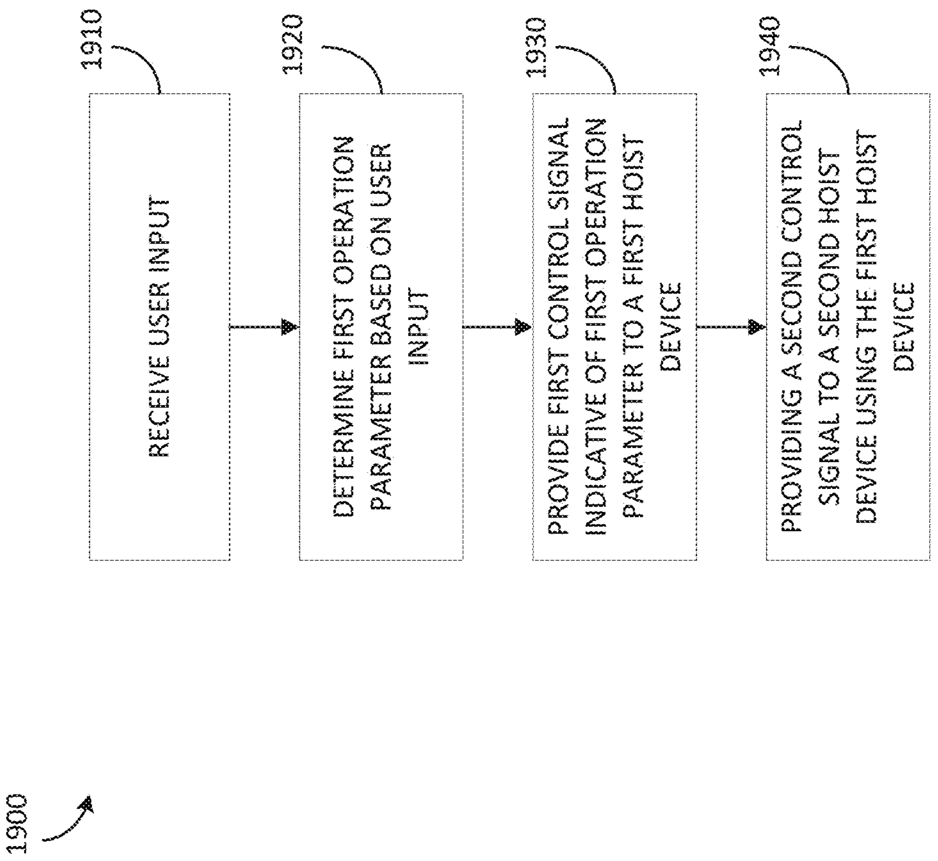
FIG. 19 is a flowchart of a method for operating the wireless hoist system of FIG. 16 in accordance with some embodiments.

FIG. 19 illustrates a flowchart of one example method 1900 of operating the wireless hoist system 100 of FIGS. 16-18. In the example illustrated, the method 1900 includes receiving, at user interface 340 of the hoist controller 120, user input (at block 1910). A user of the wireless hoist system 100 controls the hoist devices 110 using the hoist controller 120. The user provides control inputs to the hoist controller 120 over the user interface 340. For example, the user interface 340 includes a joystick controller and the user moves the joystick controller to produce movements of the workpiece through the hoist devices 110. The user interface 340 may receive user input from the user including several operational parameters for the work to be performed by the wireless hoist system 100. The user input may include a desired movement of the workpiece 130, for example, a direction of movement, a speed of movement, a start point, an end point, or the like of the workpiece 130. The user input may also include a position of the first hoist device 110A, a desired angle of the level 1200, a desired end position of the workpiece 130, and the like.

The method 1900 includes determining, using the controller electronic processor 310, a first operation parameter based on the user input (at block 1920). The first operation parameter may correspond to the operation of the first hoist device 110A. The controller electronic processor 310 receives the user input, for example, the desired movement of the workpiece, the desired angle of the level 1200, the positions of the hoist devices 110 and the workpiece, and determines the operation parameter of the first hoist device 110A based on the user input. For example, the controller electronic processor 310 receives a desired movement of the workpiece as the user input and determines a direction and/or speed of movement and/or chain length of the first chain 115A of the first hoist device 110A. The direction and/or speed of movement and/or chain length of the first chain 115A corresponds to the first operation parameter. In another example, the controller electronic processor 310 receives the respective positions of the first hoist device 110A and the second hoist device 110B and the desired end position of the workpiece as the user input and determines the direction and/or speed of movement and/or chain length of the first chain 115A of the first hoist device 110A and/or the second chain 115B of the second hoist device 110B. In this example, the controller electronic processor 310 may also use the respective chain lengths of the first chain 115A and the second chain 115B from the first hoist device 110A and the second hoist device 110B for determining the first operation parameter. For example, the controller electronic processor 310 may determine the initial position of the workpiece based on the positions of the hoist devices 110 (e.g., received in a set up stage) and the respective chain lengths (determined by respective sensors 260 of the hoist devices 110). The controller electronic processor 310 finds the distance and direction between the initial position determined above and the desired end position received from the user input. The controller electronic processor 310 uses the distance and direction to calculate the direction and/or speed of movement and/or chain length of the first chain 115A.

The method 1900 includes providing, wirelessly using the controller electronic processor 310, a first control signal indicative of the first operation parameter to the first hoist device 110A (at block 1930). The controller electronic processor 310 provides the control signals that correspond to the first operation parameter via the controller transceiver 330 to the first hoist device 110A. The first hoist device 110A receives the first control signal over the hoist transceiver 230 (that is, the first wireless transceiver). The first hoist device 110A operates based on the first control signal. That is, the first hoist device 110A controls the hoist motor 250 (that is, the first motor) of the first hoist device 110A based on the first control signal. For example, the hoist electronic processor 210 of the first hoist device 110A controls the hoist motor 250 of the first hoist device 110A to match the direction, chain length, and/or speed indicated by the first control signal.

The method 1900 also includes providing, wirelessly using the first hoist device 110A, a second control signal to the second hoist device 110B (at block 1940). The hoist electronic processor 210 provides the second control signal based on the first control signal via the hoist transceiver 230 to the first hoist device 110A to the second hoist device 110B. The second hoist device 110B receives the second control signal over the hoist transceiver 230 (that is, the second wireless transceiver). The first hoist device 110A determines, for example, a second operation parameter as described in the method 700 that corresponds to the operation of the second hoist device 110 based on the first control signal received from the hoist controller 120. The second hoist device 110B operates based on the second control signal. That is, the second hoist device 110B controls the hoist motor 250 (that is, the second motor) of the second hoist device 110B based on the second control signal. For example, the hoist electronic processor 210 of the second hoist device 110B controls the hoist motor 250 of the second hoist device 110B to match the direction, chain length, and/or speed indicated by the second control signal.

As shown in the control diagram of FIG. 18, some embodiments of the wireless hoist system 100 include determining, using the controller electronic processor 310, desired parameter information. For example, the user may input a desired speed and position information into the hoist controller 120 using the user interface 340. The method also includes providing, using the controller electronic processor 310 via the first communication channel 810A, control signals indicating the desired parameter information to the first hoist device 110A. The PID controller 1110 of the first hoist device 110A receives the control signals from the hoist controller 120 and the chain length and/or motor speed information from the length/speed sensor 1120 (for example, the one or more hoist sensors 260 of the first hoist device 110A) and controls the motor 1130 (for example, the motor 250 of the first hoist device 110A) based on the control signals and the sensor signals to install the workpiece 130.

The first hoist device 110A also provides, using the hoist electronic processor 210A, a speed of the first hoist device 110A to the second hoist device 110B. The first hoist device 110A communicates with the second hoist device 110B over the second wireless communication channel 810B to provide the speed information to the second hoist device 110B. The PID controller 1140 of the second hoist device 110B receives the speed information from the first hoist device 110A and the chain length and/or motor speed information from the length/speed sensor 1150 (for example, one or more hoist sensors 260 of the second hoist device 110B) and controls the motor 1160 (for example, the motor 250 of the second hoist device 110B) based on the speed signals and the sensor signals to install the workpiece 130. In some embodiments, if the speed or acceleration exceeds a predetermined maximum value, the hoist controller 120 may stop operation of the hoist device. Examples of the predetermined threshold may be 20% above a normal operating value. However, threshold values of more than 20% or less than 20% are also contemplated.

While some of the embodiments are described herein with respect to a single (first) hoist device 110 or with respect to a first and second hoist device 110, in some embodiments, two, three, or more hoist devices 110 are included. For example, the wireless hoist system 100 may include a third hoist device 110. Continuing the method 700, the controller electronic processor 310 also determines a third operation parameter based on the user input (at block 720), and the method 700 further includes providing a third control signal indicative of the third operation parameter to the third hoist device 110. Turning to the method 1900, with a third hoist device, an additional block may be included (e.g., after block 1940) in which a third control signal is provided to the third hoist device using the first (or second) hoist device 110. The third hoist device 110 operates based on the third control signal. In these embodiments, the hoist controller 120 communicates with the first hoist device 110A over a first wireless channel 810, the first hoist device 110A communicates with the second hoist device 110B over a second wireless channel 810B (as previously described), and the first hoist device 110A (or the second hoist device 110B) communicates with the third hoist device 110 over a third wireless communication channel 810C. As another example, the method 1500 may also operate with a third hoist device 110, in which the third hoist device 110 operates with the first and second hoist devices 110 and level 1400 similar to the manner in which the second hoist device 110 is described as operating with the first hoist device 110 and level 1400.

Figure 20:
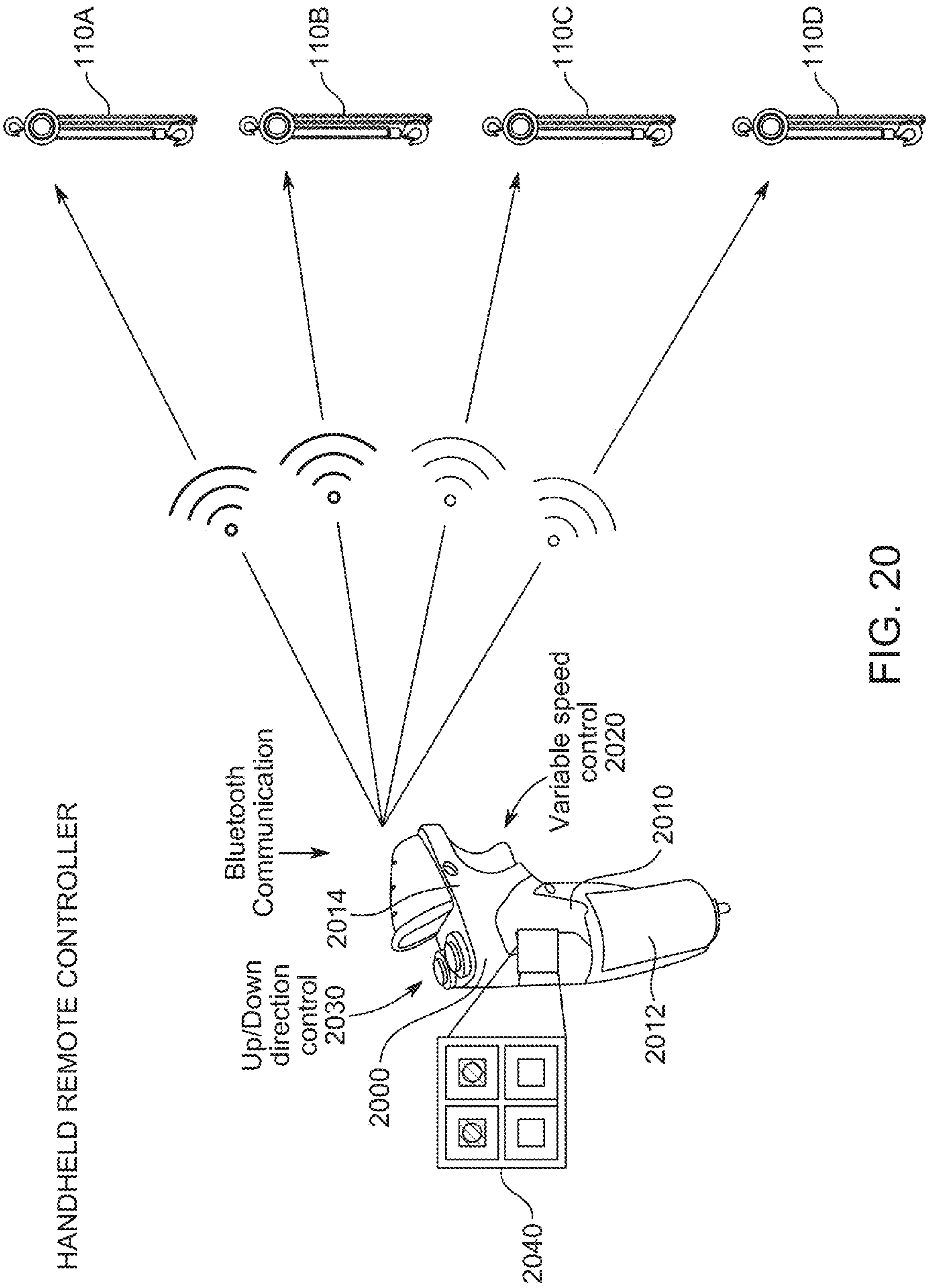
FIG. 20 illustrates a wireless hoist system including a handheld remote controller in accordance with some embodiments.

FIG. 20 illustrates a handheld remote controller 2000 that may be used as the controller 120 in the various hoist systems described herein. In the example illustrated, the handheld remote controller 2000 includes a housing 2010, a variable speed trigger 2020, direction control pushbuttons 2030, and a communication channel pushbutton matrix 2040. The handheld remote controller 2000 is in the form of a joystick remote such as that used in flight simulators and video game controller. The handheld remote controller 2000 may communicate with one or more hoist devices 110 using one or more communication protocols (for example, Bluetooth®, ZigBee®, and the like).

The housing 2010 may be an elongated tubular housing that includes grip portion 2012 and a top portion 2014. The variable speed trigger 2020 is provided on the top portion 2014 just above the grip portion 2012. The direction control pushbuttons 2030 are provided on top of the top portion 2014. The grip portion 2012 and the top portion 2014 are arranged and sized such that a user holding the handheld remote controller 2000 using the grip portion 2012 may use the index finger to pull or release the variable speed trigger 2020 and may use the thumb to push the direction control pushbuttons 2030 provided on the top portion 2014. Accordingly, the handheld remote controller 2000 is designed for single-handed user operation.

The variable speed trigger 2020 is used to control a speed of operation of the hoist devices 110. Particularly, the speed of the hoist devices varies from zero to a maximum speed, where the maximum speed corresponds to a maximum pulling amount of the variable speed trigger 2020. The speed of the hoist devices 110 is therefore controlled by varying the pulling amount of the variable speed trigger 2020. The variable speed trigger 2020 includes a body with a spring biased member such that the user can pull the variable speed trigger 2020 from an original position by asserting pressure on the variable speed trigger 2020 and the trigger 2020 returns to the original position when the user releases the variable speed trigger 2020. In some embodiments, a sense pad and wiper are provided in the handheld remote controller 2000 to determine a pulling amount of the variable speed trigger 2020. The wiper is attached to the variable speed trigger 2020 such that the wiper moves with the variable speed trigger 2020 on the sense pad. The resistance of the sense pad changes based on the position of the wiper on the sense pad. This resistance of the sense pad is detected by the controller electronic processor 310 to determine the pulling amount of the trigger. In other embodiments, a Hall-sensor design or an optical sensor design may be used to determine the pulling amount of the variable speed trigger 2020.

In some embodiments, the variable speed trigger 2020 is configured to prevent a "lock on" condition, such as where the trigger becomes stuck in a position, resulting in a user being unable to disengage a previously commanded operation. In some examples, the variable speed trigger (or other inputs on the remote controller 2000) may be contaminated by debris, tolerance, or misuse. In some embodiment, rubber boots or other protective coverings may be added to the variable speed trigger 2020 or other inputs on the remote controller 2000, which can provide protection from contaminants, as well as mechanical wear.

The remote controller 2000 may further include one or more devices to reduce accidental operation of the remote controller 2000. These devices may include kill switches, trigger/actuator guards, and double and/or triple activation triggers/switches/hand sensors. Double/triple activation triggers/switches/hand sensors are configured to require multiple operations by a user to generate a command. For example, a user may have to depress a grip sensor on the remote controller 2000 as well as depress the variable speed trigger 2020 to effectuate the desired output. Example grip sensors may include capacitive sensors, pressure sensors, etc. In other embodiments, an accelerometer may be used to detect a motion in conjunction with an operation of an input, such as via the variable speed trigger 2020, which can be used as an additional input.

The remote controller 2000 may further include safety inputs such as a kill switch or emergency stop button to stop all movement of the hoist device 110. In one embodiment, the remote controller 2000 (and/or the hoist device) may include microphone or other audio input configured to recognize a vocal command or indicator related to stopping operation of the hoist device 110. For example, the audio input may be configured to recognize a yell/raised voice/loud noise and stop the operation of the hoist device. In some examples, environmental sounds, such as transient noises, scraping noises, or other sounds indicating undesired operation and or potential interference with the load may also be determined via the audio input. In one embodiment, a controller of the remote controller 2000 (such as described below) may be configured to process the audio input. In other embodiments, the hoist controller 120 is configured to process the audio input. In one embodiment, additional safety sensors, such as pinch sensors, may be placed onto the workpiece 130 which can output a signal to the remote controller 2000 and/or hoist controller 120. For example, a person guiding the workpiece into position may activate the pinch sensor by applying a force in order to stop movement of the hoist system 100. In other examples, the pinch sensor may be actuated if the workpiece 130 comes into contact with an object, and thereby stops operation of the hoist device 110.

The direction control pushbuttons 2030 are used to control a direction of operation of the hoist devices 110. The direction control pushbuttons 2030 include an up direction pushbutton 2030A and a down direction push button 2030B. The user may press down on one of the direction control pushbuttons 2030 to select a direction of operation of the hoist devices 110. In one embodiments, a user may be required to keep one of the direction control pushbuttons 2030 to be pressed down for the duration of operation of the hoist device 110. For example, the user may be required to actuate both a direction control pushbutton 2030 and the variable speed trigger 2020 to operate the hoist device 110. In this embodiments, the release of either the direction control pushbutton 2030 or the variable speed trigger 2020 may stop the operation of the hoist devices 110. In other embodiments, the user may press the direction control pushbutton 2030 at the start of the operation and the hoist devices 110 are operated in the selected direction without needing continuous actuation of the direction control pushbutton 2030.

In one embodiment, the hoist controller 120 is configured to receive commands from the remote controller 2000. The hoist controller 120 may be configured with one or more safety interlocks to prevent undesired operation of the hoist device. For example, the hoist controller may be configured to monitor one or more electronic signals from the remote controller 2000 and verify that the electronic signals (e.g. commands) are valid and within specification. In some embodiments, in response to determining that the electronic signals are not valid, the hoist controller 120 does not execute the requested command associated with the received signal. Where the hoist controller 120 is executing a command (e.g. moving a load up or down, etc.) and receives a subsequent electronic signal from the remote controller 2000 that is determined to be invalid, the hoist controller 120 stops the current operation and waits for a further valid electronic signal from the remote controller 2000 that is determined to be valid. Similarly, in some examples, the remote controller 2000 is configured to transmit redundant signals for all commands input by a user. The hoist controller 120 may be configured to monitor for the redundant command signals from the remote controller 2000, and stop a current operation and/or prevent the commanded operation where the redundant signals are not valid. The hoist controller 120 may determine that redundant commands are invalid based on receiving only one of the two redundant signals and/or receiving different commands for each of the redundant commands.

In other examples, the hoist controller 120 is configured to provide one or more safety interlocks related to commands received from a remote source, such as remote controller 2000. For example, when a command has been received by the hoist controller (such as UP or DOWN), the hoist controller will perform that operation only for as long as the command is issued. For example, if the hoist controller 120 receives an UP command the hoist controller 120 commands the hoist to raise the load up. If an issue is encountered, such as a mechanical issue, loss of power, loss of communication with remote controller 2000, etc., the hoist controller 120 will stop the operation. However, as the last valid received command was an UP command, the hoist controller will prevent the load from being lowered (e.g. a DOWN operation). Similarly, if the last command received was a DOWN command, the hoist controller 120 will either operate the hoist device 110 in a DOWN mode, or stop operation in the event of an issue, but will not allow for an UP operation to be executed until a valid UP command is received.

The communication channel pushbutton matrix 2040 may include a plurality of communication channel pushbuttons each corresponding to one communication channel of the handheld remote controller 2000. Each communication channel may be programmed to communicate with a single hoist device 110. In the example illustrated, the communication channel pushbutton matrix includes four communication channel pushbuttons to communicate with four separate hoist devices 110 (individually identified as 110A-D). The user may select one or more hoist devices 110 for control by the handheld remote controller 2000 by pressing the corresponding communication channel pushbutton. In the example illustrated, the user selected a first communication channel pushbutton 2040A and a second communication channel pushbutton 2040B for simultaneous control of a first hoist device 110A and a second hoist device 110B corresponding to the first communication channel pushbutton 2040A and the second communication channel pushbutton 2040B. Each communication channel pushbutton may also including a light indicator (e.g., an LED) to illuminate to indicate that the communication channel pushbutton is selected. In one embodiment, a communication channel pushbutton illuminates to indicate that the communication channel pushbutton is selected and is not illuminated when the communication channel pushbutton is not selected. In another embodiments, a communication channel pushbutton is illuminated in a first color (e.g., green) to indicate the communication channel pushbutton is selected and is illuminated in a second color (e.g., red) different that the first color to indicate that the communication channel pushbutton is not selected.

Figure 21:
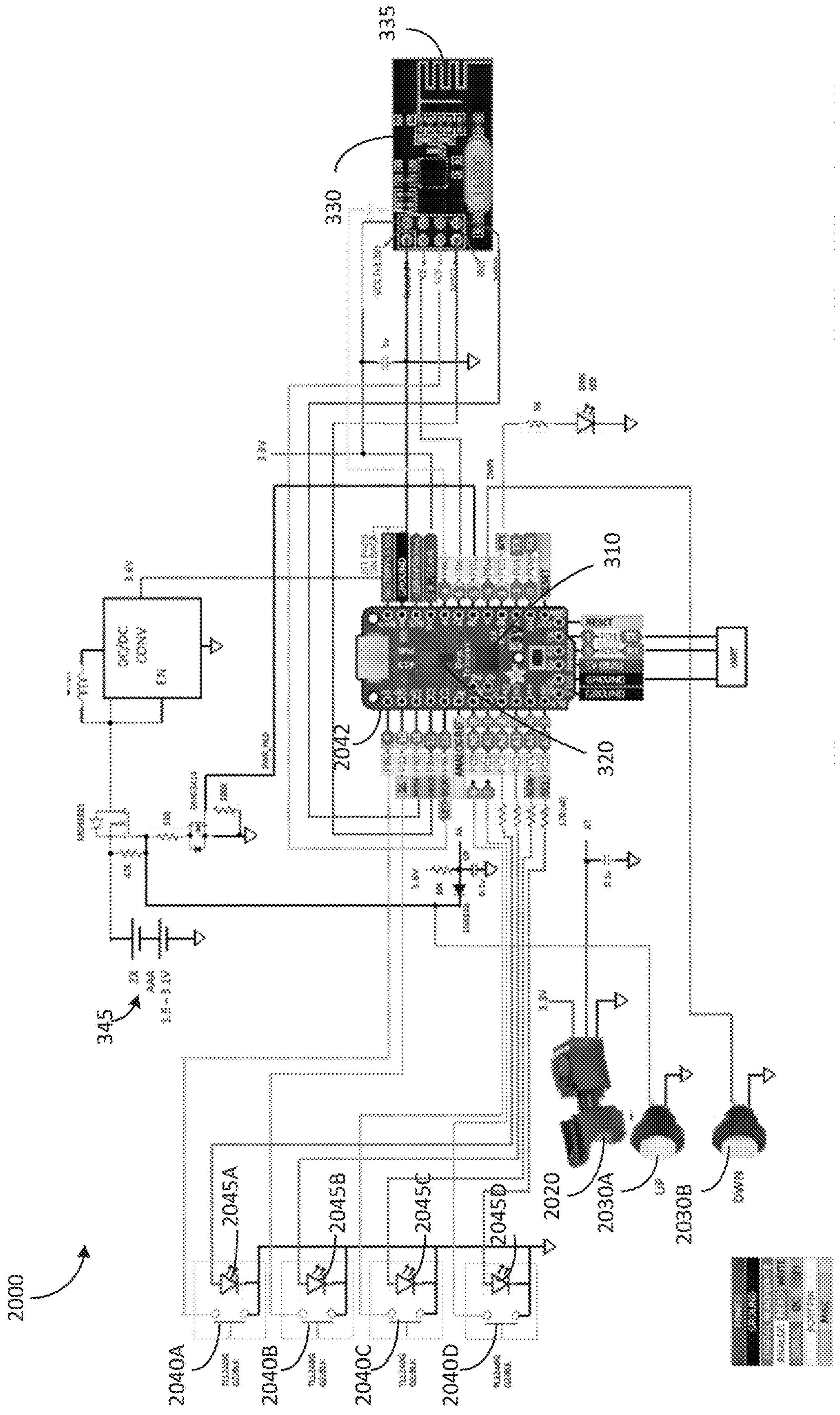
FIG. 21 is a schematic of the handheld remote controller of FIG. 20 in accordance with some embodiments.

FIG. 21 illustrates a schematic of the handheld remote controller 2000. In the example illustrated, the handheld remote controller 2000 includes the controller power source 345, an electronic controller 2042 (including the controller electronic processor 310 and the controller memory 320), the controller transceiver 330, the variable speed trigger 2020, the direction control pushbuttons 2030, and the communication channel pushbutton matrix 2040. The power source 345 is, for example, one or more AAA batteries that are inserted into the housing 2010 of the handheld remote controller 2000. The power source 345 provides operating power for the electrical components of the handheld remote controller 2000.

The controller transceiver 330 is, for example, a Bluetooth® chip, a radio-frequency (RF) transceiver chip, and the like. The controller transceiver 330 includes an antenna 335 for transmitting and receiving signals from the hoist devices 110. The controller transceiver 330 is coupled to the controller electronic processor 310 to receive control signals from the controller electronic processor 310 for transmission and for providing signals from the hoist devices 110 to the controller electronic processor 310.

The variable speed trigger 2020 is coupled to the controller electronic processor 310 to provide speed control signals to the controller electronic processor 310. As described above, the variable speed trigger 2020 provided an indication of the amount to which the variable speed trigger 2020 is pulled to the controller electronic processor. The direction control pushbuttons 2030 are coupled to the controller electronic processor 310 to provide actuation signals to the controller electronic processor 310.

For example, the first direction control pushbutton 2030A provides a signal when the first direction control pushbutton 2030A is pressed and does not provide any signal when the first direction control pushbutton is not pressed. The first direction control pushbutton 2030A may continue to provide the signal as long as the first direction control pushbutton 2030A remains pressed. In one example, when the first direction control pushbutton 2030A is pressed, the first direction control pushbutton 2030A closes a circuit forming a current path from the controller electronic processor 310 to ground and drawing a current from the controller electronic processor 310. When the controller electronic processor 310 detects that a current is being drawn from the port connected to the first direction control pushbutton 2030A, the controller electronic processor 310 determines that the first direction control pushbutton 2030A is pressed. When the first direction control pushbutton 2030A is released, the circuit is opened terminating the current draw from the controller electronic processor 310.

Similarly, the second direction control pushbutton 2030B provides a signal when the second direction control pushbutton 2030B is pressed and does not provide any signal when the second direction control pushbutton is not pressed. The second direction control pushbutton 2030B may continue to provide the signal as long as the second direction control pushbutton 2030B remains pressed. In one example, when the second direction control pushbutton 2030B is pressed, the first direction control pushbutton 2030B closes a circuit forming a current path from the controller electronic processor 310 to ground and drawing a current from the controller electronic processor 310. When the controller electronic processor 310 detects that a current is being drawn from the port connected to the first direction control pushbutton 2030B, the controller electronic processor 310 determines that the first direction control pushbutton 2030A is pressed. When the second direction control pushbutton 2030B is released, the circuit is opened terminating the current draw from the controller electronic processor 310. In the example illustrated, the first direction control pushbutton 2030A corresponds to UP and the second direction control pushbutton 2030B corresponds to DOWN.

The communication channel pushbutton matrix 2040 is coupled to the controller electronic processor 310 to provide control signals to the controller electronic processor 310. The communication channel pushbutton matrix 2040 includes four communication channel pushbuttons 2040A, 2040B, 2040C, 2040D. The communication channel pushbuttons operate similar as the direction control pushbuttons 2030A as described above. However, at least in some embodiments, the communication channel pushbuttons are toggle switches such that the communication channel pushbuttons can be pressed once to turn a communication channel on and once to turn the communication channel off. That is, the communication channel pushbuttons need not be pressed continuously.

The communication channel pushbutton matrix 2040 also includes a plurality of indicators 2045A, 2045B, 2045C, 2045D corresponding to the four communication channel pushbuttons. The plurality of indicators receive control signals from the controller electronic processor 310. In some embodiments, an indicator is illuminated or its color is changed (e.g., red to green) when a corresponding one of the communication channel pushbutton is activated.

Figure 22:
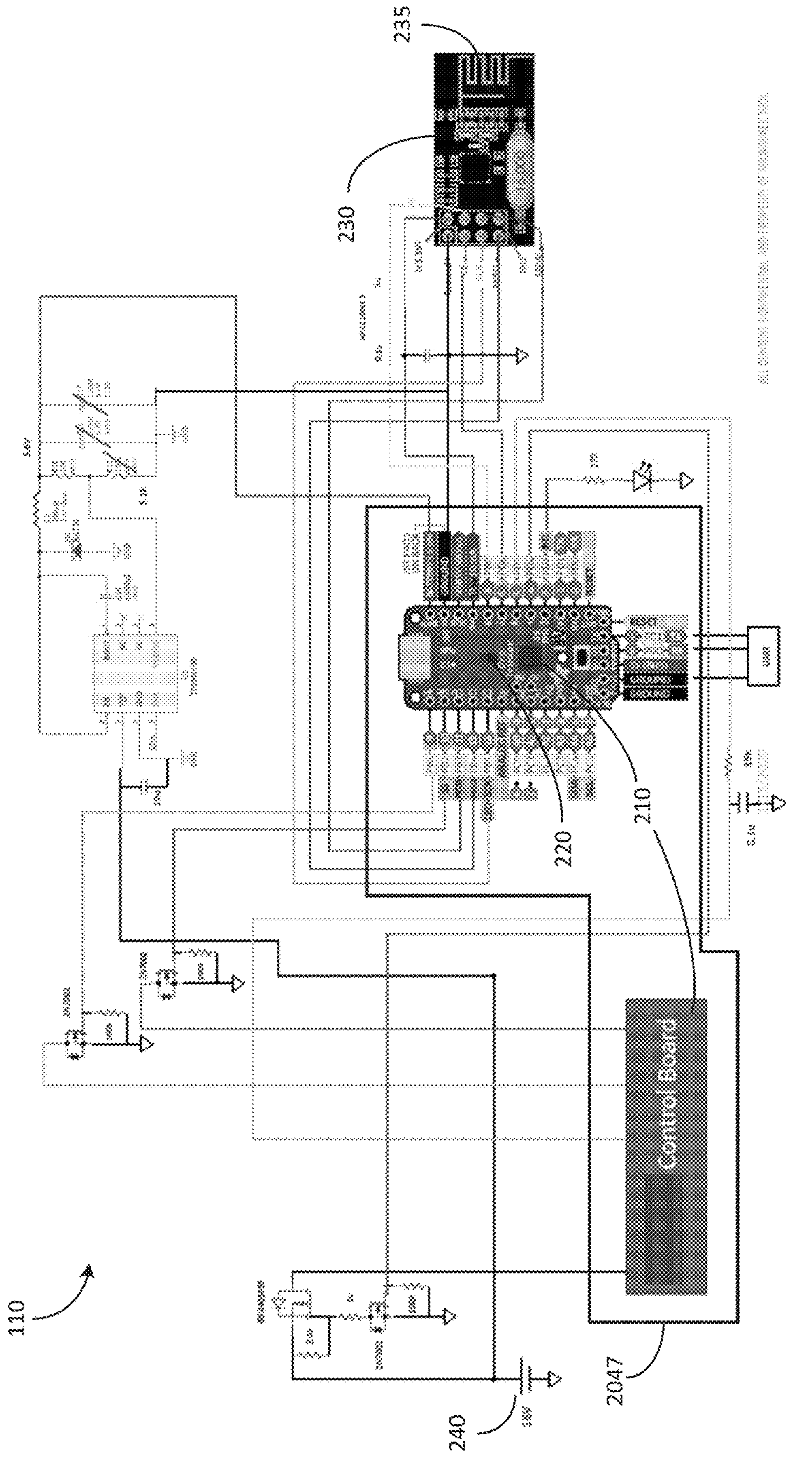
FIG. 22 is a schematic of a hoist device of the wireless hoist system of FIG. 20 in accordance with some embodiments.

FIG. 22 illustrates a schematic of the hoist device 110. In the example illustrated, the hoist device 110 includes the hoist power source 240, a hoist electronic controller 2047 (including the hoist electronic processor 210 and the hoist memory 220), and the hoist transceiver 230. The power source 345 is, for example, a power tool battery pack that includes a terminal block and couples to a terminal block on a housing of the hoist device 110. The power source 345 provides operating power for the electrical components of the hoist device 110, including the motor 250 (not shown in FIG. 22). Although the hoist electronic controller 2047 is illustrated as including two control boards in FIG. 22, in some embodiments, the hoist electronic controller 2047 is a single control board including the hoist electronic processor 210 and the hoist memory 220. For ease of description, the processors of the control boards of the hoist electronic controller 2047 will be collectively referred to as the hoist electronic processor 210.

The hoist transceiver 230 is, for example, a Bluetooth® chip, a radio-frequency (RF) transceiver chip, and the like. The hoist transceiver 230 includes an antenna 235 for transmitting and receiving signals from the handheld remote controller 2000. The hoist transceiver 230 is coupled to the hoist electronic processor 210 to receive signals from the hoist electronic processor 210 for transmission and for providing control signals from the handheld remote controller 2000 to the hoist electronic processor 210.

Referring back to FIG. 20, each communication channel pushbutton may be programmed to communicate with a single hoist device 110. Particularly, a Bluetooth® address or a radio-frequency address of each hoist device 110 may be hard coded into the controller electronic processor 310 (e.g., permanently or semi-permanently stored in the hoist memory 220) and associated with the corresponding one of the communication channel pushbutton. Each coded hoist device 110 may only be activated when the corresponding communication channel pushbutton is pressed and the corresponding LED is illuminated. Selecting more than one hoist device 110 allows for each of the selected hoist devices 110 to be controlled simultaneously with the handheld remote controller 2000. Additionally, as further discussed above, the activated hoist devices 110 may communicate with each other to coordinate movement of a workpiece 130. In some embodiments, for added safety, the hoist devices 110 may be configured to stop operation when no signals are received from the handheld remote controller 2000.

In some embodiments, rather than being hardcoded, each communication channel pushbutton may be paired on-the-fly with a hoist device 110. The pairing operation may be performed similar to Bluetooth® pairing or other RF communication protocol pairing. This allows for additional flexibility in the system by allowing a user to use the same handheld remote controller 2000 with several hoist devices 110. Additionally, a lost or broken handheld remote controller 2000 may be easily replaced by pairing a new handheld remote controller 2000 with the hoist devices 110.

In some embodiments, each hoist devices 110 may be paired with only one handheld remote controller 2000 at a time. For example, each hoist device may be store only one active address of a handheld remote controller 2000 at a time. Accordingly, the hoist device 110 can avoid receiving multiple control signals or conflicting control signals from different handheld remote controllers 2000 at the same time.

Figure 23:
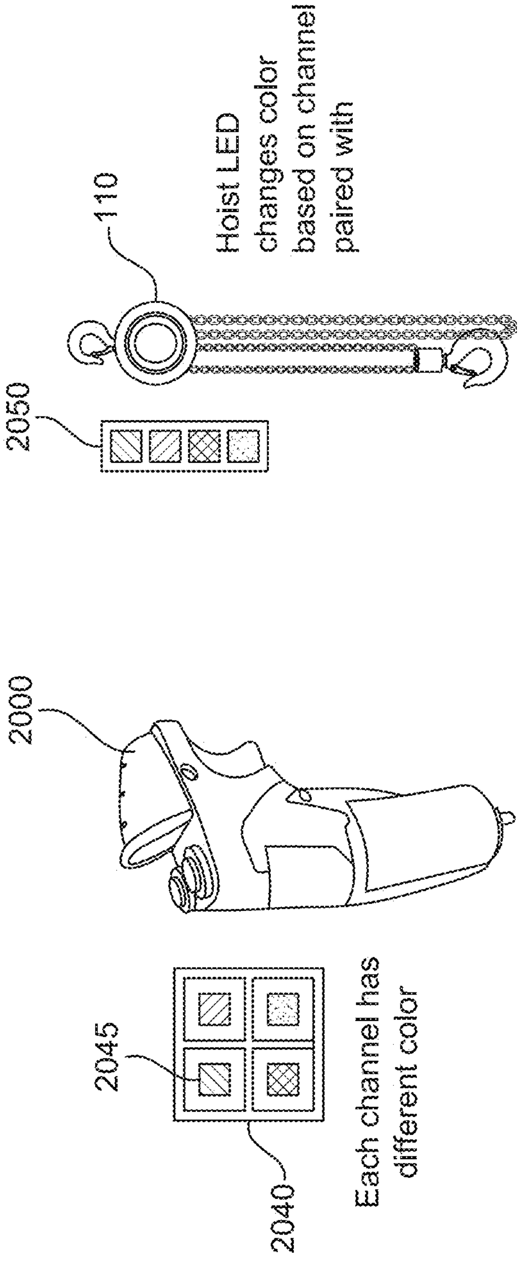
FIG. 23 illustrates an indication system of the wireless hoist system of FIG. 20 in accordance with some embodiments.

In some embodiments, each indicator 2045 associated with communication channel pushbutton may illuminate in a different color (e.g., one of red, blue, yellow, and green). The hoist device 110 may include similar indicators 2050 on the device. Referring to FIG. 23, when a hoist device 110 is successfully paired with a communication channel pushbutton, the indicator 2045 corresponding to the communication channel pushbutton and the indicator 2050 on hoist device 110 may illuminate with the same color. This allows a user to easily identify the correspondence between each communication channel pushbutton and the hoist devices 110.

In some embodiments, the controller transceiver 330 may be configured to transmit on unique frequencies that are not associated with other devices within a certain range of the hoist device 110. In one embodiment, the controller transceiver 330 is configured to listen for other signal operating at or near the operating frequency of the remote controller 2000 and/or hoist devices 110, and perform an action if a potential interfering signal is detected. In one embodiment, the controller transceiver 330 may stop operation and generate an alert to a user indicating that the operating frequency is in use by other devices. The user may then change the operating frequency of the controller transceiver 330, or the user may disable the interfering device (or modify the operating frequency thereof). In other embodiments, the controller transceiver may automatically switch to a different frequency that is different from the interfering frequency. For example, the controller transceiver 330 may use frequency hopping whenever interference is detected. Further the controller transceiver 330 may also control the other wireless transceivers associated with the hoist devices 110 to switch frequencies accordingly.

In one embodiment, the controller transceiver 330 is configured to pair with the one or more hoist devices 110 using an encrypted communication protocol to prevent other devices from interfering with the communications between the remote controller 2000 and the hoist devices 110. Additionally, as described above, the hoist controller 120 may perform redundant checks of the commands received from the remote controller 2000 to ensure the commands are valid. In other examples, the controller transceiver 330 is configured to send multiple signals (either redundant or dissimilar), which are checked by the by the hoist controller 120 for accuracy and verification before executing the command.

In other examples, the controller transceiver 330 and/or the hoist controller 120 performs time based signal quality and/or accuracy checks of all received signals. The time based signal checks evaluate signals over a period of time to verify that the signals are acceptable and verifiable. This can aid in discriminating between noise and actual signals. In other embodiments, the receiving device (i.e. the controller transceiver 330 and/or the hoist controller 120) may evaluate a strength of the received signal, and only execute a command associated with the received signal based on the signal strength being above as signal strength threshold. In one embodiment, the controller transceiver 330 and/or the hoist controller 120 may use received signal strength-based location determination algorithms (RSSI) and will only execute commands with the associated received signals are within a threshold distance. In a further embodiment, the controller transceiver 330 may be configured to only interface with the hoist controller 120 via line of sight communications, such as infrared (IR) or other line of sight communication protocols.

Referring to FIGS. 21 and 22, the hoist devices 110 provide indications of speed, direction, and load to each other simultaneously operated hoist device 110 as well as to the handheld remote controller 2000. Referring to FIGS. 4A-4C, the speed and load information may be used to move a workpiece 130 in unison as further described below. Referring to FIG. 5, the speed and load information may also be used such that each hoist device 110 moves at a different speed and direction to move a workpiece 130 from a first location to a second location.

Figure 24:
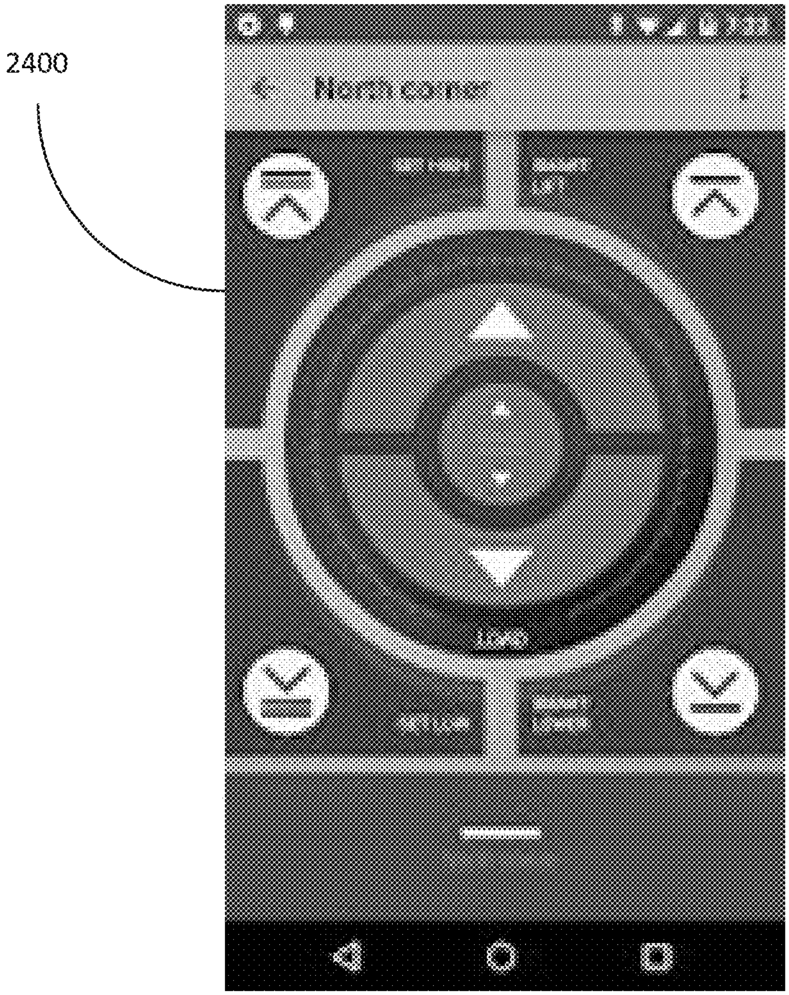
FIG. 24 is a graphical user interface of a smart telephone used as the handheld remote controller of FIG. 20 in accordance with some embodiments.

In some embodiments, a smart telephone may also be used in place of or in addition to the handheld remote controller 2000. FIG. 24 illustrates a user interface 2400 on the smart telephone that allows for operation of the connected hoist devices. In the example illustrated, the user interface 2400 is provided on a touch screen such that different portions or different pages of the touch screen form different user input (for example, a variable speed trigger 2020, direction control pushbuttons 2030, and communication channel pushbutton matrix 2040). In some embodiments, the smart telephone is configured to communicate with the hoist device 110 to configure the hoist device 110, to retrieve operational data (e.g., logged data indicating usage, faults, and the like), and to transmit operational data and location information related to the hoist device 110 to a remote server. The location information may be determined from a GPS receiver on-board the smart phone, and attached to the operational information and identity of the hoist device when being sent to the remote server. Because the smart phone is communicating with the hoist device 110 via a local, short-range wireless communication protocol, the location information of the smart phone is an acceptable stand-in as a location of the hoist device 110. The remote server may, in turn, provide the received information to another client device (e.g., another smart phone or a personal computer) such that location and operational data related to a fleet of hoist devices 110 may be tracked and monitored.

Figure 25A:
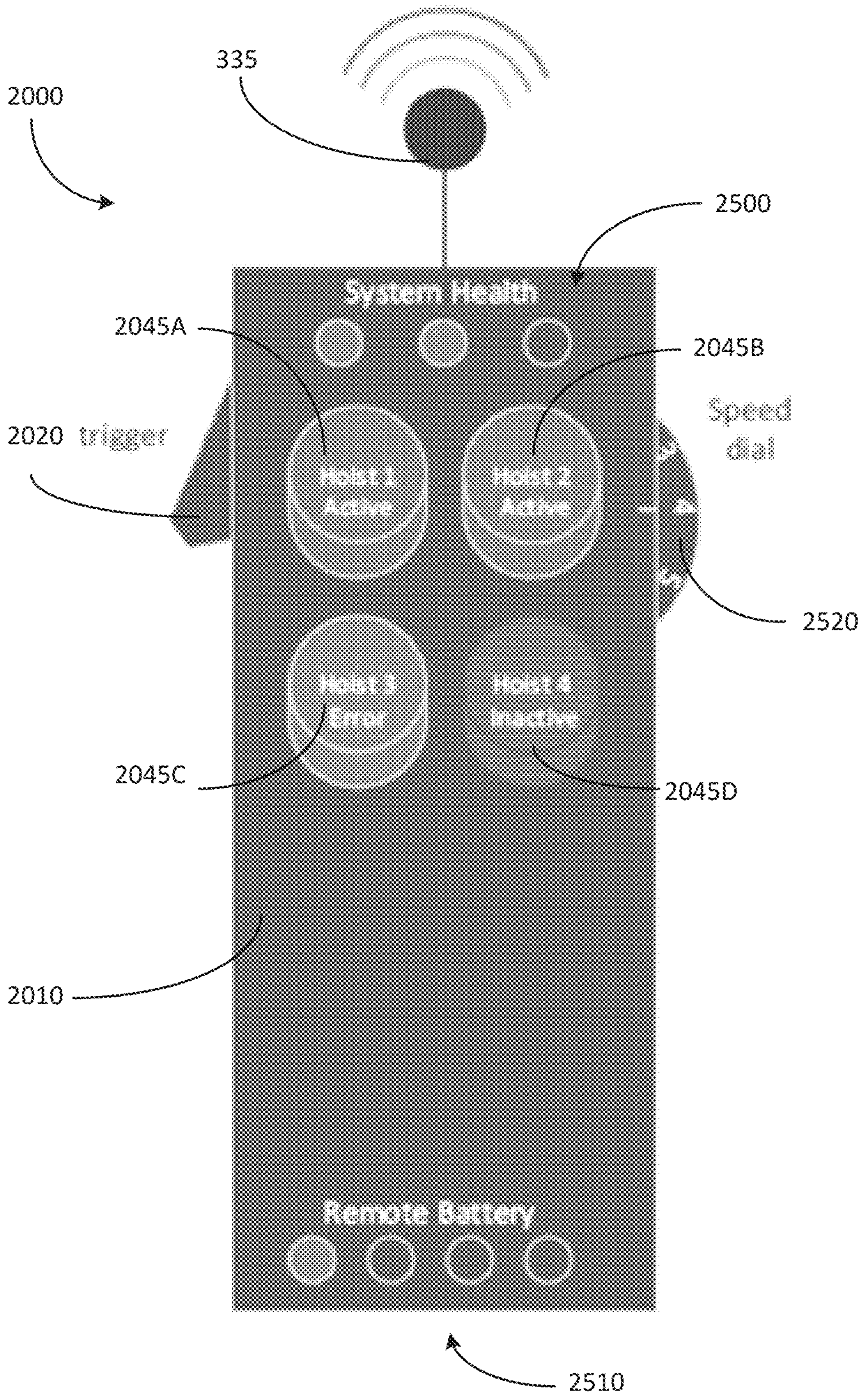
FIGS. 25A, 25B, and 25C illustrate the handheld remote controller of FIG. 20 in accordance with some embodiments.
Figure 25B:
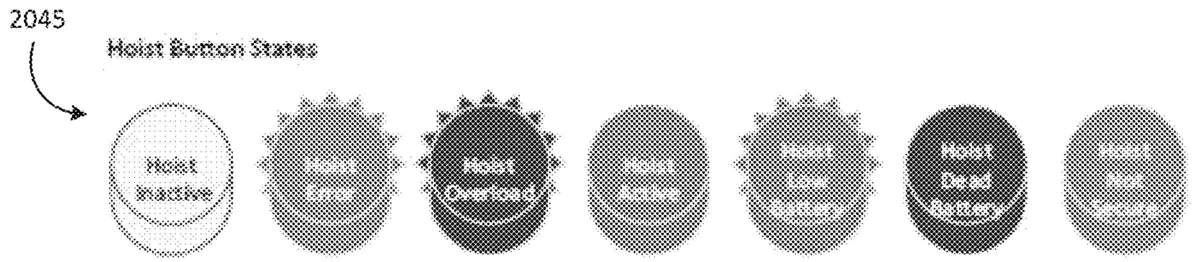
Figure 25C:
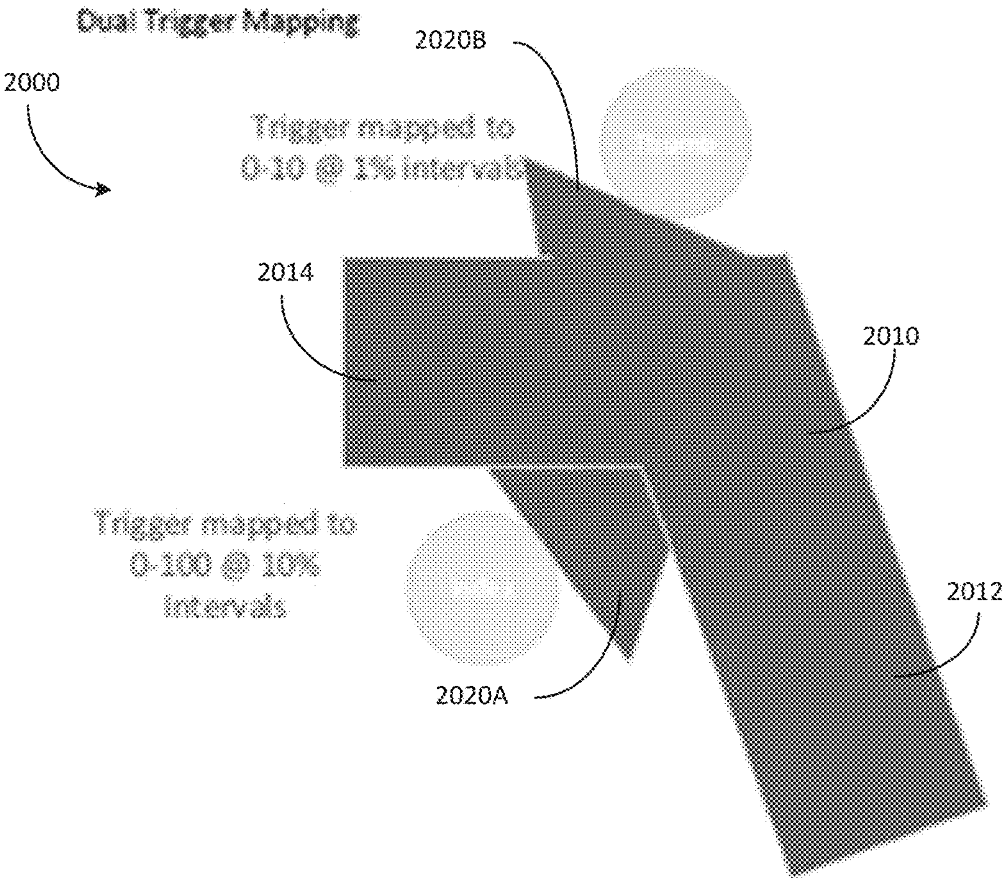

FIGS. 25A through 25C illustrate another embodiment of the handheld remote controller 2000. In the example illustrated, the handheld remote controller 2000 includes the variable speed trigger 2020, the communication channel pushbutton matrix 2040, a system health indicator 2500, a remote controller battery indicator 2510, and a speed dial 2520. The variable speed trigger 2020 is provided on a side of the housing 2010 of the handheld remote controller 2000. The communication channel pushbutton matrix 2040 includes, for example, four translucent communication channel pushbuttons with LEDs or other illumination devices provided below the communication channel pushbuttons.

Referring to FIG. 25B, the LEDs of the communication channel pushbuttons may be illuminated in different colors and flashing patterns to indicate different statuses of their respective associated hoist devices 110. For example, the LEDs may be turned off to indicate that a hoist device 110A is inactive due to power loss, due to the hoist device 110 not selected for operation, or the like. The LEDs may be flashed in a first color (e.g., orange) to indicate an error status of a corresponding hoist device 110. The LED may be illuminated in the first color without flashing to indicate that the hoist device has not been secured, which may be indicated, for example, when a smart hook 3600 indicates to the remote controller 2000 that a hook latch 3606 is open (refer see to FIG. 36). The LEDs may be flashed in a second color (e.g., red) to indicate that the corresponding hoist device 110 is overloaded. The LEDs may be illuminated in the second color without flashing to indicate that the hoist power source 240 of the corresponding hoist device 110 is depleted below operations level (or has a dead battery). The LEDs may be flashed in a third color (e.g., green) to indicate that the corresponding hoist device 110 has low battery. The LEDs may be illuminated in the third color without flashing to indicate that the corresponding hoist device 110 is active and operating normally. The LEDS may also be used for other warnings and alerts, for example, overload warnings and the like.

Referring to FIG. 25A, the system health indicator 2500 may provide an indication of the overall system health of the hoist system 100. The system health indicator 2500 include three LEDs illuminated in a single color or multiple colors. The system health indicator 2500 may illuminate all three LEDs to indicate that all components are functioning correctly. One or more of the LEDs may not be illuminated to indicate that one or more components of the system 100 may not functioning correctly. The remote controller battery indicator 2510 provides an indication of the battery level of the controller power source 345. In the example illustrated, the remote controller battery indicator 2510 includes four LEDs, which may be illuminated to correspond to the current battery level of the controller power source 345 (e.g., four illuminated for full charge, three illuminated for ¾ charge, two illuminated for ½ charge, 1 illuminated for ¼ charge, and none illuminated for no charge).

Referring to FIG. 25C, the variable speed trigger 2020 may be implemented using a dual trigger design having a first trigger 2020A and a second trigger 2020B. The first trigger 2020A is provided below the top portion 2014 to be operated by an index finger of the user and the second trigger 2020B is provided above the top portion 2014 to be operation by a thumb of the user. In some embodiments, the amount of trigger pull of the two triggers 2020A-B correspond to the PWM duty cycle (ranging from 0-100%) of the signal used to drive the hoist motor(s) 250 being controlled by the handheld remote controller 2000. The PWM duty cycle that drives the hoist motor(s) 250 is directly proportional to the speed of the hoist motor(s). In some embodiments, the pulling amount of the first trigger 2020A is mapped to the entire range of the PWM duty cycle such that, for each 10% of total potential trigger travel, the PWM duty cycle increases from 10%, until the first trigger 2020A is fully depressed (100%), at which point, the PWM duty cycle is set to 100%. In some embodiments, the pulling amount of the second trigger 2020B is mapped to a reduced range of the PWM duty cycle such that, for each 10% of total potential trigger travel, the PWM duty cycle increases by 1%, until the first trigger 2020A is fully depressed (100%), at which point, the PWM duty cycle would be 10%. In some embodiments, the sum of the duty cycles indicated by the two triggers 2020 is totaled, capped at 100%, to determine the PWM duty cycle to drive the hoist motor(s) 250. Thus, for example:

- when the first trigger 2020A is fully released (indicating 0% duty cycle), and the second trigger 2020B is fully depressed (indicating+10% duty cycle), the total PWM duty cycle is set to 10%;
- when the first trigger 2020A is pulled halfway (indicating 50% duty cycle), and the second trigger 2020B is pulled halfway (indicating+5% duty cycle), the total PWM duty cycle is set to 55%; and
- when the first trigger 2020A is fully depressed (indicating 100% duty cycle) the total PWM duty cycle is set to 100% regardless of the pull amount of the second trigger 2020B.

Accordingly, at least in some embodiments, the first trigger 2020A provides more variation in speed for each successive amount of pulling and has a larger range of control (e.g., 0-100% duty cycle), while the second trigger 2020B provides less variation in speed for each successive amount of pulling and has a lower range of control (e.g., 0-10% duty ratio). In some embodiments, the first trigger 2020A may be used for larger movements (for example, larger distances) of a workpiece 130 and the second trigger 2020B is used for finer movement (for example, small distances) of the workpiece 130. In another embodiment, the first trigger 2020A and the second trigger 2020B are not used concurrently and, rather, for example, one trigger signal is ignored when the other is already activated.

In some embodiments, rather than varying motor speed based on an amount of depression of a trigger of the remote controller 120 or 2000, the speed dial 2520 or another speed selector input button or slider may be used to set certain speeds (for example, low, medium, and high speeds) of the hoist motor 250. In some embodiments, a smart telephone may be used to program the speed dial 2520 to certain speeds. These set speeds may be used as desired speeds in a closed-loop control function implemented by the hoist electronic processor 210 such that the set speeds are held substantially constant. In other words, the hoist electronic processor 210 measures speed of the motor 250, compares to the desired speed, and adjusts current flow to the motor (e.g., by adjusting a PWM duty cycle driving the motor) to maintain the speed of the motor 250 at the desired speed. In other embodiments, an open loop control function is implemented by the hoist electronic processor 210 such that the desire speed maps to a particular current flow to the motor 250 (e.g., a particular PWM duty cycle), which is then used to drive the motor 250.

In some embodiments, the hoist device 110 may be provided with a worklight to illuminate a working surface, a workpiece 130, or an area in which a workpiece 130 is being moved. For example, the worklight may direct light toward the workpiece, as well as the surrounding area. The hoist device 110 may also include indicators to provide visible notifications and/or a speaker to provide audible notifications (for example, beeps, alarms, voice notifications, and the like to a user). The indicators and speaker may be used in conjunction with other techniques and methods described herein to provide the different notifications, alarms, or indications.

In some embodiments, the hoist system 100 may impose a distance limitation on the hoist devices 110 and the controller 120. Particularly, to ensure that signals may be accurately received by the hoist devices 110, the hoist system 100 may prevent operation of the hoist devices 110 when the distance between the controller 120 and the hoist device 110 is more than a predetermined amount. The controller 120 may determine the distance between the controller 120 and the hoist device 110 using a propagation delay of a roundtrip signal from the controller 120 to the hoist device.

Figure 26A:
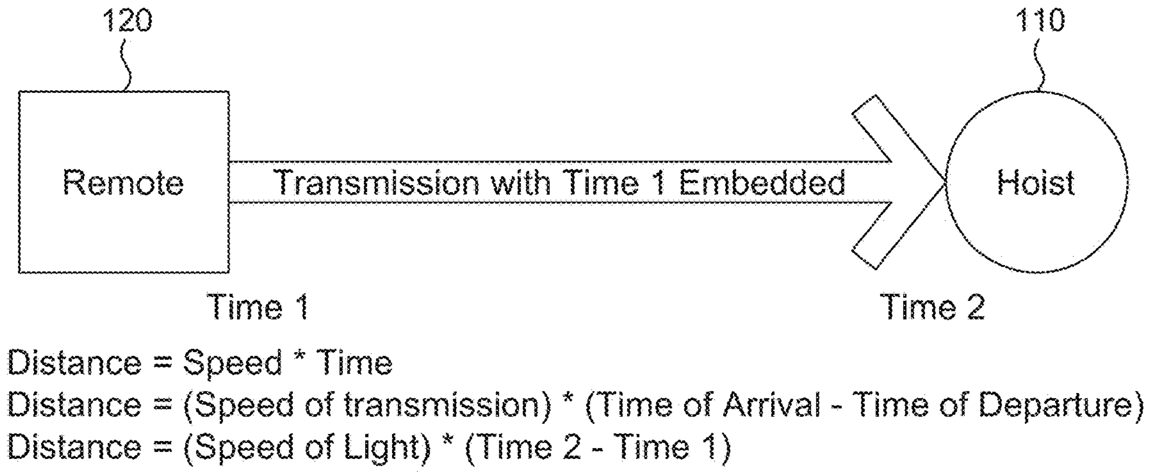
FIGS. 26A and 26B illustrate a method for calculating a distance between a controller and a hoist device of FIG. 1 and FIG. 20 in accordance with some embodiments.
Figure 26B:
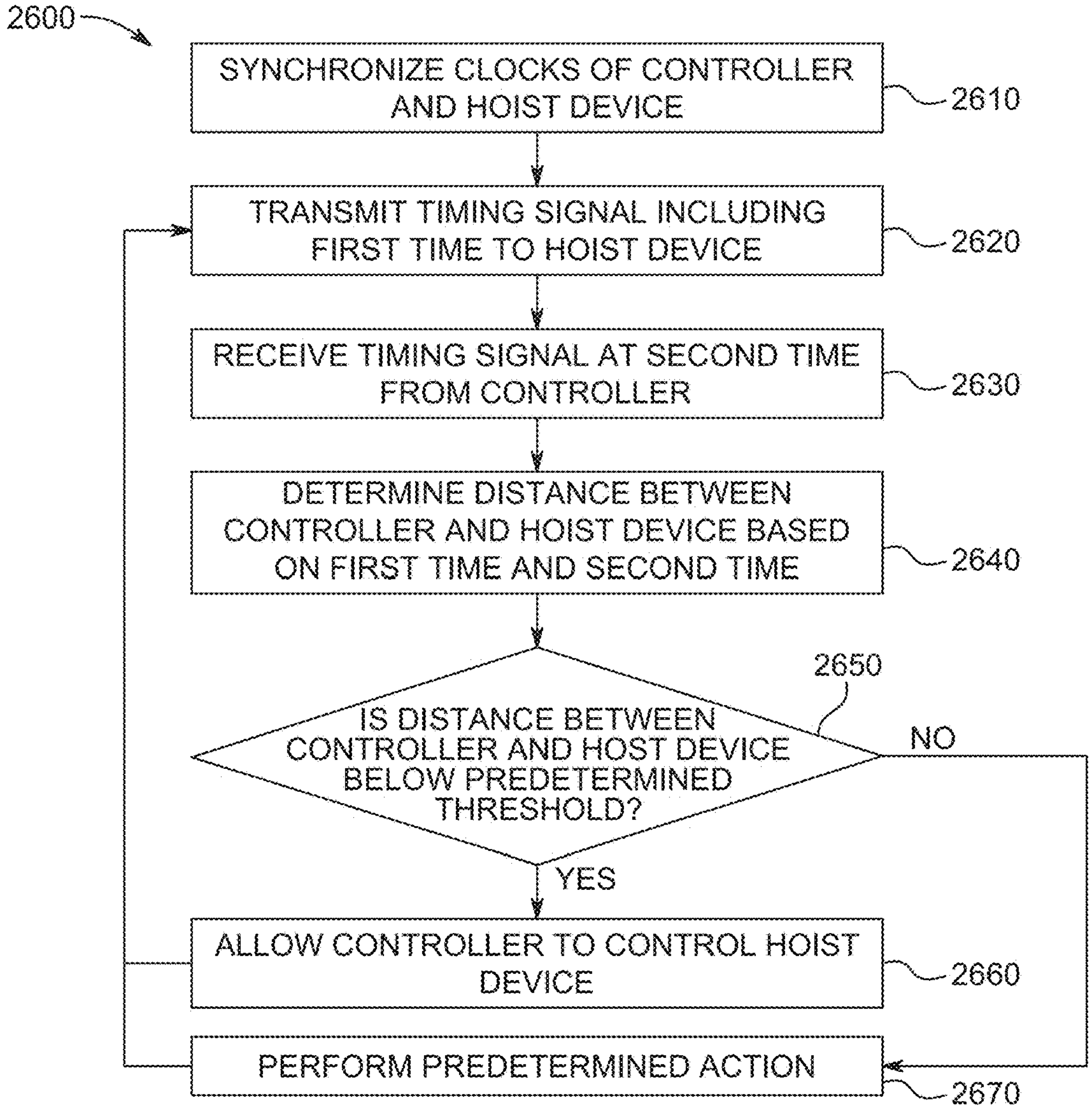

FIGS. 26A and 26B illustrate a method for calculating a distance between the controller and the hoist device 110. FIG. 26B is a flowchart of an example method 2600 for determining a distance between the controller 120 and the hoist device 110. In the example illustrated, the method 2600 includes synchronizing clocks of the controller 120 and the hoist device 110 (at block 2610). The clocks may be synchronized at the time of pairing the controller to the hoist device 110. In some embodiments, both the controller 120 and the hoist device 110 may include a Global Positioning System (GPS) to receive a universal time. The clocks of the controller 120 and the hoist device 110 are then synchronized to the universal time. In some embodiments, the clocks are synchronized according to the method provided in FIGS. 27A and 27B and further described below.

The method 2600 also includes transmitting, using the controller 120, a timing signal including a first time to the hoist device 110 (at block 2620). The controller 120 may record the first time and embed the first time into the timing signal, for example, by time stamping the timing signal. The first time corresponds to the time at which the timing signal is transmitted from the controller 120.

The method 2600 includes receiving, at the hoist device 110, the timing signal at a second time from the controller 120 (at block 2630). The hoist device 110 may record the time at which the timing signal was received by the hoist device 110. The method 2600 further includes determining, using the hoist electronic processor 210, the distance between the controller 120 and the hoist device 110 based on the first time and the second time (at block 2640). In one example, the hoist electronic processor 210 determines the distance by calculating the propagation time and multiplying the propagation time with a known speed of transmission (that is, speed of light). The hoist electronic processor 210 calculates the propagation time by subtracting the first time from the second time. In some embodiments, the hoist electronic processor 210 may adjust the propagation time to account for processing delays by the controller 120 and/or the hoist device 110.

The method 2600 includes determining, using the hoist electronic processor 210, whether the distance between the controller 120 and the hoist device 110 is below a predetermined threshold (at block 2650). The hoist electronic processor 210 compares the distance between the controller 120 and the hoist device 110 to the predetermined amount. When the distance between the controller 120 and the hoist device 110 is below the predetermined threshold, the method 2600 includes allowing the controller 120 to control operation of the hoist device 110 (at block 2660). When the distance between the controller 120 and the hoist device 110 is above the predetermined threshold, the method 2600 includes performing a predetermined action (at block 2670). The predetermined action may include providing an indication on the hoist device 110 and/or providing an indication on the controller 120. The indication informs the user that the controller 120 is not within an operating distance of the hoist device. The predetermined action may also include preventing the controller 120 from operating the hoist device 110. For example, the hoist device 110 may ignore commands from the controller 120 until the method 2600 is executed again and the distance is determined to be below the predetermined threshold.

Figure 27A:
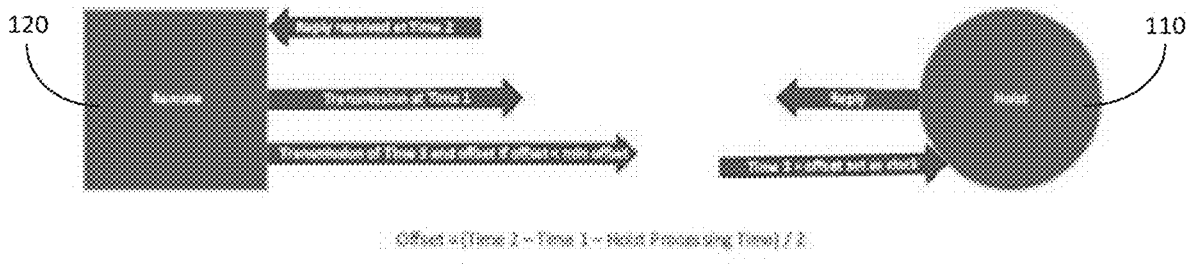
FIGS. 27A and 27B illustrate a method for synchronizing clocks of the controller and the hoist device of FIG. 1 and FIG. 20 in accordance with some embodiments.
Figure 27B:
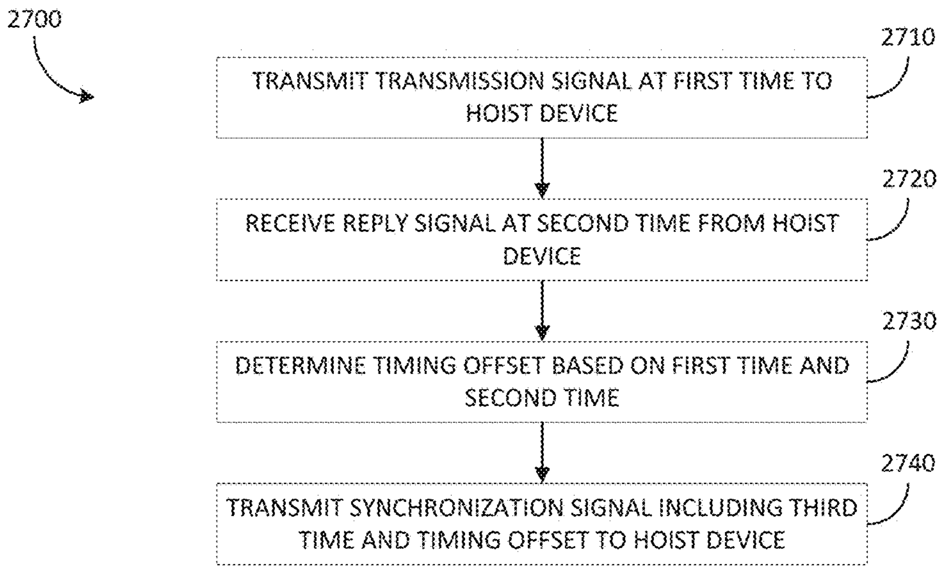

FIGS. 27A and 27B provide a method 2700 for synchronizing the clocks of the controller 120 and the hoist device 110. The method 2700 includes transmitting, using the controller 120, a transmission signal at a first time to the hoist device 110 (at block 2710). The controller electronic processor 310 records the first time. The method 2700 also includes receiving, at the controller 120, a reply signal at a second time from the hoist device 110 (at block 2720). The hoist device 110 provides the reply signal in response to receiving the transmission signals. The method 2700 further includes determining, using the controller electronic processor 310, a timing offset based on the first time and the second time (at block 2730). The controller electronic processor 310 calculates the timing offset by dividing the propagation delay by two. The propagation delay represents the time taken for a roundtrip signal from the controller 120 to the hoist device 110 and back to the controller 120. Accordingly, the timing offset represents the time taken by a signal to reach the hoist device 110 from the controller 120. The propagation delay is calculated by subtracting the first time from the second time. The propagation delay may be adjusted by subtracting the processing delay introduced by the hoist device 110. The controller 120 may be pre-programmed with the processing delay of the hoist device 110. The method 2600 further includes transmitting, using the controller 120, a synchronization signal including a third time and the timing offset to the hoist device 110 (at block 2740). The third time represents the time at which the controller 120 transmits the synchronization signal. The hoist device 110 synchronizes the clock of the hoist device 110 to the third time increased by the timing offset such that the clock of the hoist device 110 is synchronized to the clock of the controller 120.

In some embodiments, the controller 120 and the hoist devices 110 use a Bluetooth® communication protocol to exchange control and other signals. In other embodiments, the handheld remote controller 2000 and the hoist devices 110 may use a proprietary radio-frequency (RF) communication protocol to exchange control and other signals.

Figure 28A:
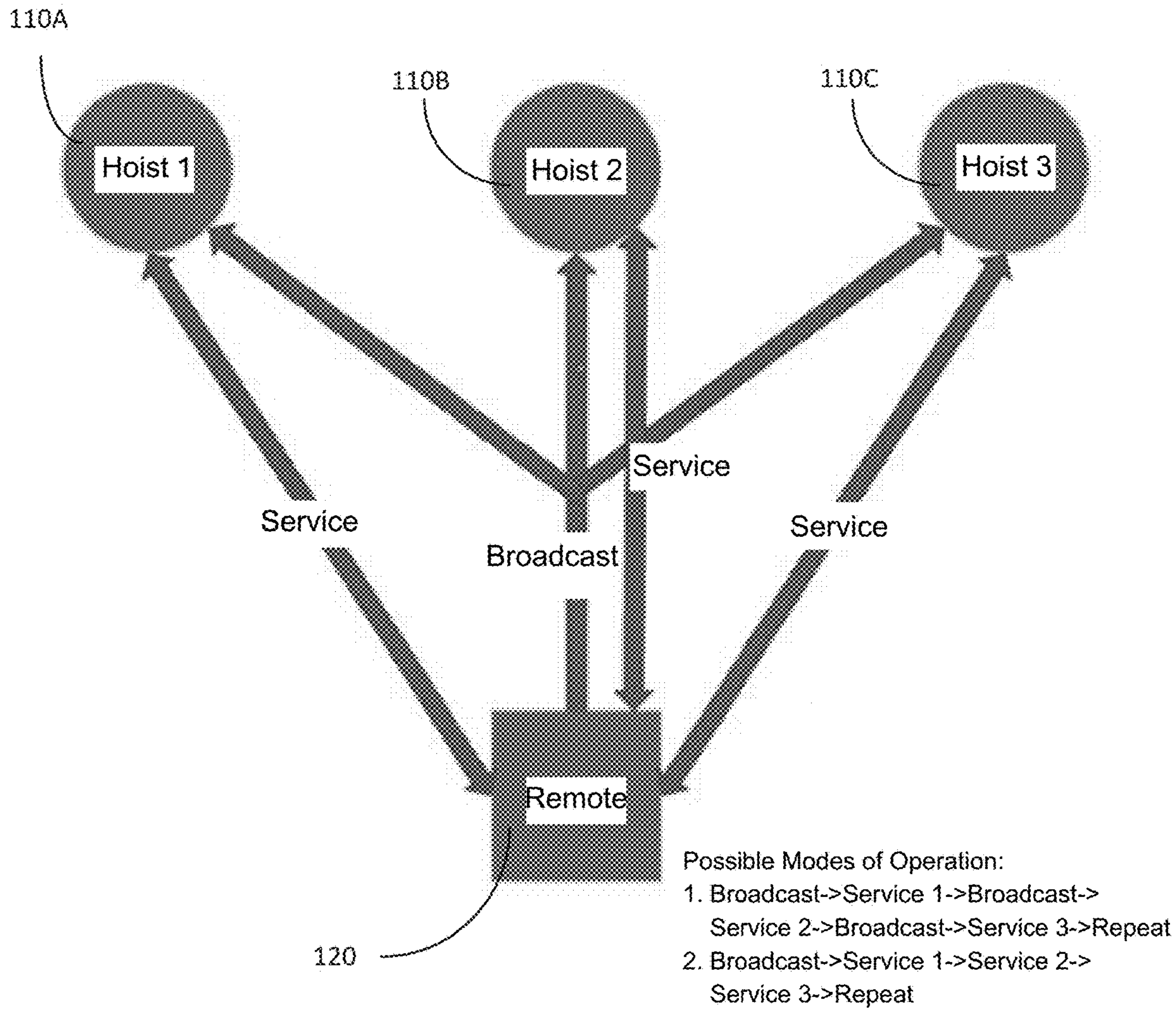

FIGS. 28A through 28D illustrate exchange of signals between the controller 120 and the hoist devices 110 using the proprietary RF communication protocol. The proprietary RF communication protocol uses dual identifiers, one broadcast from the controller 120 and an individual identifier for each hoist device 110. FIG. 28D illustrates a pairing process between the controller 120 and a hoist device 110. The pairing may be initiated on either device or may be initiated simultaneously on both devices. During the pairing process, the controller 120 broadcasts a pairing signal including an identifier of the controller 120 to the hoist device 110. The hoist device 110 stores the identifier of the controller 120 and responds with an identifier of the hoist device 110 and/or the identifier of the controller 120. The controller 120 stores the identifier of the hoist device 110. The pairing process is now complete and the controller 120 and the hoist device 110 use a new identifier that is generated to include both the identifier of the controller 120 and the identifier of the hoist device 110 for further communication. In other embodiments, the RF communication protocol may use other method of communication, for example, a separate communication channel may be used for each hoist device 110.

FIG. 28A illustrates a communication methodology between the controller 120 and the hoist device 110. In one embodiment, the controller 120 transmits a first broadcast signal to a first hoist device 110A. As shown in FIG. 28C, the first broadcast signal includes a first identifier corresponding to the controller 120 and the first hoist device 110A (for example, a combination of the identifier of the controller 120 and the identifier of the first hoist device 110A), a command (for example, specifying a speed, a direction, and/or the like), a timestamp (for example, for distance calculation), padding, and checksum (for signal accuracy verification). In response to receiving the first broadcast signal, the first hoist device 110A transmits a first service packet to the controller 120. As shown in FIG. 28C, the service packet includes a first identifier, a distance of the first hoist device 110 from the controller 120, an operation in progress (for example, a direction and speed), statuses (for example, sensor readings (e.g., load, speed, and/or the like)), and a checksum (for signal accuracy verification). In this embodiment, the controller 120 transmits a second broadcast signal to a second hoist device 110B after receiving the first service packet and transmits a third broadcast signal to the third hoist device 110C after receiving a second service packet from the second hoist device 110B. In other embodiments, the controller 120 may simultaneously or in quick succession transmit the first broadcast signal, the second broadcast signal, and the third broadcast signal. The controller 120 receives the first service packet, the second service packet, and the third service packet from the first hoist device 110A, the second hoist device 110B, and the third hoist device 110C respectively. The first service packet, the second service packet, and the third service packet are received in response to the first broadcast signal, the second broadcast signal, and the third broadcast signal respectively. In some embodiments, the RF communication protocol may use a different strategy for a stop command from the controller 120 to a hoist device 110. Particularly, in contrast to the operation signals, the controller 120 may repeatedly provide a stop signal to the hoist device 110 until a service packet acknowledging the stop command is received from the hoist device 110. Although described with the proprietary RF communication protocol, the methodology described above may be used with other communication protocols, for example, Bluetooth®, Wi-Fi™, ZigBee®, 4G, 5G, Infrared, and the like. Additionally, rather than using a dual identifier, the RF communication methodology described above may use a channel identifier and may establish communication between the controller 120 and each hoist device 110 over a separate channel.

In some embodiments, rather than individually communicating with each hoist device 110, the controller 120 may communicate with a single hoist device 110, which in turn communicates with other hoist devices 110. For example, as shown in FIG. 28B, the first hoist device 110A, the second hoist device 110B, and the third hoist device 110C are daisy-chained together. In this example, the controller 120 provides control signals for each of the hoist devices to the first hoist device 110A. The first hoist device 110A extracts the control signals for the first hoist device 110A and transmits the control signals for the second hoist device 110B and the third hoist device 110C to the second hoist device 110B. Similarly, the second hoist device 110B extracts the controls signals for the second hoist device 110B and transmits the control signals for the third hoist device

110C to the third hoist device 110C. The first hoist device 110A, the second hoist device 110B, and the third hoist device 110C then operate using the control signals received from the controller 120. A similar communication scheme may be used with respect to the embodiments of FIGS. 16-17.

In some embodiments, two or more hoist devices 110 may be tethered together for concurrent operation. Tethering may be performed on a user interface of the hoist devices 110 and/or on the user interface of the handheld remote controller 2000. In some embodiments, tethering may also be performed on a connected smart telephone device running an application designed to function with the hoist device system described herein. When two or more hoist devices 110 are tethered together, the hoist devices 110 may exchange operation and control signals to work in unison to perform a task.

Figure 29A:
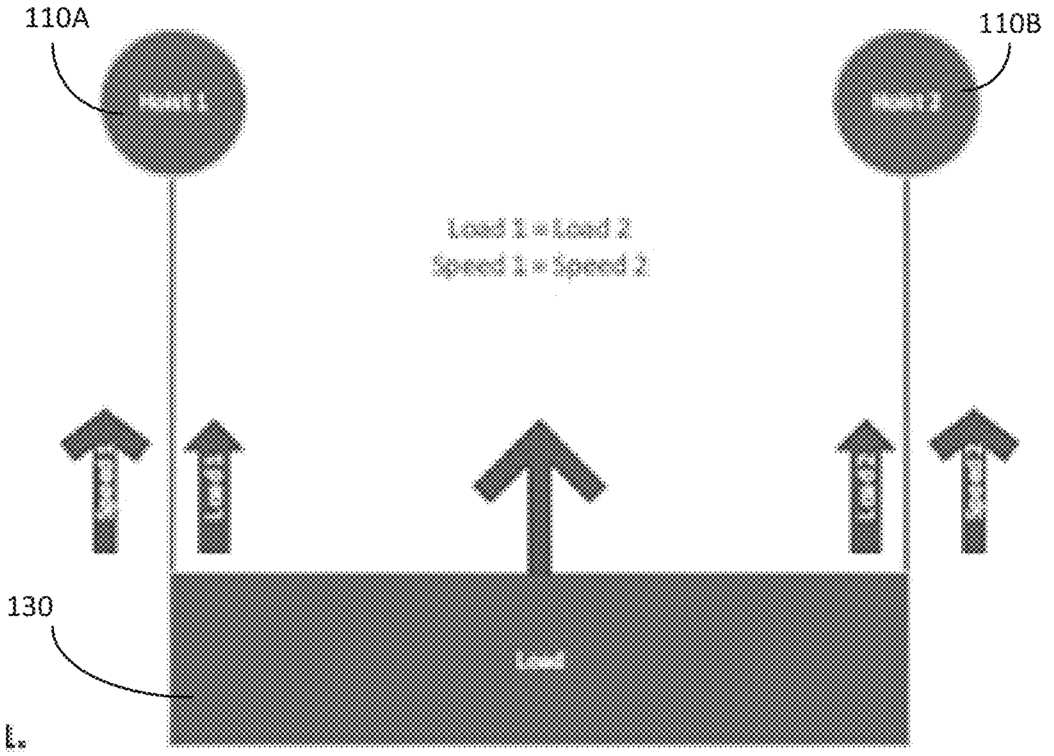
FIGS. 29A, 29B, and 29C illustrate an example of multiple hoist load balancing in accordance with some embodiments.
Figure 29B:
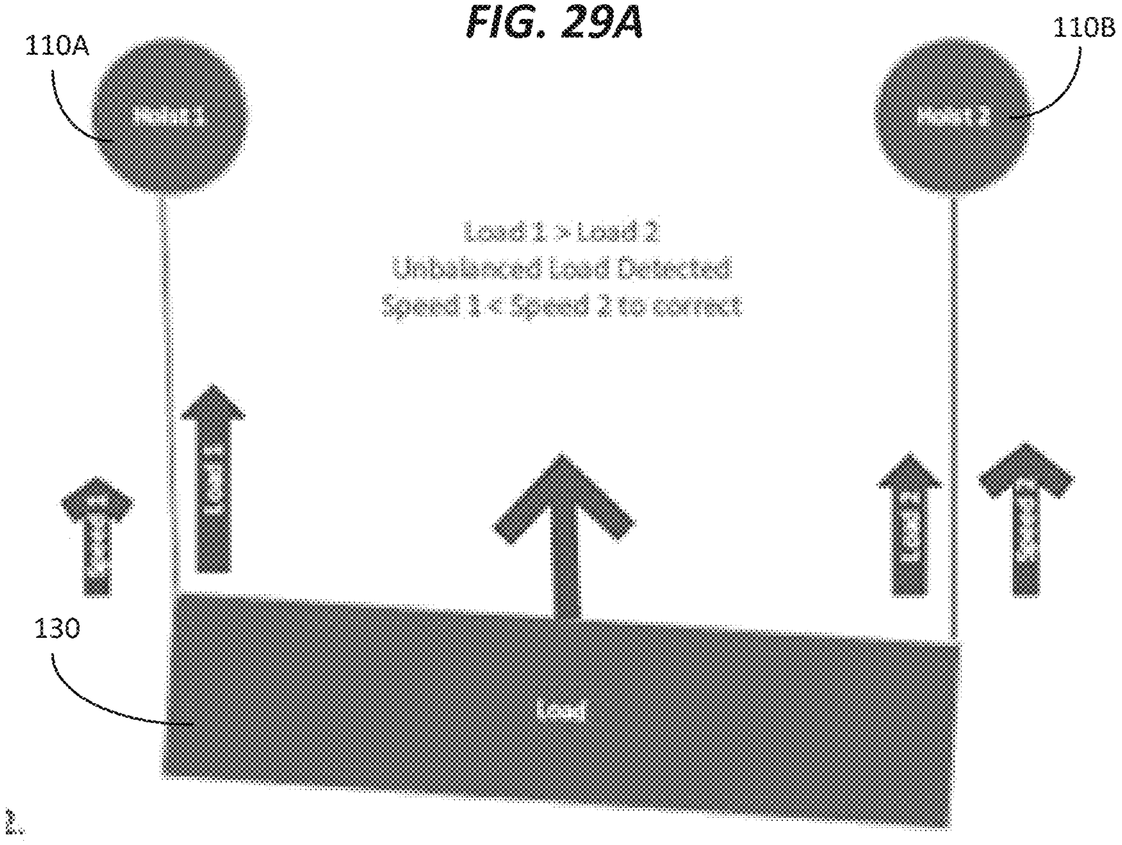
Figure 29C:
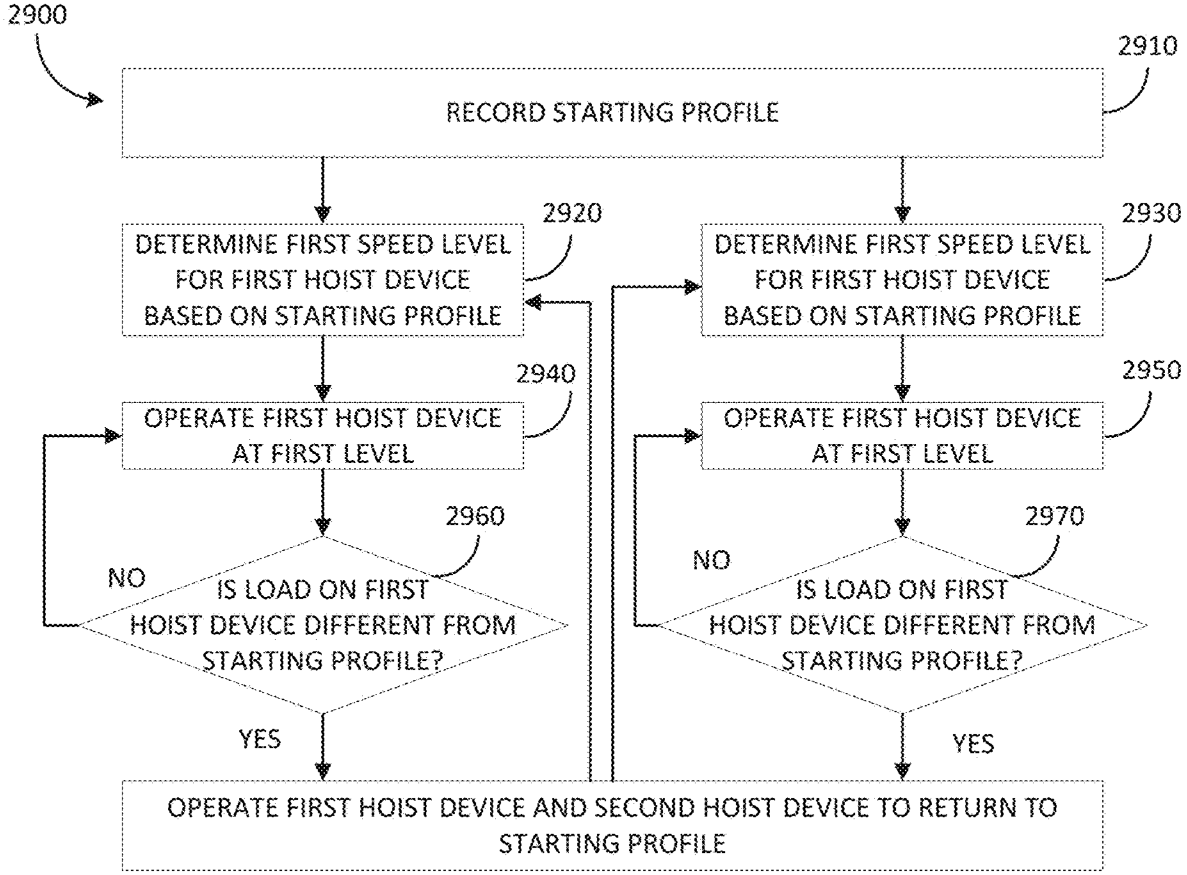

FIGS. 29A through 29C illustrate an example of multiple hoist load balancing performed when lifting a single workpiece 130 using two or more hoist devices 110. In the example illustrated in FIGS. 29A through 29C, a first hoist device 110A and a second hoist device 110B are used for lifting workpiece 130 and a method 2900 is described with respect to two hoist devices 110. However, the method 2900 is equally applicable for any number of hoist devices working together and/or in unison to lift a single workpiece 130. FIG. 29C is a flowchart of an example method 2900 for multiple hoist load balancing.

In the example illustrated in FIG. 29C, the method 2900 includes recording a starting profile (at block 2910). The starting profile varies based on the desired lifting profile of a workpiece 130. Referring to FIG. 29A, when the workpiece 130 has equal weight distribution and is to be raised at a horizontal level (i.e., zero degrees from ground), the starting profile includes the load and speed on the first hoist device 110A being equal to the load and speed on the second hoist device 110B. Referring to FIG. 29B, when the load is not equally distributed or when the workpiece 130 is to be lifted at an angle different than a horizontal angle, the load and speed on each hoist device 110 may be different. In this example, at the beginning of the lifting operation, the first hoist device 110A records a load (e.g., based on a load sensor) on the first hoist device 110A and the second hoist device 110B records a load on the second hoist device 110B. In some embodiments, the first hoist device 110A and the second hoist device 110B provide the load signals to a controller 120 that may monitor the load on each hoist device 110.

The method 2900 includes determining a corresponding first speed level for a first hoist device 110A based on a load on the first hoist device 110A and a load on the second hoist device 110B (at block 2920). The method 2900 also includes determining a corresponding second speed level for a second hoist device 110B based on the load on the first hoist device 110A and the load on the second hoist device 110B (at block 2930). The first speed level and the second speed level are selected to maintain the starting load profile on each of the hoist devices 110 throughout the lifting process. Accordingly, the ratio between the first speed level and the second speed level is inversely proportional to the ratio between the load on the first hoist device 110A and the load on the second hoist device 110B.

The method 2900 includes operating the first hoist device 110A at the first speed level (at block 2940) and operating the second hoist device 110B at the second speed level (at block 2950). The method 2900 maintains the first speed level and the second speed level as long as the load on the first hoist device 110A and the load on the second hoist device 110B are consistent with the starting profile (e.g., within a predetermined percentage or other threshold of the starting profile).

The method 2900 includes determining whether the load on the first hoist device 110A is different from the starting profile (at block 2960) and determining whether the load on the second hoist device 110B is different from the starting profile (2970). When the load on the first hoist device 110A and the load on the second hoist device 110B are consistent with the starting profile (e.g., within a predetermined percentage or other threshold of the starting profile), the method 2900 returns to blocks 2940 and 2950 to maintain current operation.

When the load on the first hoist device 110A and/or the load on the second hoist device 110B are inconsistent with the starting profile (e.g., the load is outside of a predetermined percentage or other threshold of the starting profile), the method 2900 includes operating the first hoist device 110A and the second hoist device 110B to return to the starting profile (at block 2980). For example, the method 2900 may halt operation, then then may operate one or both of the first hoist device 110A and the second hoist device 110B to return to the starting profile. Once returned to the starting profile, the method 2900 returns to blocks 2920 and 2930 to continue operation. In some embodiments, rather than returning to starting profile, the method 2900 may include determining new speed levels based on the new load profile and operating the hoist devices 110 based on the new speed levels. For example, if the first hoist device 110A detects an increased load (which should correspond to the second hoist device 110B detecting a decreased load), in block 2980, the first hoist device 110A may be controlled to increase its speed and/or the second hoist device 110B may be controlled to decrease its speed to shift more of the load to the second hoist device 110B and return to the starting profile. Similarly, if the first hoist device 110A detects an decreased load (which should correspond to the second hoist device 110B detecting an increased load), in block 2980, the first hoist device 110A may be controlled to decrease its speed and/or the second hoist device 110B may be controlled to increase its speed to shift more of the load to the first hoist device 110A and return to the starting profile.

In some embodiments, the two paths between recording the starting profile block 2910 and the operating to return to the starting profile block 2980 (i.e., the path with blocks 2920, 2940, and 2960 and the path with blocks 2930, 2950, and 2970) may be executed in parallel so each of the first hoist device 110A and the second hoist device 110B may be continually adjusting motor speed to maintain the starting profile.

Figure 30:
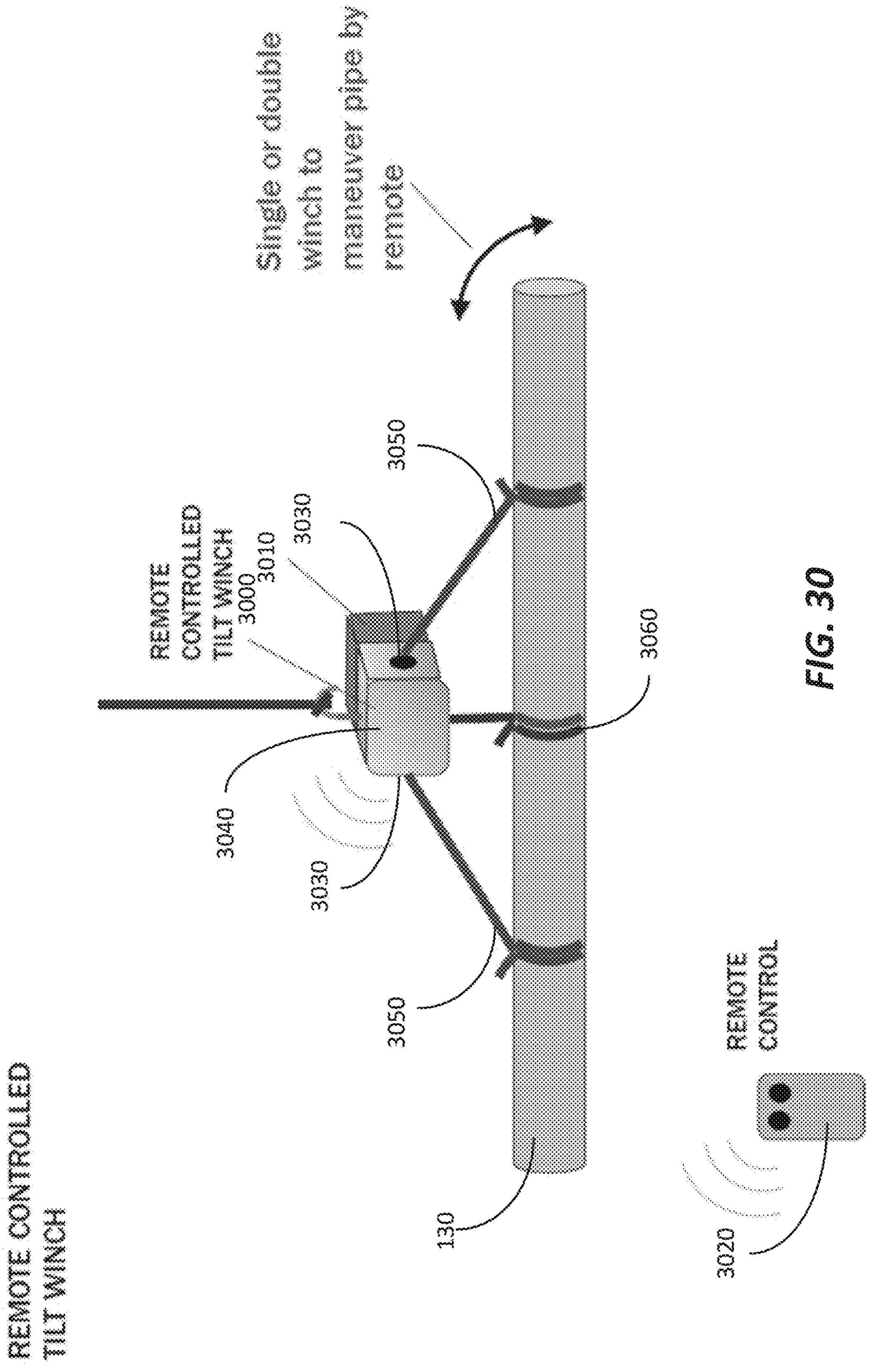
FIG. 30 illustrates a tilt winch system that may be used with the hoist system of FIG. 1 in accordance with some embodiments.

FIG. 30 illustrates tilt winch 3000 that may be used with a hoist device 110 to lift a workpiece 130. The tilt winch 3000 is powered by a winch power source 3010. The winch power source 3010 may be similar to the hoist power source 240, for example, a power tool battery pack. The tilt winch 3000 may be controlled by a winch controller 3020, which may be a stand-alone controller or may be integrated into the controller 120. The tilt winch 3000 may be attached to a hook of the hoist device 110 and may communicate with the hoist device 110 and the controller 120 to operate in conjunction with the hoist device 110.

The tilt winch 3000 include two rope openings 3030 provided on each side of a housing 3040 of the tilt winch 3000. The rope openings 3030 provide an outlet for a rope 3050 that may be pulled in and let out by the tilt winch 3000. The tilt winch 3000 may include a motor similar to the motor of the hoist device 110 to adjust a length of the rope 3050. The rope 3050 may be tied on each side of a workpiece 130. The tilt winch 3000 is then operated (e.g., the winch motor is controlled) to adjust a length and/or tension of the rope 3050 on each side of the tilt winch 3000. In some embodiments, a third opening may be provided on the bottom of the winch housing 3040 to allow a second rope 3060 to be pulled in or let out. The second rope 3060 may be provided in addition to the rope 3050 or alternatively in lieu of the rope 3050. The length and tension in the second rope 3060 may similar be adjusted as the rope 3050 using the winch controller 3020.

Figure 31:
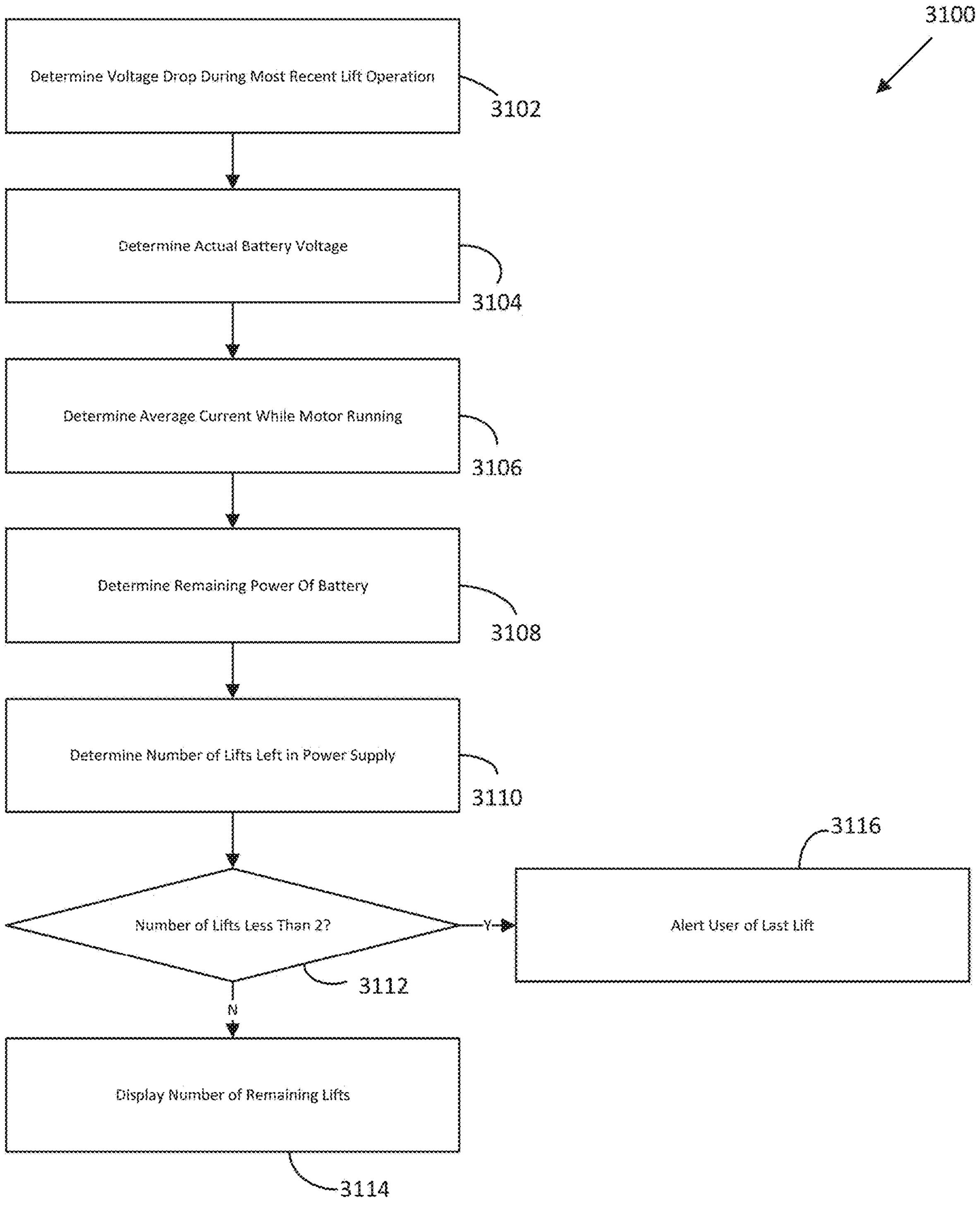
FIG. 31 is a flow chart illustrating a process for determining a last lift for a DC battery powered hoist device in accordance with some embodiments.

Turning now to FIG. 31, a flowchart illustrating a process 3100 for determining a last lift for a DC battery powered hoist device, such as hoist device 110. In some embodiments, the process 3100 is executed by an electronic processor of one of the herein-described hoist systems, such as the hoist electronic processor 210 or the controller electronic processor 310. At process block 3102, the electronic processor determines a voltage drop of the power source, such as hoist power source 240. The voltage drop may be the voltage drop from the beginning of the lift until the end of the lift (e.g. when the motor stops). At process block 3104, the electronic processor determines an actual voltage level of the battery. At process block 3106, the electronic processor determines an average current of the motor during a lift. At process block 3108, the electronic processor determines the remaining power in the power source. In one embodiment, the remaining power in the power source is determined by multiplying the difference between the actual voltage of the battery and a minimum voltage of the power source by the power of a standard lift. In one example, the minimum voltage may be stored in a memory of the electronic processor. The minimum voltage may be communicated to the electronic processor by the power source in some instances. Power of a standard lift may be calculated as the average current divided by the determined voltage drop during a lift.

At process block 3110, the number of lifts left in the power supply is determined by dividing the determined power left in the power source in process block 3108, by the power of a standard lift. If the number of remaining lifts is determined to be less than 2 at process block 3112, a user is alerted that only one lift remains in the power source. In some embodiments, the alert may be a visual alert provided on the remote controller 2000, described above. For example, the alert may be presented via one or more LEDs, or via a user interface, such as an LCD screen. In other embodiments, audio or tactile alerts may be provided to the user, either alone, or in combination with the above described visual alerts. If the number of lifts is not less than two, the number of remaining lifts is displayed for the user at process block 3114. For example, the remaining lifts may be displayed via a user interface of the remote controller 2000.

As an example, if the minimum voltage of the power source is 14V, the voltage drop is 0.5 VDC, the actual voltage of the power source is 16V, and the average current is 10 A, then the remaining power can be calculated as: 16V−14V*(10 A/0.5)=40 W. Then, based on the power of a standard lift being 20 W, the remaining lifts can be calculated as: 40 W/20 W=2.

Figure 32:
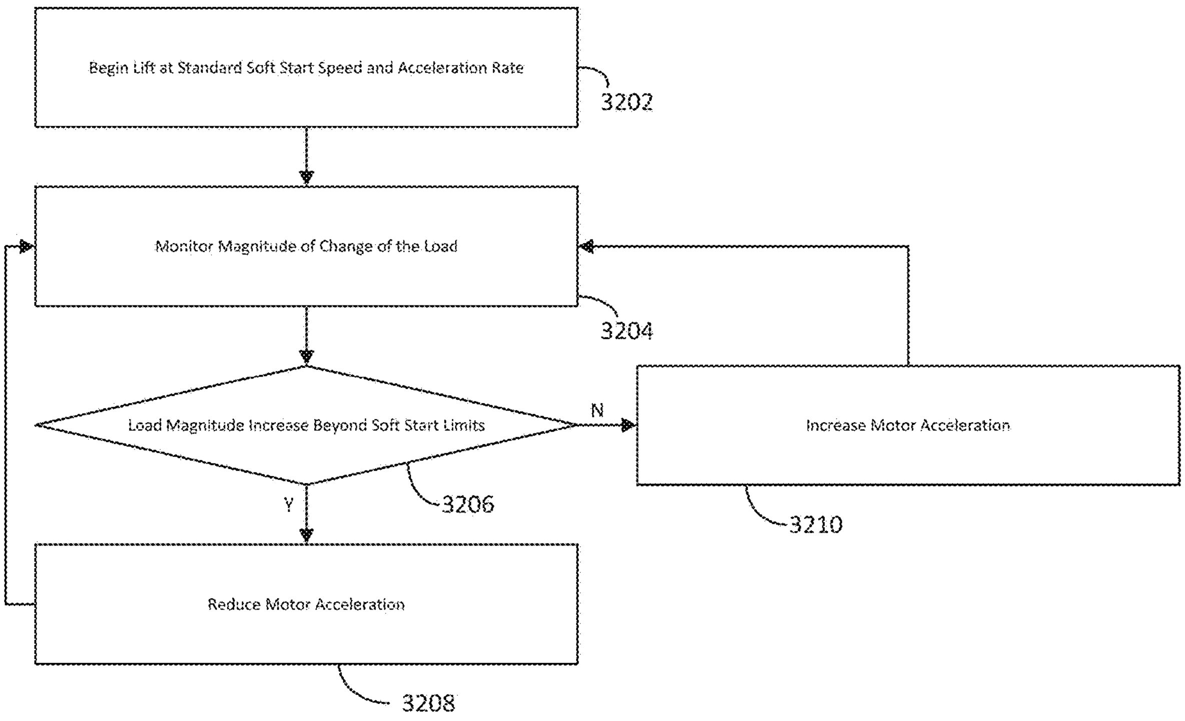
FIG. 32 is a flow chart illustrating a process for controlling a soft start function of a motor in accordance with some embodiments.

Turning now to FIG. 32, a process 3200 for controlling a soft start function of a motor, such as the motor of the hoist device 110. The soft start function may be controlled by an electronic processor of one of the herein-described hoist systems, such as the hoist electronic processor 210 or the controller electronic processor 310. In one embodiment, the soft start function is configured to ramp up the acceleration of the motor at less than full speed to reduce in-rush current, as well as to reduce undue strain on the motor. At process block 3202, the hoist device begins the lift and the electronic processor begins accelerating the motor at a standard soft-start level. In some embodiments, this is a predefined acceleration. In other embodiments, a user is able to select the soft-start acceleration rate within a range of acceleration rates (e.g., using a wirelessly connected smart phone or a user interface on the remote controller 120, 2000). The electronic processor may be configured to control the acceleration and speed of the motor by varying a pulse width modulation ("PWM") signal to the motor. By increasing or decreasing the duty cycle of the PWM output to the motor, the controller can increase or decrease, respectively, the acceleration and speed of the motor.

Figure 33:
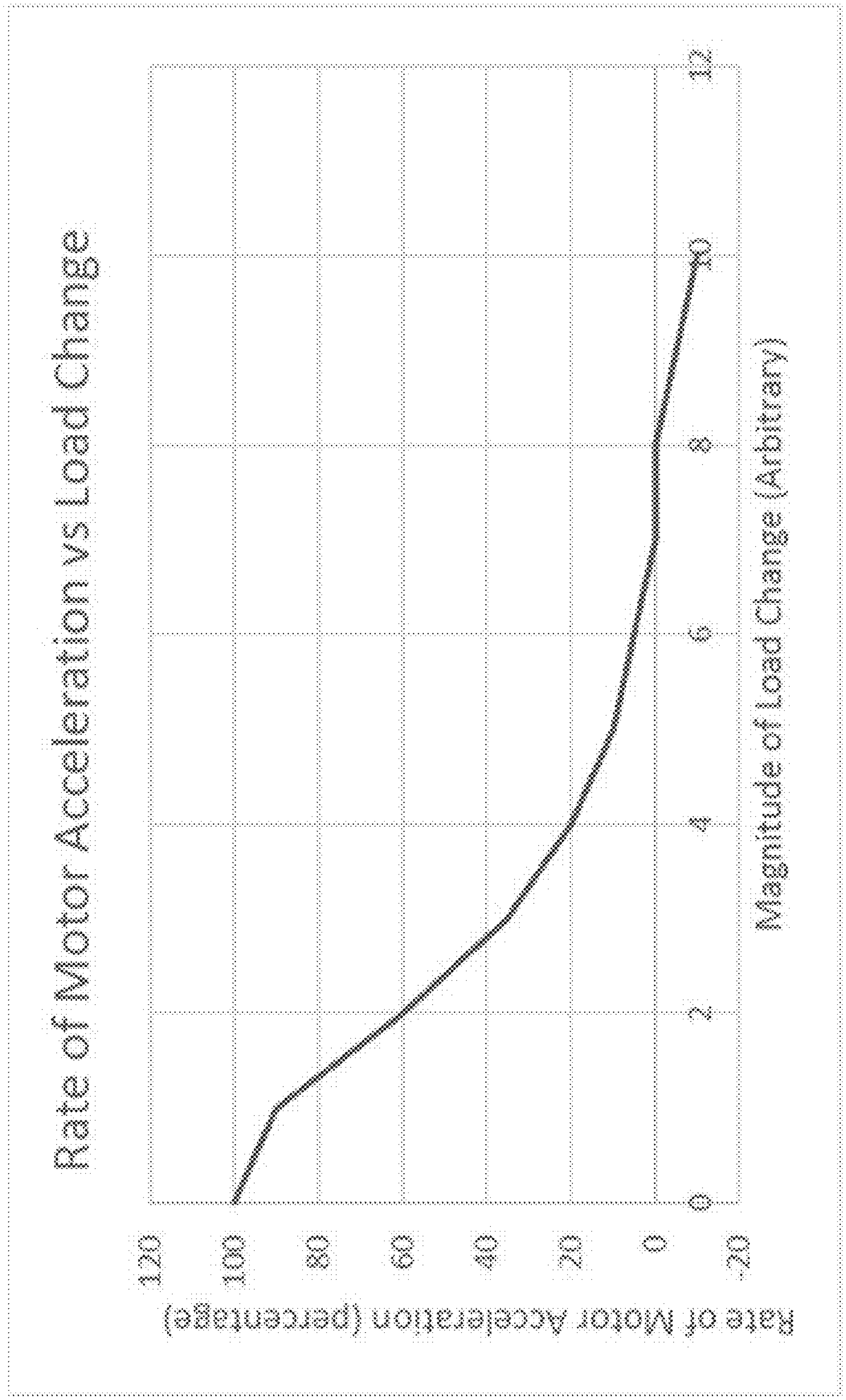
FIG. 33 is a data plot illustrating the relationship between motor acceleration and magnitude of a load in a hoist system in accordance with some embodiments.

The electronic processor then monitors a magnitude of a change in the load being lifted at process block 3204. In some embodiments, the magnitude of the load may be determined based on a load sensor output. The load sensors could monitor pressure in a hydraulic fluid, or a strain on a load bearing chain or other connection between the load and the hoist device 110. In other examples, a current of the motor 250 may be used to determine a magnitude of the load being lifted by the hoist device 110. At process block 3206, the electronic processor determines if the load magnitude has increased beyond a soft-start limit. In some embodiments, the soft-start limit is a ratio of motor acceleration to load. In response to the load magnitude increasing beyond the soft-start limit, the electronic processor reduces the acceleration of the motor 250 (e.g., by reducing the PWM duty cycle that controls driving of the motor 250) at process block 3208. In one embodiment, the electronic processor reduces the acceleration such that the acceleration is inversely proportional to the magnitude of load change, as shown in FIG. 33. After reducing the motor acceleration, the electronic processor returns to monitoring the magnitude of change of the load at process block 3204.

In response to determining that the load magnitude has not increased beyond the soft-start limits, the electronic processor increases the motor acceleration (e.g., by increasing the PWM duty cycle that controls driving of the motor 250) at process block 3210. In some embodiments, the acceleration is not increased beyond a predetermined level, such as an acceleration limit specified by the predetermined soft-start ramp. The controller then resumes monitoring the magnitude of change of the load at process block 3204.

Figure 34:
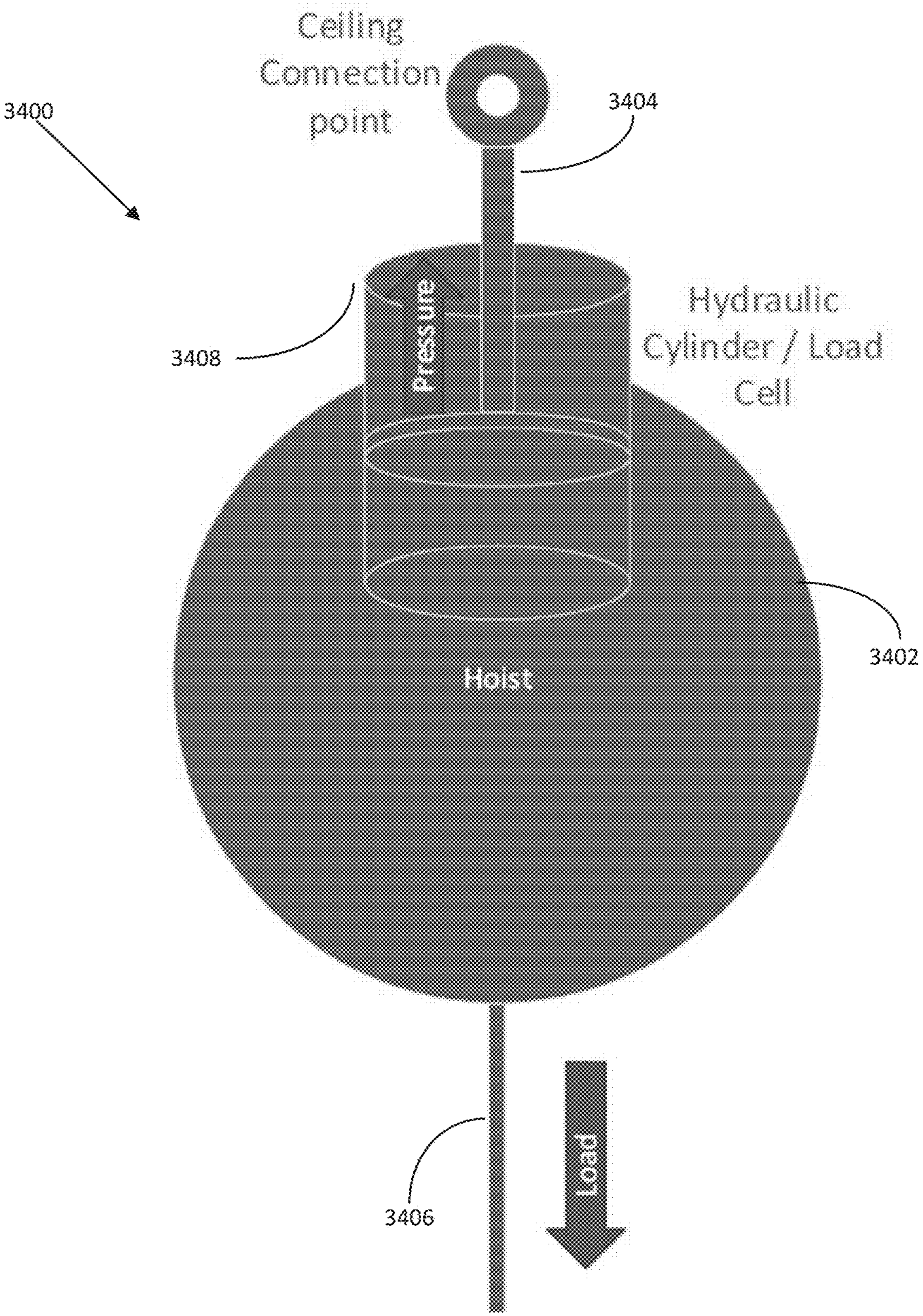
FIG. 34 illustrates a system for determining a magnitude of a load on a chain hoist in accordance with some embodiments.

Turning now to FIG. 34, an example system for determining a magnitude of a load on a chain hoist, such as hoist system 100, is shown, according to some embodiments. Generally, load sensing within a chain hoist can be done using one or more of static and dynamic measurements. FIG. 34 provides an illustration of a static load determination system 3400. To obtain a static load value, the measurement must be taken once the load has been lifted, and is free hanging from the hoist 3402. As described above, the hoist 3402 may be coupled to a support (e.g. ceiling, structural beams, etc.) via a first connection 3404. It should be understood that the hoist 3402 may be similar to the hoist device 110 or other hoist devices described herein. The first connection 3404 may be a chain, a wire cable, straps, rope, and the like. A load is then suspended from the hoist 3402 via a second connection 3406, such as a chain or wire cable. As shown in FIG. 34, a load sensing device 3408 may be coupled on the first connection 3404 between the connection point and the hoist 3402. In one embodiment, the sensing device 3408 is a hydraulic cylinder that is placed between the first connection 3404 and the hoist 3402. As the load is increased, the pressure within the hydraulic cylinder increases, and the pressure is then measured by one or more pressure sensors within the hydraulic cylinder, and that pressure is provided to one or more other devices, such as the hoist electronic processor 210 or controller electronic processor 310. In other embodiments, the load sensing device 3408 includes one or more strain or load sensors configured to sense a load or strain in the first connection 3404. In some examples, the strain or load sensors may be located on the second connection 3406 to detect a force applied to the second connection 3406 by the load. In still further examples, the load sensing device 2408 is a tensionmeter applied to either the first connection 3404 or the second connection 3406 to detect a change in tension of the connection. One or more sensors within the tensionmeter may detect an amount of tension caused by the load, and transmit that data to the hoist electronic processor 210 or controller electronic processor 310.

Figure 35:
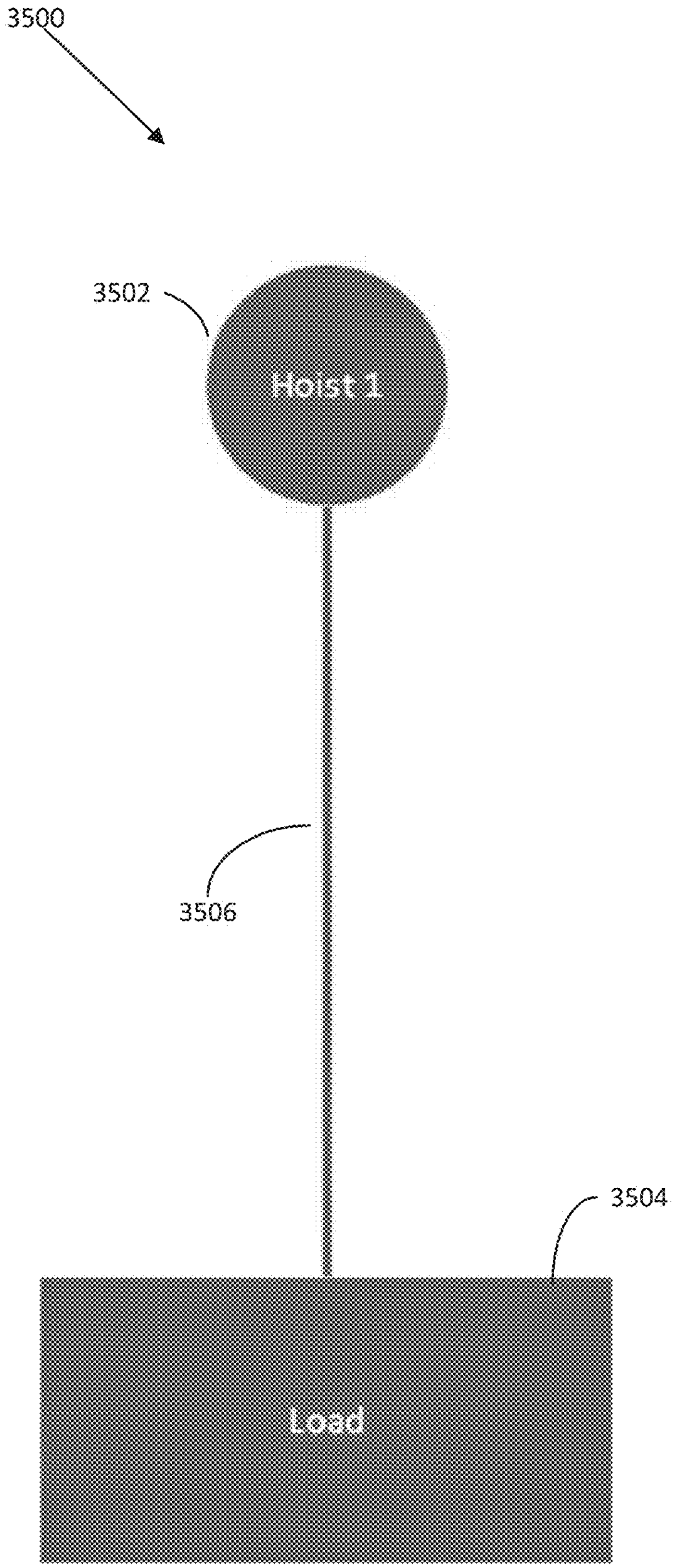
FIG. 35 illustrates a system for determining a dynamic loading of a hoist system in accordance with some embodiments.

Turning now to FIG. 35, a system 3500 for determining a dynamic loading of the hoist 3502 is shown, according to some embodiments. Dynamic load measurements allow for a magnitude of load to be determined while the load is in motion, e.g. being raised or lowered by the hoist 3502. As shown in FIG. 35, the hoist 3502 is coupled to a load 3504 via a load connection 3506. It should be understood that the hoist 3502 may be similar to the hoist device 110 or other hoist devices described herein. Also, the load connection 3506 may be a chain, a wire cable, or other applicable connection for use with the hoist 3502.

In order to determine a dynamic load value, an electronic processor, such as the hoist electronic processor 210 described above, of the hoist 3502 may compare an actual speed of the hoist motor to an expected speed. The difference between the expected speed and the actual speed is proportional to the load. In some examples, the hoist 3502 may control a motor to raise and lower the load 3504. The hoist 3502 may control the speed of the motor by varying the duty cycle of a PWM cycle. For a no-load condition, the expected speed at a given duty cycle is known by the electronic processor (e.g., from experimental testing and storing values in the hoist memory 220 at manufacture). The electronic processor may further receive a speed feedback signal from the motor 250 (e.g., from associated Hall sensors providing signals indicating motor speed). The electronic processor then can be configured to determine the difference between the expected speed (e.g. the no-load speed) and the actual speed to determine a magnitude of the load.

In other examples, motor current may be used in lieu of motor speed. For example, the electronic processor may measure a current measured when lifting load at a given PWM duty cycle. The electronic processor then correlates the measured current at the determined duty cycle to determine the magnitude of the load. In one example, the electronic processor may access a look up table to determine a load magnitude based on the measured current and determined PWM duty cycle applied to the motor. In some embodiments, the hoist 3502 may only use static measurements or dynamic measurements. However, in some embodiments, the hoist 3502 may use both static and dynamic load measurements to provide additional verification of the load magnitude.

Figure 36:
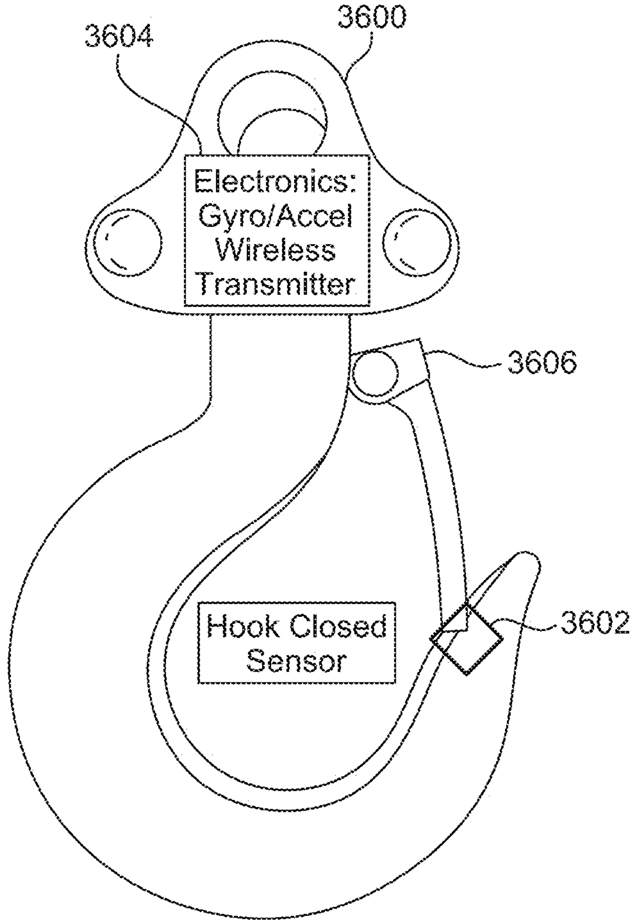
FIG. 36 illustrates a smart hook for use with a hoist system in accordance with some embodiments.

Turning now to FIG. 36, a smart load hook 3600 for use with a hoist, such as hoist device 110 is shown, according to some embodiments. The smart hook 3600 includes a hook mouth closed sensor 3602 and an electronics module 3604. The hook mouth closed sensor 3602 may be configured to provide an indication to one or more of the electronic processors herein-described, such as the hoist electronic processor 210 or the controller electronic processor 310, that the hook latch or hasp 3606 of the hook 3600 is closed, thereby securing the load. The hook mouth closed sensor 3602 may be in electronic communication with the electronics module 3604. The electronics module 3604 may include one or more sensors, such as gyroscopes, accelerometers, etc. The electronics module 3604 may further include a wireless transmitter for communicating with one or both of the hoist device 110 and the hoist controller 120. The wireless transmitter may utilize Bluetooth, Bluetooth Low Energy ("BLE"), Wi-Fi, ZigBee, RF, 4G, 5G, IR, or any other applicable wireless communication protocol. In other examples, the electronics module 3604 may use a wired communication protocol to transmit data to one or both of the hoist device 110 and the hoist controller 120, or other external device.

Figure 37:
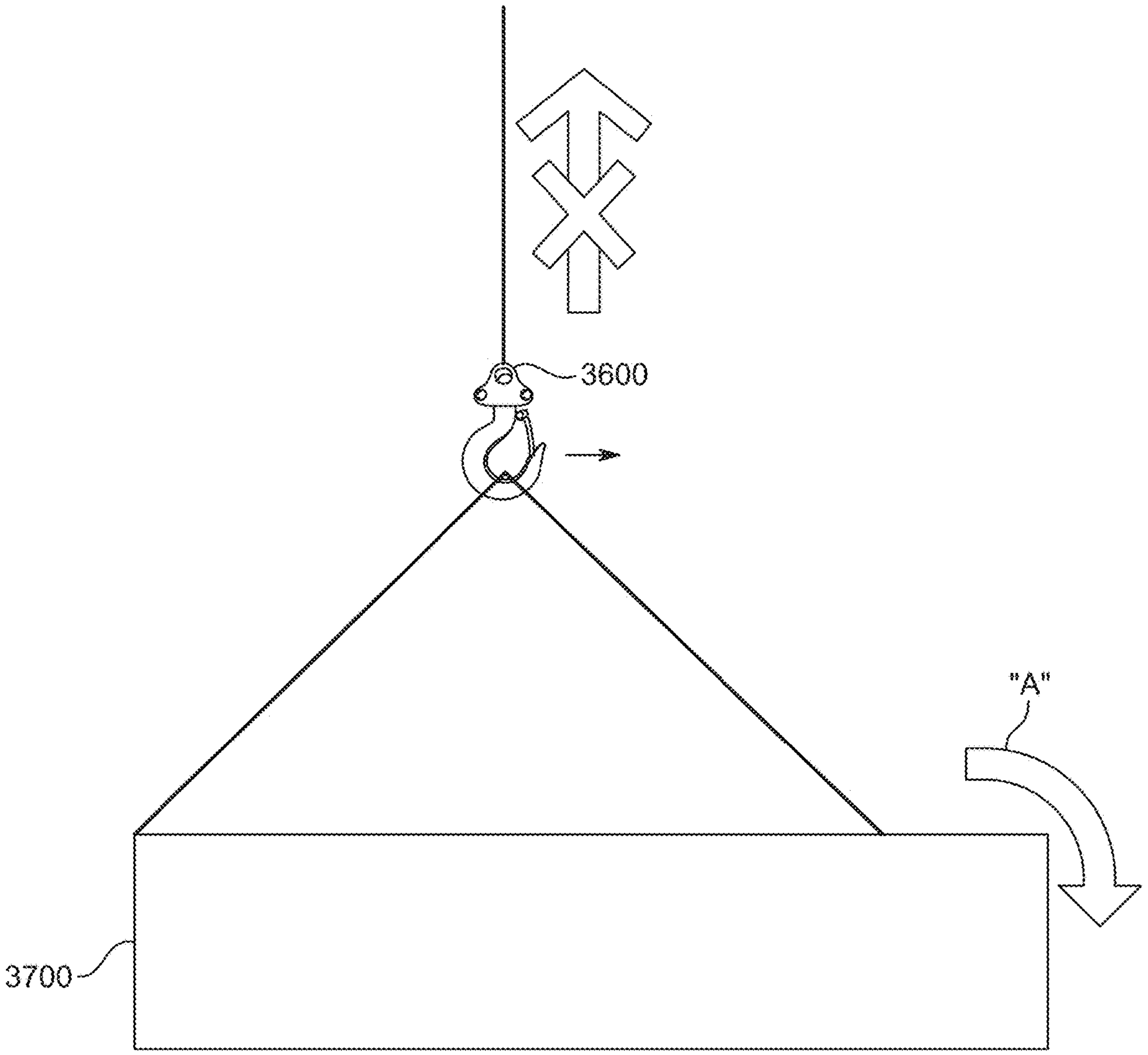
FIG. 37 illustrates a system incorporating the smart hook of FIG. 36 in accordance with some embodiments.

The sensors in the smart hook 3600 may be configured to determine if the load is imbalanced. For example, the accelerometer and/or gyroscope of the electronics module 3604 can detect orientations or movements of the smart hook 3600 that can indicate an imbalance of the load (e.g. the smart hook is not on dead center of the load during a lift). This can be seen in FIG. 37, whereby a load 3700 is off center, causing a movement in direction "A," which translates to a lateral motion of the smart hook 3600. This movement may be detected by the sensors within the electronics module 3604. The electronics module may transmit the sensor data, along with the mouth closed sensor data to one or both of the hoist device 110 and the hoist controller 120, or other external device using the wireless transmitter of the electronics module 3604. In response, the hoist device 110, the hoist controller 120, or both may take a responsive action, such as stopping the motor 250 or generating an alert (e.g., illuminating an LED of the hoist controller 120 or the hoist device 110) to notify a user.

Figure 38:
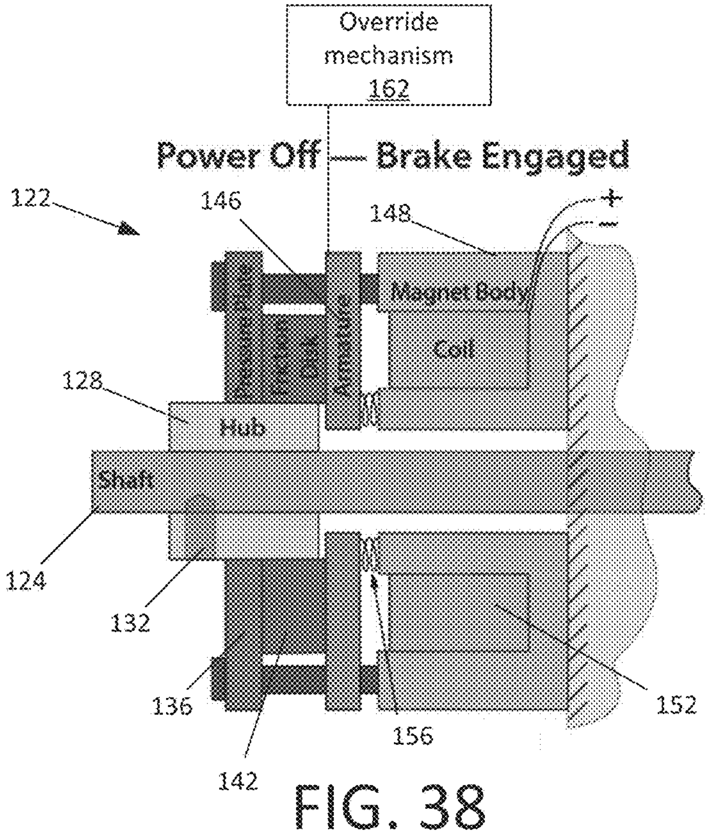
FIG. 38 illustrates an electromechanical brake in the engaged position.
Figure 39:
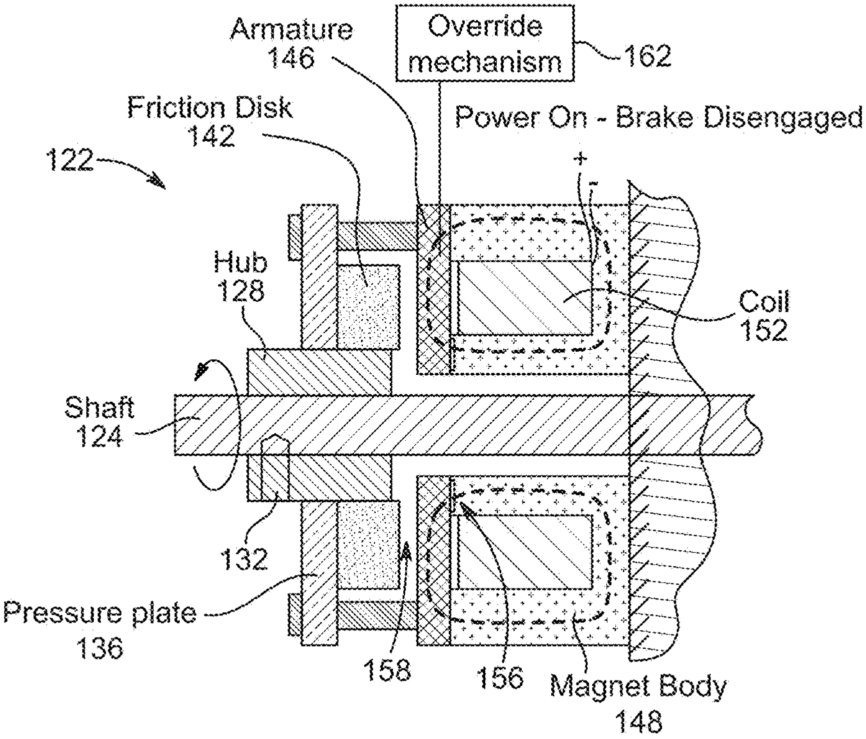
FIG. 39 illustrates the electromechanical brake in the disengaged position.

FIGS. 38-41 illustrate backup manual operation mechanisms for the hoist device 110 (FIG. 2A). FIGS. 38 and 39 illustrate an electromagnetic brake 122 attached to an output shaft 124 of the hoist motor 250. The electromagnetic brake 122 may be controlled by the user via the hoist controller 120. The electromagnetic brake 122 includes a hub 128 surrounding the output shaft 124, a set screw 132 to couple the hub 128 to the motor shaft 124, a pressure plate 136, a friction disk 142, an armature 146, a magnetic body 148, and a coil 152 positioned within the magnetic body 148. When the hoist device 110 is powered off or the electromagnetic brake 122 is engaged, the armature 146 is urged against the friction disk 142 by a biasing member 156 (e.g., a coil spring), to restrict movement of the output shaft 124.

When the hoist device 110 is powered on, a magnetic flux is formed between the coil 152, the magnet body 148, and the armature 146 to compress the biasing member 156 so the armature 146 disengages with the friction disk 142. As a result, an air gap 158 is formed between the armature 146 and the friction disk 142 to allow the output shaft 124 to rotate. In some embodiments, an electromagnetic brake 122 may include an override mechanism 162 that is operably coupled to the armature 146 to allow a user to manually close the armature 146 to disengage the electromagnetic brake 122. For example, the override mechanism 162 may be a lever integrated with the electromagnetic brake assembly 122, or may be adjusted using a screw driver or other tools. Manually disengaging the electromagnetic brake 122 may allow the user to adjust the length of the chain 115 to adjust the positioning of the workpiece (FIG. 1) coupled to the chain 115 when the hoist motor 250 is deactivated.

Figure 40:
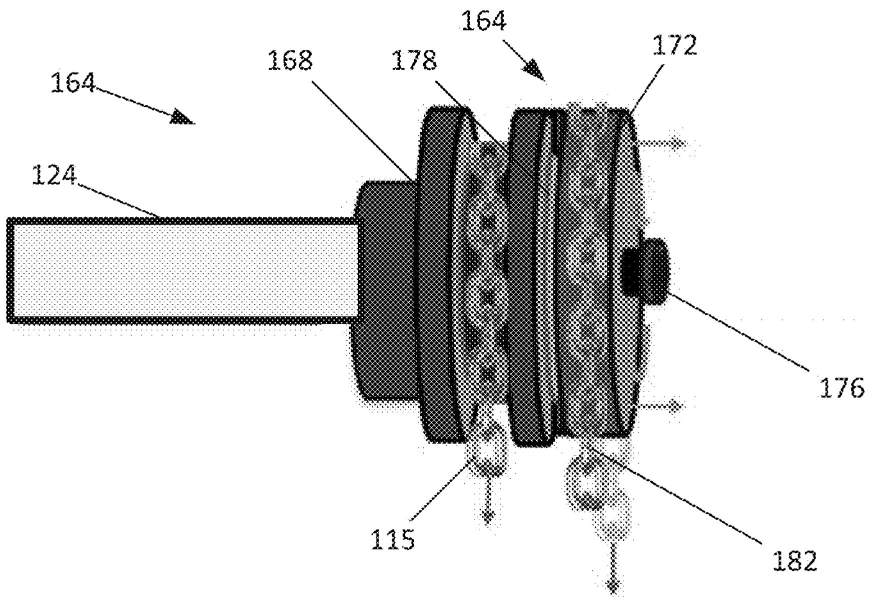
FIG. 40 illustrates a manual operation mechanism operably coupled to the motor shaft of the hoist device in a first position.
Figure 41:
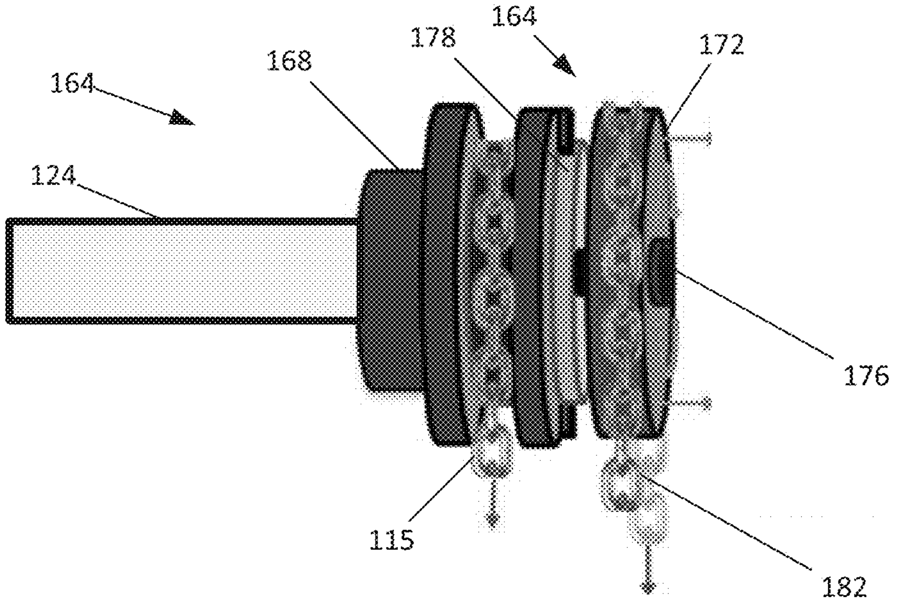
FIG. 41 illustrates a manual operation mechanism operably coupled to the motor shaft of the hoist device in a second position.

FIGS. 40 and 41 illustrate a manual operation mechanism 164 that may be coupled to the output shaft 124 of the hoist motor 250. The manual operation mechanism 164 includes an output device 168 that moves the chain 115, a hand wheel 172 operably coupled to the output device 168 via a threaded shaft 176, and a ratchet 178 positioned between the threaded shaft 176 and the hand wheel 172. A second chain or lever 182 (e.g., a hand chain) is coupled to the hand wheel 172 to allow the user to rotate the hand wheel 172 relative the output device 168. If the user desires to manually adjust the position of the workpiece 130 attached to the chain 115, the user may grasp and pull the second chain 182, which causes the hand wheel 172 to rotate on the threaded shaft 176. As the second chain 182 is driven up the shaft 176 (41. 4), the second chain 182 disengages the hand wheel 172 from a slip clutch positioned between the output device 168 and the hand wheel 172, while the ratchet 178 remains stationary. As a result, the threaded shaft 176 rotates the output device 168 to lower the chain 115 to allow the user to manually adjust the length of the chain 115 via the second chain 182. If the user releases the second chain 182, the second chain 182 will stop moving and the ratchet 178 engaged with the motor shaft 124 to stop movement and suspend the workpiece 130 on the chain 115. In other embodiments, other tools may be used in place of the second chain 182 to manually adjust the positioning of the chain 115.

In some embodiments, a ratcheting device, such as a ratcheting socket may be coupled to manual operation mechanism 164 to allow a user to manually adjust the position of the workpiece 130 attached to the chain 115, thereby eliminating the need for a second chain or lever 182 to be permanently attached to the manual operation mechanism 164. In some embodiments, the manual operation mechanism 164 and/or the hoist motor 250 may include a fitting to allow for a user to couple a powered device or hand operated device to adjust the position of the workpiece 130 attached to the chain 115. The fitting may be various types of fittings, such as square fittings, hex fittings, 12 point drive fittings, etc. By using a powered device or a hand crank connected to the fitting, the manual operation mechanism 164 allows the load to be lowered even when power to the hoist motor 250 is removed.

FIGS. 42-44C illustrate auto stop features for the hoist device 110. The auto stop features discussed below may be used together or separately from each other to automatically stop the hoist device 110 when the chain 115 reaches end of travel on either end. The auto stop feature may provide the necessary detection of end of chain 115 for normal operation of the hoist device 110 and in cases where the hoist device 110 may fail (e.g., if the motor 250 loses power during a lift).

Figure 42:
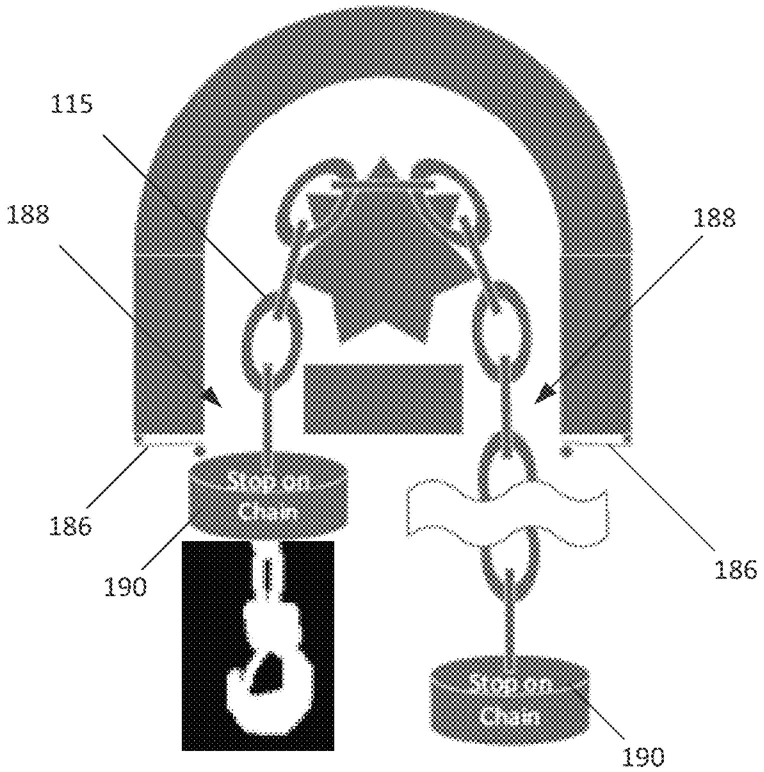
FIG. 42 illustrates a limit switch mechanism for the hoist device.

As illustrated in FIG. 42, the hoist device 110 includes a limit switch 186 positioned adjacent each chain receiving opening 188 on the hoist device 110. The chain 115 may include a stop 190 adjacent each end of the chain 115 that interacts with the limit switches 186 to provide a signal to the hoist device 110, that the chain 115 is near the end of travel. When the hoist device 110 receives the signal, the hoist electronic processor 210 (FIG. 2B) deactivates the hoist motor 250. It should be appreciated that the limit switch 186 may include mechanical limit switches (FIGS. 43A and 43B), Hall-effect sensors, distance run measurement, speed measurement, and/or the like. Additionally, the hoist transceiver 230 may communicate with the hoist controller 120 (e.g., a joystick controller (see FIGS. 20 and 25A-C), a smart telephone (see FIG. 24), a tablet computer, and the like) to alert the user that the limit switch 186 was actuated. The user may also adjust the sensitivity or configuration of the limit switch 186 via the hoist controller 120. For example, the hoist controller 120 may track the number of times that the limit switch 186 is actuated to determine when the limit switch 186 should be repaired, changed, or tested. The hoist transceiver 230 may further communicate other warnings or alerts (e.g., low battery, speed, overload, etc.) to the hoist controller 120 using devices such as LED indicators, buzzer(s), and/or the like. Additionally, the hoist controller 120 may allow the user to set a constant speed of operation.

Figure 43A:
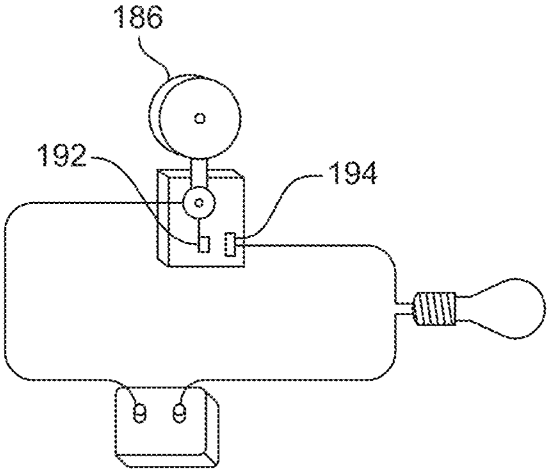
FIG. 43A illustrates the limit switch mechanism for the hoist device according to one embodiment.
Figure 43B:
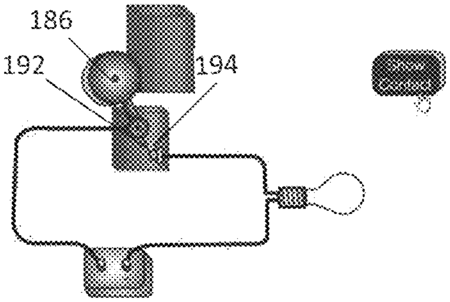
FIG. 43B illustrates the limit switch mechanism of FIG. 43A when a stop interacts with the limit switch mechanism.

As illustrated in FIGS. 43A and 43B, the limit switch 186 may be a mechanical limit switch that is used to detect the presence of an object when physical contact is made between the object (e.g., the stop 190) and the limit switch 186. The limit switch 186 may include a lever 192 that is moved to close a set of electrical contacts 194 when the stop 190 actuates the limit switch 186 (FIG. 43B). The engagement of the lever 192 with the electrical contacts 194 completes a circuit, which sends a signal to the hoist electronic processor 210 (FIG. 2B) to deactivate the hoist motor 250.

In other embodiments, the limit switch 186 may be an electromechanical rotary limit switch to automatically stop travel when a set number of revolutions or rotational position is reached. The hoist device 110 may have a preset number of revolutions that correlate to the maximum distance the chain 115 can travel or the minimum distance the chain 115 can travel. In other embodiments, the limit switch 186 may detect the number of chain links to automatically stop the hoist device 110 when a predetermined number of chain links has been detected. In some embodiments, the hoist controller 120 or a separate device (e.g., a smart phone) is configured to communicate with the hoist device 110 to set the limits for travel of the chain 115. For example, the user may control the hoist device 110 to move the chain 115 to a desired maximum limit (whether upper or lower limit), and then press a button the user interface of the hoist controller or device, which causes transmission of a signal to the hoist device 110 to store the current chain 115 position as a limit (whether in terms of a rotational position of a rotary encoder or chain link). Then, during later operation, the hoist device 110 is configured to stop driving the motor 250 when the chain 115 reaches the limit previously set. A similar process can be used to set both the upper limit and lower limit.

In other embodiments, the limit switch 186 may include an ultrasonic pulse generator and receiver. The ultrasonic pulse generator may be configured to transmit an ultrasonic pulse along the length of chain. The ultrasonic pulse may return to the ultrasonic receiver after reaching the end of chain, and a time to return may be determined and used to determine a length of chain between the hoist device 110 and the end of the chain 115. In other embodiments, a change in frequency of the ultrasonic pulse may be used to determine the length of chain 115 remaining. In one embodiment, the limit switch 186 may be a time-of-flight ("ToF") sensor configured to detect a time-of-flight of a signal from the hoist device 110 to the end of the chain. In one embodiment, the time of flight may be a laser or ultrasonic time-of-flight sensor. For example, a laser emitter on the hoist device 110 may configured to transmit a laser output which is received by a receiving device at the end of the chain. The ToF sensor may be configured to determine a length of the chain based on the measured time of flight of the laser signal. In other embodiments, the ToF sensor is a radio TOF sensor. The hoist device 110 may have a radio transceiver in communication with a second radio transceiver located at the end of the chain 115. Radio signals may be transmitted and received from both radio transceivers, and the associated time of flight for the signals to be received after being transmitted (or transmitted and subsequently received) may be used to determine a length of the chain 115.

In still further embodiments, the limit switch 186 may include a weight sensor to weigh the non-loaded length of the chain 115. For example, a storage device, such as a bag may hold the excess (non-loaded) chain 115. The limit switch 186 may measure the weight of the chain in the storage device and determine a length of loaded and unloaded chain 115 based on the weight.

Figure 44A:
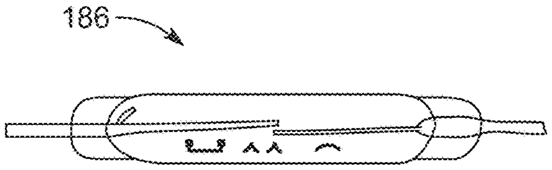
FIG. 44A illustrates the limit switch mechanism for the hoist device according to another embodiment.
Figure 44B:
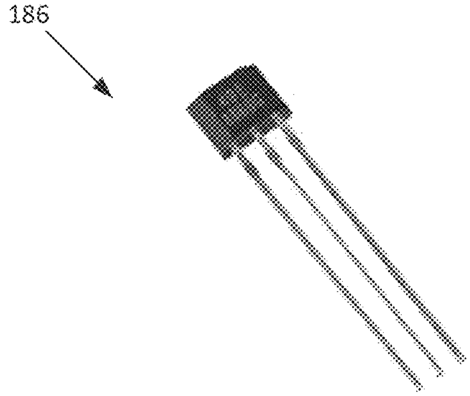
FIG. 44B illustrates the limit switch mechanism for the hoist device according to another embodiment.

As illustrated in FIGS. 44A and 44B, the limit switch 186 may be a reed switch (FIG. 44A) or Hall sensor (FIG. 44B) used as proximity switch that detects a magnetic field. In such an embodiment, the chain 115 may include a magnetic device attached to each end of the chain 115 to produce a magnetic field. For example, the stops 190 may be configured to include a magnet. As a result, the reed switch or Hall sensor, when acted upon by a magnetic field as the end of the chain 115 becomes proximate to the reed switch or Hall sensor, functions to detect the nearby end of the chain 115 and send a signal to the hoist electronic processor 210 (FIG. 2B) to deactivate the hoist motor 250.

Figure 44C:
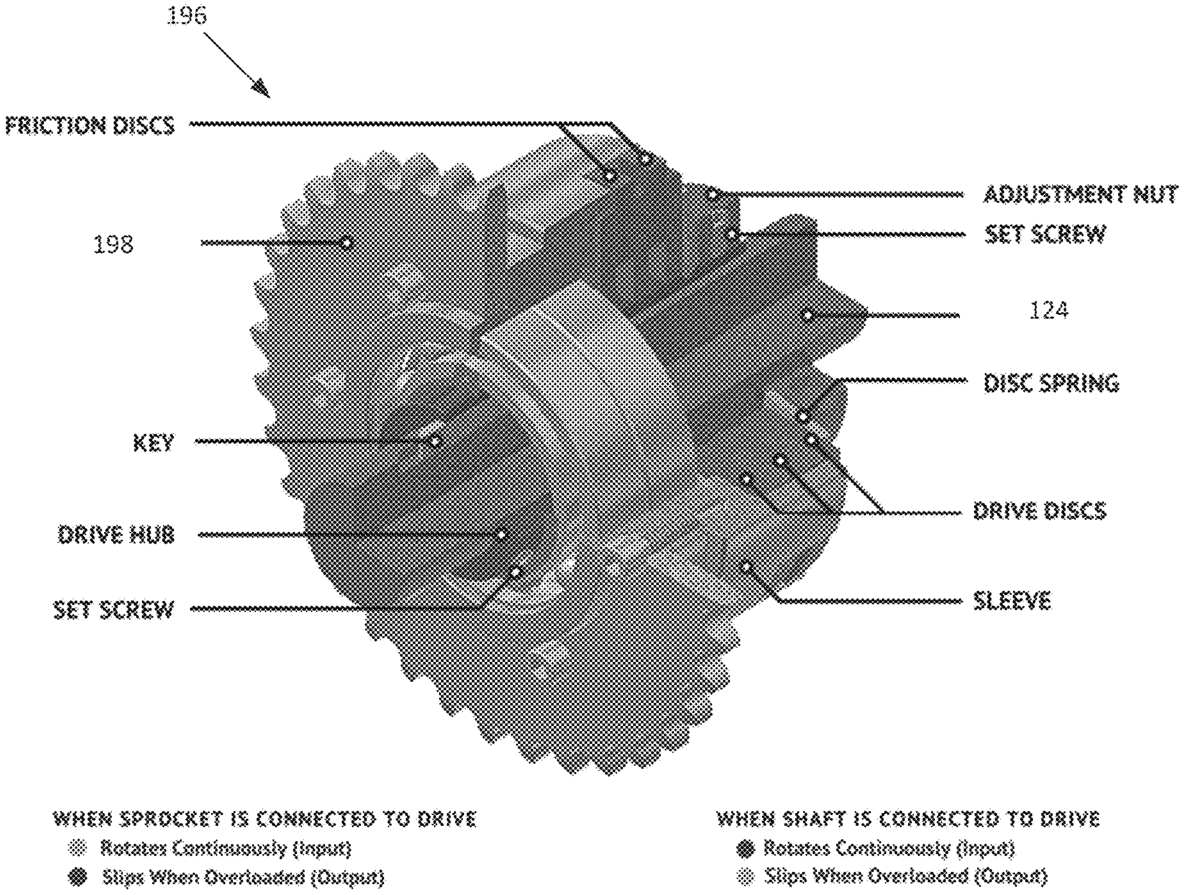
FIG. 44C illustrates a hard stop or overloading clutch mechanism for the hoist device.

In other embodiments, as illustrated in FIG. 44C, the hoist device 110 may include a hard stop or overload limiting clutch 196 that is coupled to the output shaft 124. The clutch 196 may include a sprocket 198 that is operably coupled to the output shaft 124. In some embodiments, the sprocket 198 may be connected to an output device that drives the chain 115. When the chain 115 abruptly stops or hits the body of the wireless hoist device 110, the clutch 196 detects an overload condition that causes the output shaft 124 to slip relative to the sprocket 198 (e.g., the sprocket 198 continuously rotates). In other embodiments, the output shaft 124 may be connected to the output device that drives the chain 115. Therefore, when the clutch 196 detects the overload condition, the sprocket 198 slips relative to the output shaft 124 (e.g., the output shaft 124 continuously rotates). In either case, the slippage between the output shaft 124 and the sprocket 198 causes the chain 115 to stop ascending or descending.

In some examples, other auto-stop devices may be used with the hoist device 110. In one example, the chain 115 may be painted, coated, or otherwise made to have different colors near the ends of the chain 115. A sensor, such as an imaging sensor, an infrared sensor, or other sensor within the hoist device 110 may be configured to detect the color change and stop the operation of the hoist device 110 before the end of the chain is reached. In other embodiments, the ends of the chain 115 may be sized differently (e.g. larger or smaller links), which can be detected by the hoist device 110 and subsequently cause the hoist device 110 to stop before the end of the chain is reached.

Figure 45:
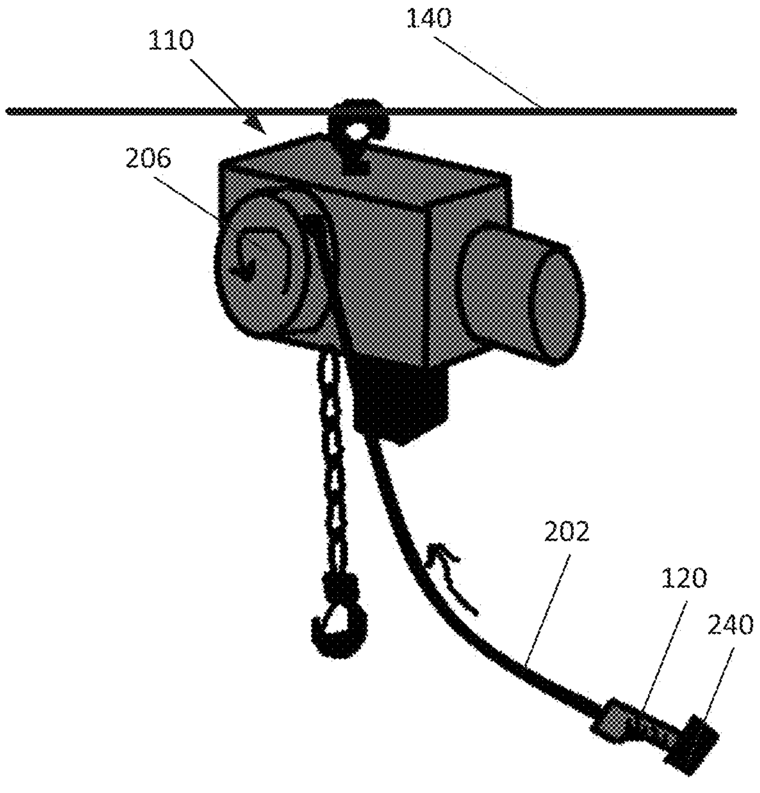
FIG. 45 illustrates a hoist controller operably coupled the hoist device via a retractable cord.
Figure 46:
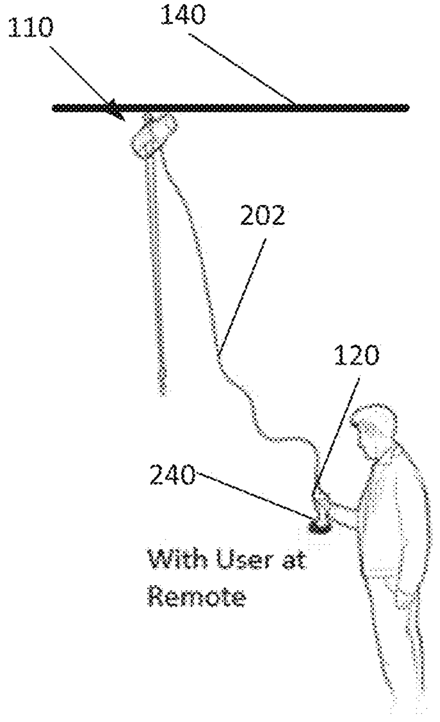
FIG. 46 illustrates a user operating the hoist device of FIG. 45.
Figure 47:
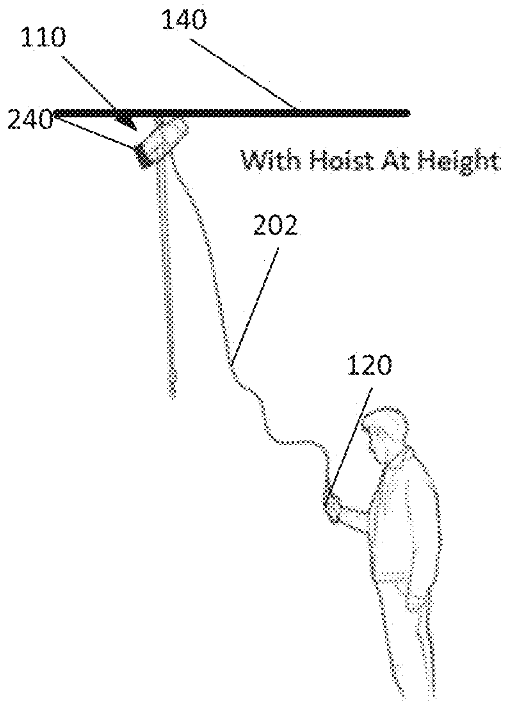
FIG. 47 illustrates user operating the hoist device according to another embodiment.

FIGS. 45-47 illustrate the hoist controller 120 attached to the hoist device 110 via a retractable cord 202. The cord 202 may be attached to the hoist device 110 via a rotatable reel 206 on the hoist device 110. The user may adjust the length of the cord 202 relative to the hoist device 110. As a result, the length of the cord 202 may be adjusted to account for different installation heights for the hoist device 110 when the hoist device 110 is attached to a support surface 140. Additionally, the cord 202 may be retracted and wrapped around the reel 206 when the hoist device 110 is not in use.

With reference to FIGS. 45 and 46, the power supply 240 of the hoist device 110 may be coupled to the hoist controller 120. As a result, the user may remove and replace the power supply 240 (e.g., with another, fully charged power supply 240) while the hoist device 110 remains suspended from the support surface 140.

Figure 48:
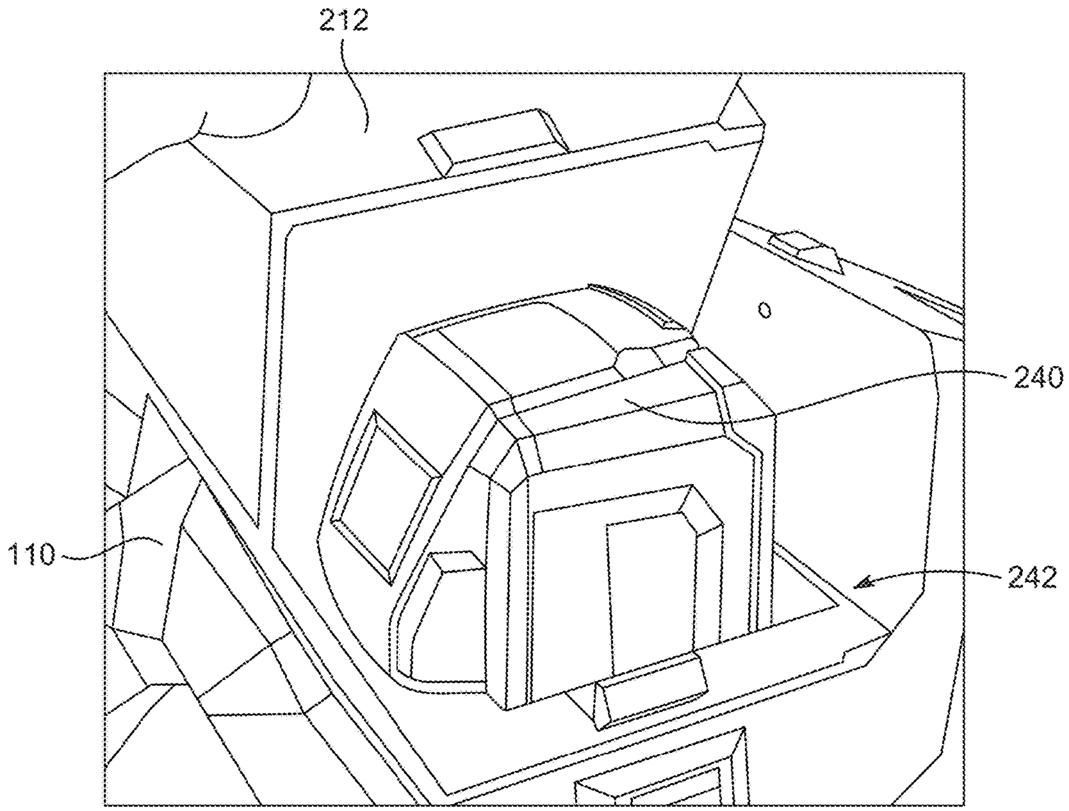
FIG. 48 illustrates a power supply storage compartment for a hoist device.

In other embodiments, as illustrated in FIGS. 47 and 48, the power source 240 may be coupled to and positioned onboard the hoist device 110. As a result, the weight of the power source 240 is supported by the hoist device 110, resulting in the controller 120 having a reduced weight. The hoist device 110 may include a power source storage area 242 (FIG. 48) to secure and enclose the power source 240 within the hoist device 110. The power source storage area 242 includes a door 212 that is pivotally coupled to the hoist body to allow the user to selectively access the power source 240 (e.g., to replace the power source 240). The door 212 protects the power supply 240 from the environment while the hoist device 110 in operation.

Figure 49:
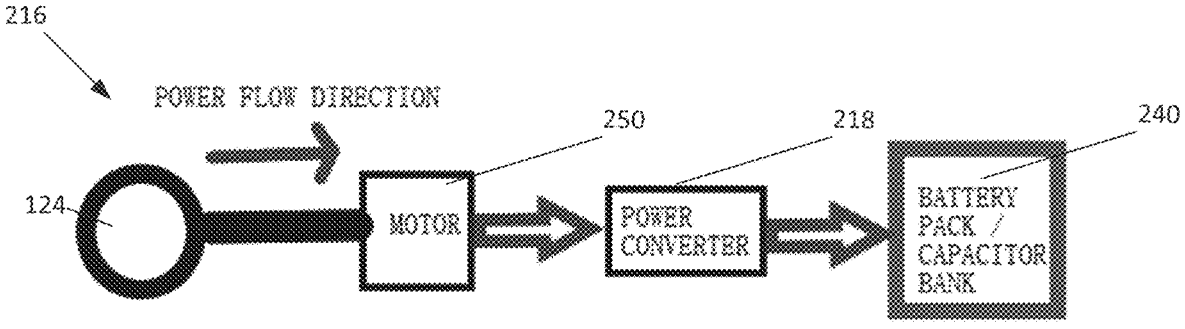
FIG. 49 illustrates a regenerative braking mechanism for a hoist device.

With reference to FIG. 49, the hoist device 110 may further include a regenerative braking mechanism 216 for use with the hoist motor 250. The regenerative braking mechanism 216 includes a power converter 218 that converts kinetic energy created during operation of the hoist device 110 into electrical energy that can be stored in the power supply 240. For example, FIG. 49 illustrates the power flow through the hoist device 110 using the regenerative braking mechanism 216. When motor shaft 124 rotates the chain 115 of the hoist device 110 to lower a suspended workpiece 130 (FIG. 2A), the regenerative braking mechanism 216 may reduce the speed of the workpiece 130 as it is lowered by using the kinetic energy of the workpiece 130 to drive the power converter 218, which in turn produces electricity for storage in the power supply 240. In some embodiments, the hoist device 110 may include a separate capacitor bank that is operably coupled to the power supply 240 to store the energy. The regenerative braking mechanism may reduce heat loss, increase efficiency of the hoist device 110, and reduce wear of mechanical brake components to extend the life of the components. The power converter 218 may be, for example, a generator in which the rotating motor shaft, being driven at least in part by gravitational forces pulling on the load, drives a rotor of the generator, which induces current in a stator of the generator. The induced current is then provided to the battery pack 240 or capacitor bank.

Figure 50:
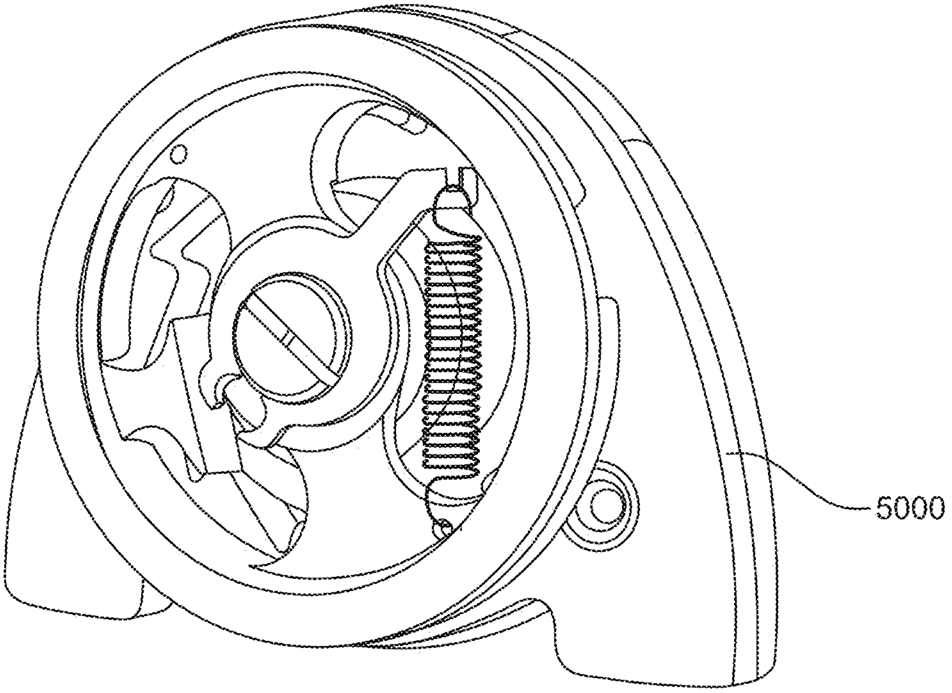
FIG. 50 illustrates an inertial locking device for a hoist device, according to some embodiments.

To prevent uncontrolled descending of the workpiece 130 following the motor 250 losing power (such as a battery being discharged), the hoist device 110 includes redundant and fail-safe systems to allow for the load to be safely lowered. Turning now to FIG. 50, an inertial locking device 5000 is shown. The inertial locking device 5000 is configured to stop rotation of the hoist motor 250, the transmission, or the output shaft of the hoist device 110 when an inertia of the load exceeds a predetermined value. The predetermined value may be set to engage the inertial locking device 5000 when a load is determined to be free falling. As shown in FIG. 50, the inertial locking device 5000 is a mechanical device. However, in some embodiments the inertial locking device 5000 may be an electronic inertial locking device 5000 including one or more inertia sensors coupled to an electronically activated inertial lock.

Figure 51:
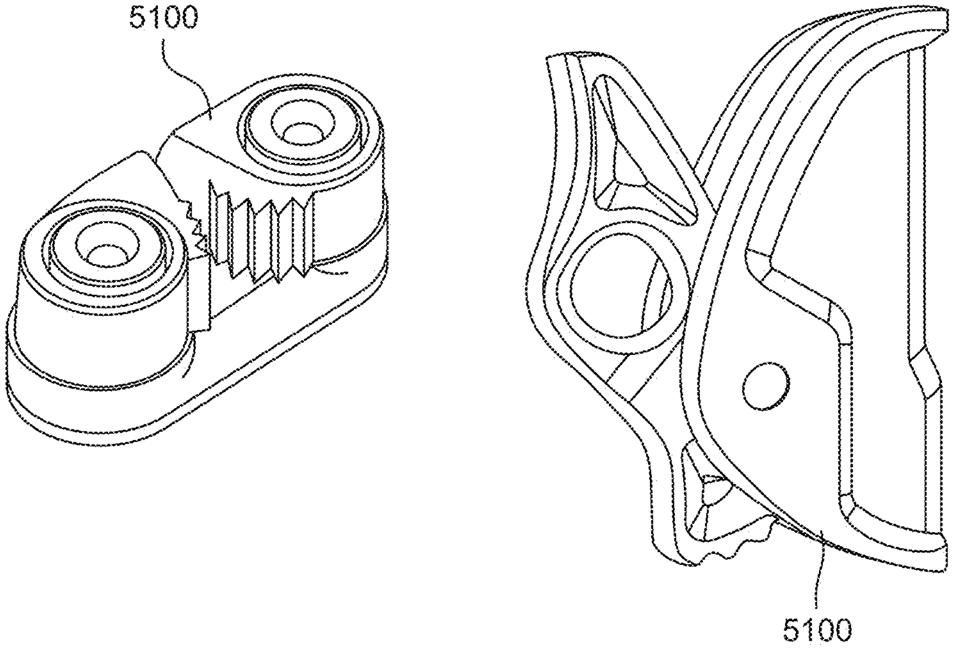
FIG. 51 illustrates cam locks for a hoist device, according to some embodiments.

Turning now to FIG. 51, cam locks 5100 may be installed on the chain 115 or cable to prevent a load from free falling. The cam locks 5100 may be configured to apply a force to the chain 115 and/or cable when the load descends at a speed that is sufficient to engage the cam locks 5100. Upon the cam locks 5100 being engaged, they prevent additional cable or chain from passing through the cam locks 5100, thereby stopping the motion. To disengage the cam locks 5100, the load must be slightly raised and then lowered at a speed below the engagement speed of the cam locks 5100. In some embodiments, the cam locks 5100 are coupled to the hoist device 110. However, in other embodiments, the cam locks may be coupled to a support structure external to the hoist device 110.

Figure 52A:
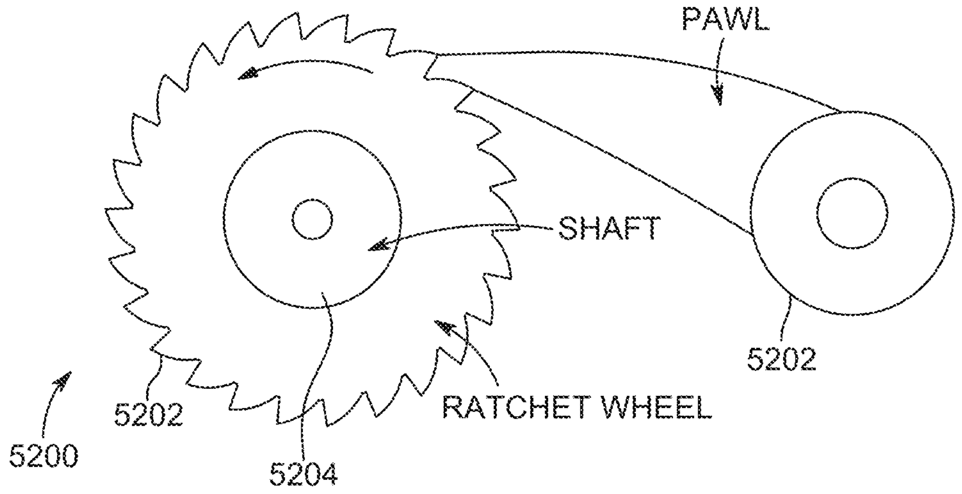
FIG. 52A illustrates a mechanical ratchet/clutch system for a hoist device, according to some embodiments.

FIG. 52A illustrates a mechanical ratchet/clutch system 5200. The mechanical ratchet/clutch system 5200 includes a ratchet wheel 5202 coupled to a drive shaft 5204 of the hoist device 110. However, in some examples, the ratchet wheel 5202 may be coupled to other stages of the drive train, or the output of the hoist device 110. The ratchet/clutch system 5200 further includes a pawl 5206 configured to engage with the ratchet wheel. The pawl 5206 is configured to engage with the ratchet wheel 5202 to prevent rotation of the shaft 5204 in a first direction. The first direction is a direction associated with lowering a load. In some embodiments, the pawl 5206 engages the ratchet wheel 5202 unless disengaged, thereby preventing movement of the drive shaft 5204. The ratchet/clutch system 5200 may further be used to prevent a free fall of the hoist device 110 during a loss of power or other condition.

Figure 52B:
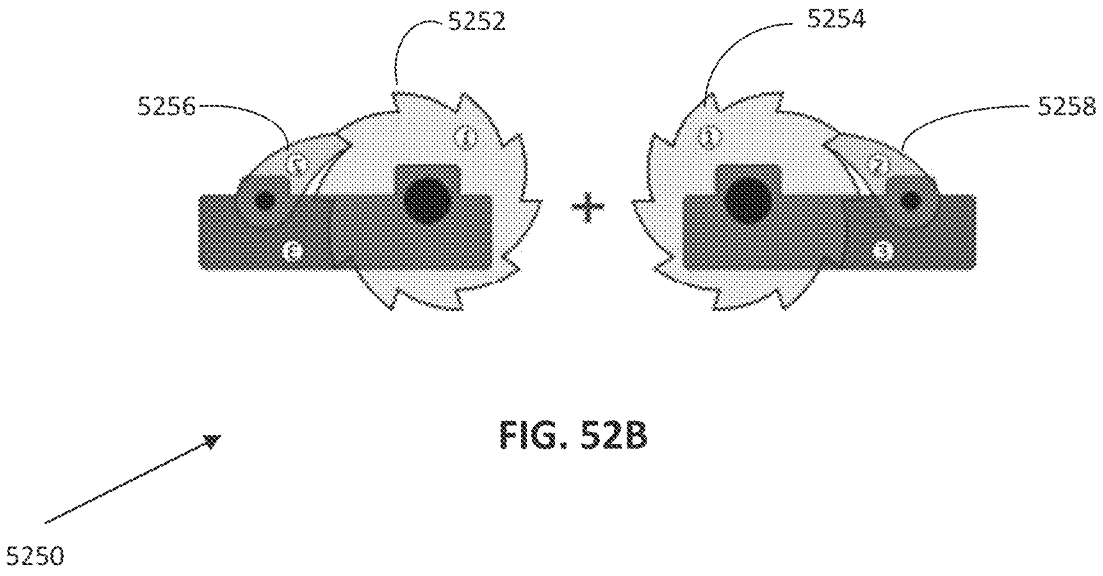
FIG. 52B illustrates a two-way ratchet clutch system for a hoist device, according to some embodiments.

FIG. 52B illustrates a two-way ratchet clutch 5250 that locks in the opposite direction that the load is moving. The two-way ratchet clutch has a first ratchet 5252 and a second ratchet 5254. The first ratchet 5252 engages with a first pawl 5256, and the second ratchet 5254 engages with a second pawl 5258. Depending on the direction the load is moving, the associated ratchet 5252, 5254 moves in the direction of the load, but the other ratchet 5252, 5254 is locked to prevent the load from moving in the opposite direction. Where the load is stationary, both ratchets 5252, 5454 are locked, such as via a directional lever that opens one direction with rotation, or via a solenoid (not shown). In one embodiment, the ratchets 5252, 5254 are installed on the drive shaft of a hoist motor. However, in some examples, the ratchets may be installed on any part of the drive train. This mechanism can prevent the load from moving if power is removed from the hoist by mechanically locking the drive shaft.

In some embodiment, the above ratchet clutches 5200, 5250 may be coupled to one or more sprockets within the hoist device 110 that are coupled to the drive shaft. In some embodiments, the ratchet clutches 5200, 5250 may be coupled to a final sprocket in direct connection with the chain holding the load, as described above. Thus, in the event of a drive shaft malfunction (e.g. drive shaft becomes loose, etc.), the ratchet clutches 5200, 5250 engage the final sprocket to prevent movement of the load.

Figure 53:
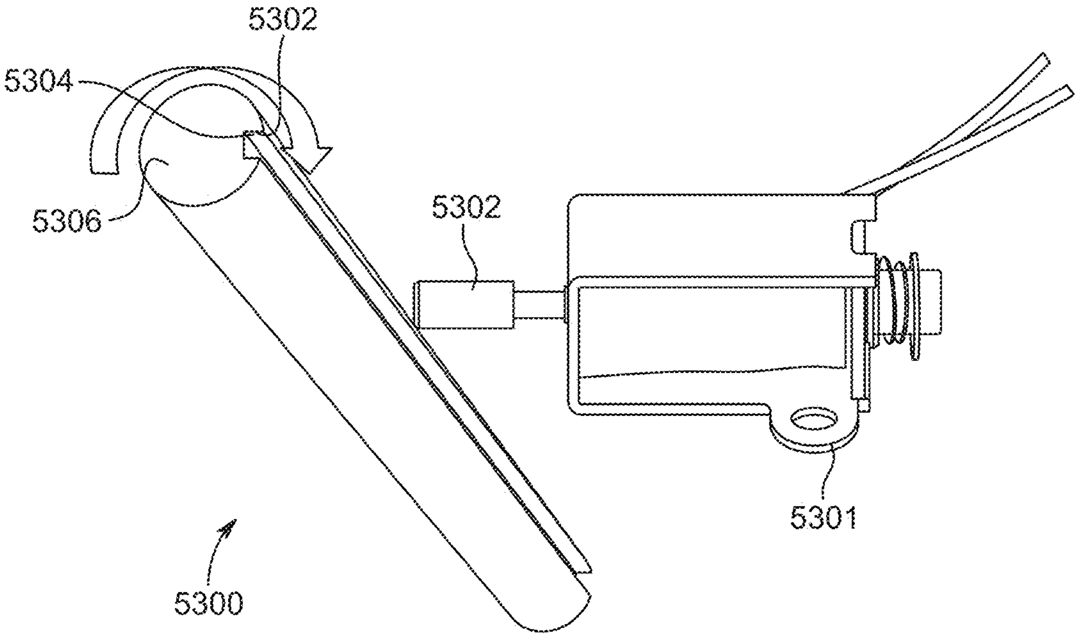
FIG. 53 illustrates a solenoid based locking system for a hoist device, according to some embodiments.

FIG. 53 illustrates a solenoid based locking system 5300 to prevent the load from being lowered when power is removed from the hoist device 110. The solenoid based locking system 5300 uses a solenoid 5301 driven pin 5302 that interfaces with a slot or hole 5304 in the drive shaft 5306, to prevent movement of the drive shaft 5306. In one embodiment, the solenoid 5301 may be configured to remove the pin 5302 from the slot or hole 5304 in the drive shaft 5306 when power is applied to the solenoid 5301. Accordingly, when power is removed from the solenoid 5301, the pin 5302 is released, causing interaction with the slot or hole 5304 in the drive shaft 5306, thereby preventing movement of the load when power is lost.

Figure 54:
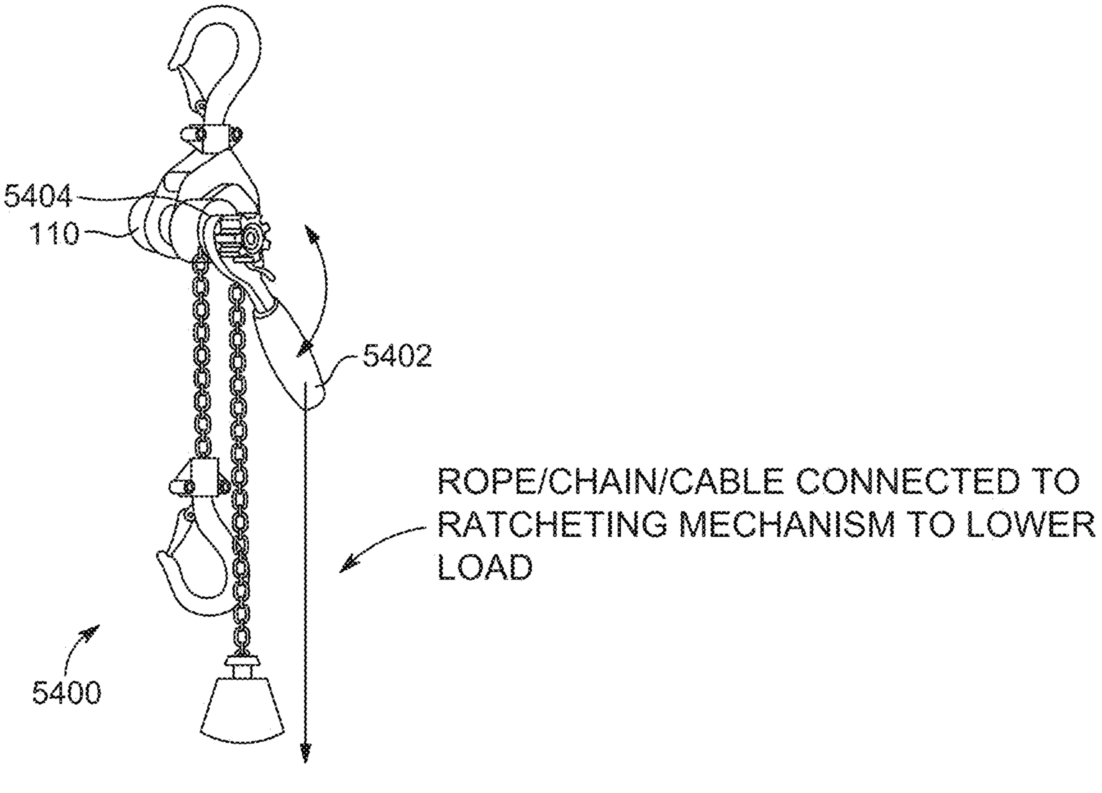
FIG. 54 illustrates a ratcheting mechanism for a hoist device, according to some embodiments.

FIG. 54 illustrates a ratcheting mechanism 5400 that can be used to manually lower or raise a load of the hoist device 110 in the event of a power loss. A manual ratchet handle 5402 may be attached to a ratchet input 5404 of the hoist device 110. A user may manually actuate the manual ratchet handle 5402 to raise or lower the load. In one embodiment, the ratchet input 5404 may be coupled to one or more gears within the hoist device 110 to allow for a force reduction such that the user can easily manipulate the load via the manual ratchet handle.

Figure 55:
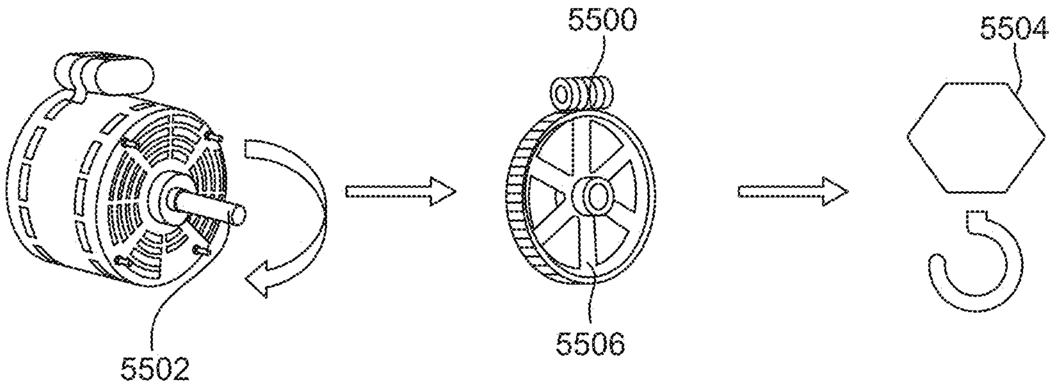
FIG. 55 illustrates a worm gear mechanism for a hoist device, according to some embodiments.

In some embodiments, the hoist device 110 may include a transmission, as described above, having a high enough gear reduction ratio such that the friction created by the gearing is not overcome by a load attached to the hoist. In other embodiments, the hoist device 110 may use a continuous drive train to eliminate clutches that may be susceptible to failure during operation. As shown in FIG. 55, in some embodiments, the hoist device may incorporate a worm gear 5500 between the drive shaft 5502 and the load 5504. The worm gear drive is configured to prevent back driving or free rotation of the system by ensuring that the worm gear drive is in constant contact with the main drive gear 5506 such that the main drive gear cannot move without a corresponding movement of the worm gear 5500. In some embodiments, a separate worm gear drive motor may be used to control movement of the worm gear.

As described above, it is important to ensure that when a stop command is transmitted by the remote, or other safety sensor within the hoist system, such as hoist device 110, that the hoist is stopped and the load must come to rest as quickly as possible. In some embodiments, a mechanical brake may be used to stop the operation of the hoist device 110. For example, friction brakes, ratcheting brakes (similar to those shown in FIGS. 52A and 52B, above) disc brakes, and the like may be used to brake the hoisting device, such as by preventing operation of a drive shaft of the motor.

Figure 56:
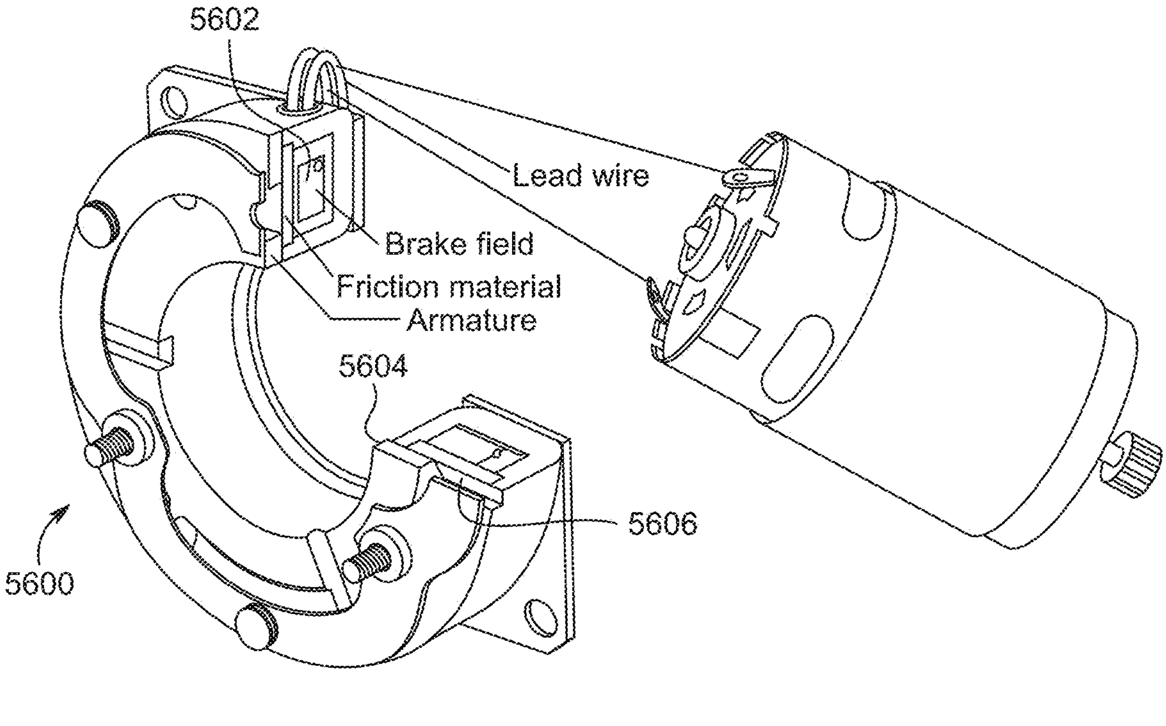
FIG. 56 illustrates an electromechanical brake for a hoist device, according to some embodiments.

As shown in FIG. 56, an electromechanical brake 5600 may be used to stop the movement of the hoist device 110, and bring a load to rest. In one embodiment, the electromechanical brake 5600 may be placed on a drive shaft of a motor, such as drive shaft 5204 described above. The electromechanical brake 5600 may include a brake field area 5602, an armature 5604, and a friction material 5606. Based on the configuration of the electromechanical brake, the friction material 5606 is put into contact with the motor shaft based on a movement of the armature 5604. In one embodiment, when power is applied to the brake field area 5602, the armature 5604 moves in response to magnetic repulsion to put the friction material 5606 in contact with the drive shaft, thereby restricting or preventing the movement of the drive shaft. In some embodiments, the armature 5604 may be biased to place to the friction material 5606 in contact with the drive shaft when no power is applied to the brake field area 5602. Thus, when power is applied to the brake field area 5602, the armature 5604 is moved towards the brake field area 5602 based on magnetic attraction. In one embodiment, the power applied to the motor is routed through the electromagnetic brake 5600 such that if power is lost to the motor, the armature 5604 is released, causing the friction material 5606 to contact the drive shaft to prevent movement of the drive shaft during a loss of power.

In some examples, a braking mechanism, such as those described above, may be controlled via a remote control, such as remote control 2000. In one embodiment, the remote control 2000 may be configured to transmit multiple, redundant braking commands when a braking input is received from a user. The redundant braking commands may then be provided to a controller, such as controller 120 described above, as described above.

Figure 57:
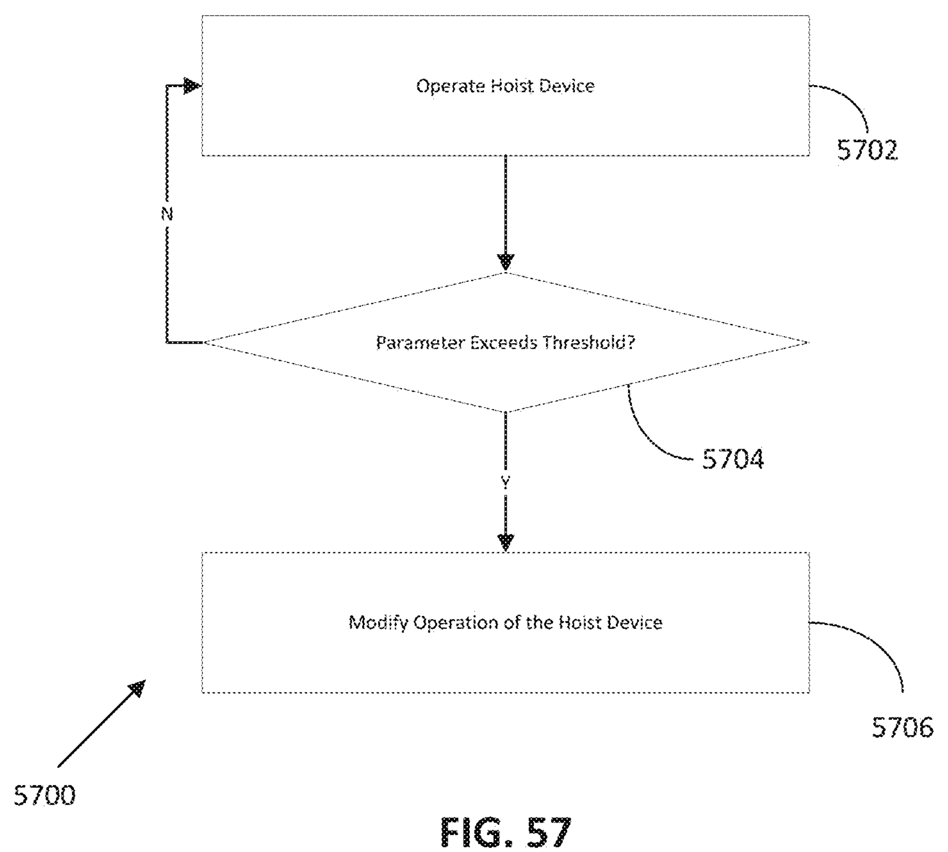
FIG. 57 illustrates a process for modifying the operation of the hoist device, according to some embodiments.

Turning now to FIG. 57, a flowchart illustrating a process 5700 for modifying the operation of a hoist device, such as hoist device 110, when conditions outside of the normal operating conditions are determined is shown, according to some embodiments. At process block 5702 the hoist device 110 is operate in a normal operating mode. At process block 5704 a controller, such as hoist controller 120, determines if one or more operating parameters exceed various thresholds indicating an undesirable operating condition. In one embodiment, the operating parameters may be a force and/or current parameter. The hoist controller 120 may determine whether the force/current parameter experiences a sudden spike or increase in measure load that exceeds a predetermined threshold, thereby indicating a possible increase in load such as if the load has come into contact with another object during a lifting operation. In other examples, the hoist controller 120 determines whether the force/current parameter falls below a minimum threshold, thereby indicating a sudden lightening of the load. In other embodiments, various other operating parameters are evaluated by the hoist controller 120, such as those described above, to determine if the operating parameters exceeds various threshold values.

In response to determining that the measured parameters do not exceed one of the predetermined thresholds, the hoist controller 120 continues to operate the hoist device 110 at process block 5702. In response to determining that the measured parameters do exceed one of the predetermined thresholds, the operation of the hoist device is modified at process block 5706. In one example, where the force/current parameter is determined to exceed a threshold value indicating a sudden increase in load, the hoist controller 120 stops operation of the hoist device 110. In some embodiments, the hoist controller 120 stops the operation of the hoist device for a predetermined time period, such as one minute. However, predetermined time periods of more than one minute or less than one minute are also contemplated. In other embodiments, the hoist controller 120 stops operation of the hoist device until a user override is received by the hoist controller 120. Similarly, the hoist controller 120 may stop operation of the hoist device 110 in response to the force/current parameter being determined to be below a predetermined threshold. In other embodiments, the hoist controller 120 may retract the load a predetermined amount to relieve the load of a potential impact or pinch point. For example, the hoist controller 120 may control the hoist device 110 to retract the load by six inches. However, retraction distances of more than six inches or less than six inches are also contemplated. After the hoist device retracts the load by the predetermined amount, the load controller 120 may again evaluate one or more operational parameters, such as those described above, to determine whether the adverse operational condition has been resolved. If the measured operational parameters still exceed the predetermined thresholds, the hoist controller 120 may instruct the host device 110 to stop.

Figure 58:
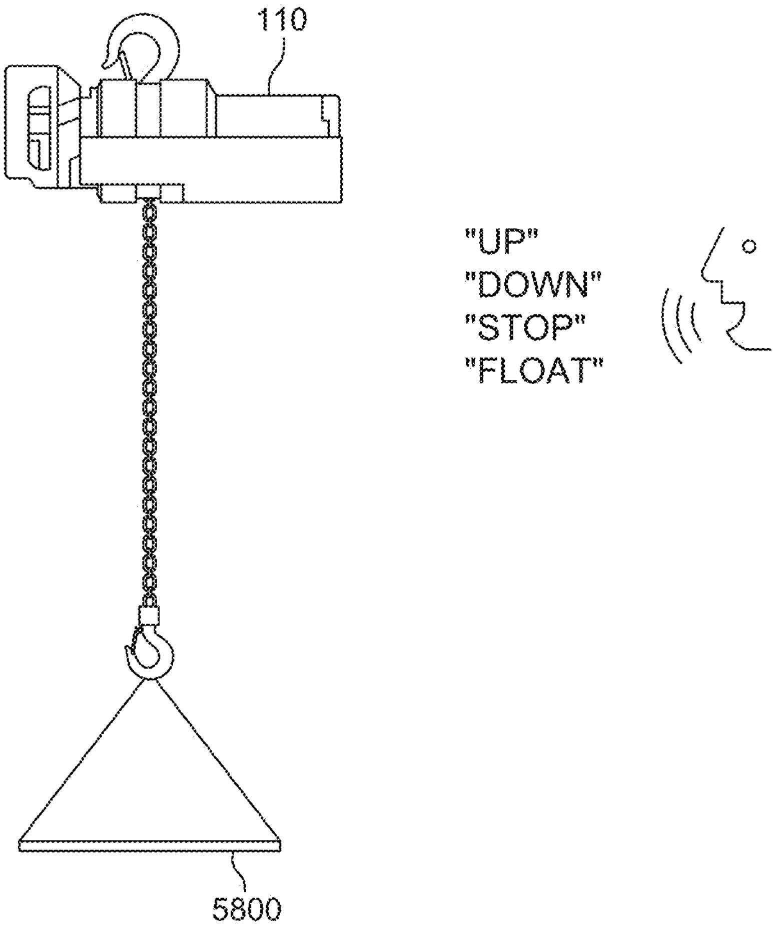
FIG. 58 illustrates a hoist device configured to receive voice commands, according to some embodiments.

Turning now to FIG. 58, a hoist device, such as hoist device 110 is shown attached to a load 5800. The hoist device 110 may be configured to receive one or more voice commands to control an operation of the hoist device 110. In one embodiment, a microphone or audio input on the hoist controller 120 receives the voice command. In other embodiments, the microphone may be coupled to a remote controller, such as remote controller 2000 described above. In still further embodiments, the microphone may be remote from the hoist device, such as a user worn microphone. In other examples, the microphone may be integrated into a user device, such as a smartphone, smartwatch, or other personal electronic device. In one embodiment, the user must repeat the commands within a specified time frame to maintain the current operating mode of the hoist device 110. For example, if a user desires the load to be lifted upwards, the user would issue a voice command such as "UP." To maintain the upward movement, the user is required to re-issue the voice command within a predetermined time period, such as three seconds. However, predetermined time periods of more than three seconds and less than three seconds are also contemplated. In response to the user not issuing a subsequent command within the predetermined time period, the hoist device 110 will stop (e.g. hold the load in the current position). This is the same for all voice commands, other than the "STOP" command, which will maintain its condition (e.g. stopped) until a subsequent command is issued. Example voice commands may include, UP, DOWN, STOP, FLOAT, and the like.

Figure 59:
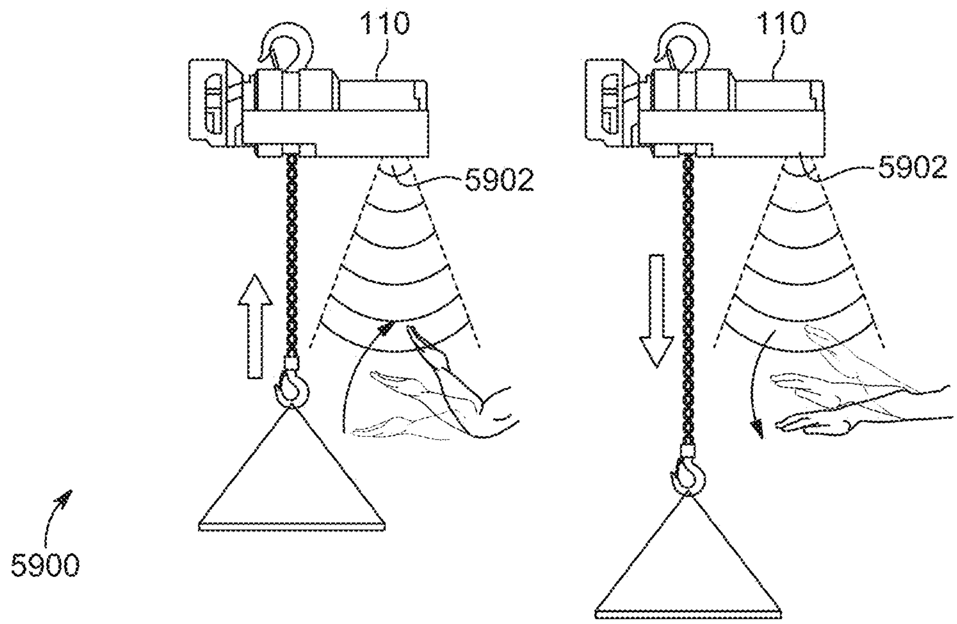
FIG. 59 illustrates a motion activated hoist system, according to some embodiments.

Turning now to FIG. 59, a motion activated hoist system 5900 is shown, according to some embodiments. The motion activated hoist system 5900 includes a hoist device, such as hoist device 110. The hoist device may include one or more sensing devices 5902 for detecting a movement of a user, such as their hand, arm, leg, etc. In one embodiment, the one or more sensing devices may include a time of flight (ToF) sensor, a camera sensor, an IR sensor, or other applicable sensing device. The sensing devices 5902 may be in communication with a controller, such as hoist controller 120, described above. The sensing devices 5902 are configured to interpret motions of a user into hoist commands. For example, as the user may move their hand or arm in an upward direction to provide an "UP" instruction. Similarly, the user may move their hand or arm in a downward direction to provide a "DOWN" instruction. Based on the sensed motion provided by the user and sensed via the sensing devices 5902, the hoist controller 120 is configured to control the operation of the hoist device 110. While UP and DOWN commands are described above, it is contemplated that multiple other gesture commands may be used to control other operations of the hoist.

Figure 60:
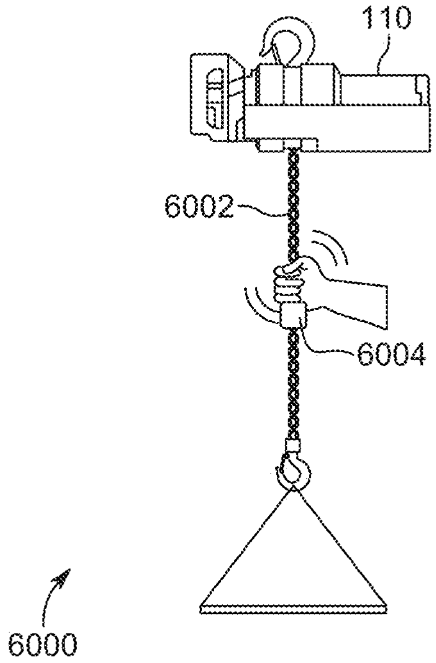
FIG. 60 illustrates a chain controller hoist system, according to some embodiments.

Turning now to FIG. 60, a chain controlled hoist system 6000 is shown, according to some embodiments. The hoist system 6000 may include a hoist device, such as hoist device 110, described above. The hoist system 6000 further includes a load chain 6002 having one or more embedded sensors 6004 for sensing a user touching or moving the load chain 6002. In one example, the embedded sensors 6004 are one or more of capacitive sensors, inductive sensors, and the like. In one embodiment, the embedded sensors 6004 are in communication with a controller, such as hoist controller 120, described above. The sensors may be configured to sense a user manipulating the chain with their hand or other extremity. Manipulating the chain may include jerking, jolting, pushing, pulling, or otherwise moving the chain to indicate that the user wishes the hoist device 110 to stop. This can allow a user to stop the hoist device 110 by moving the chain, in the event that it is not convenient to operate a control on the remote, such as an emergency stop ("E-STOP"). By utilizing an inductive or capacitive sensor, inadvertent movement of the load chain will not by itself cause the hoist device 110 to stop. Rather, the sensors must first determine a human touch via the embedded sensors 6004

Figure 61:
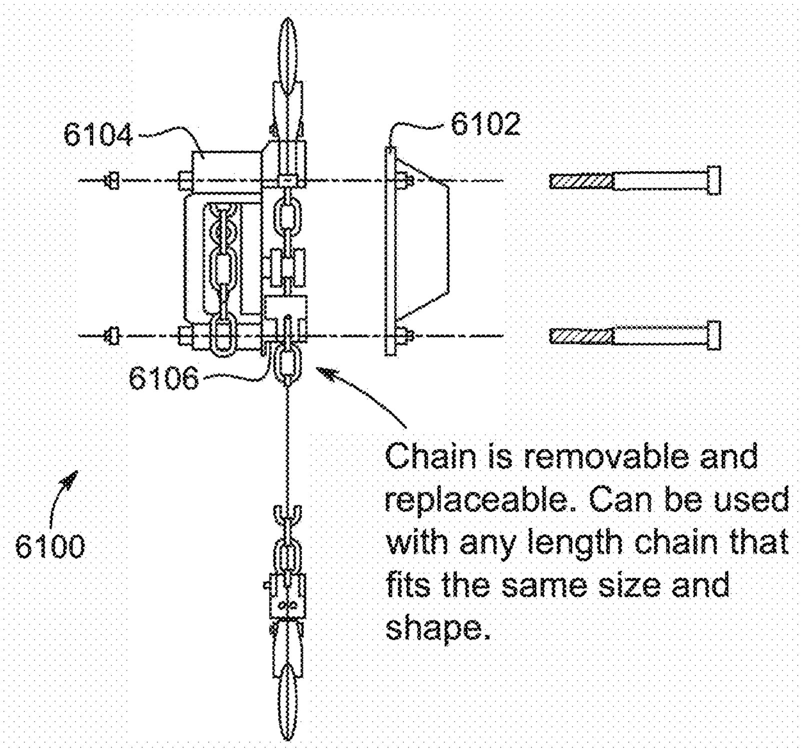
FIG. 61 illustrates a modular hoist device, according to some embodiments.

Turning now to FIG. 61, a modular hoist device 6100 is shown, according to some embodiments. The modular hoist device consists of a drive portion 6102 and a chain portion 6104. The drive portion 6102 may operate similarly to the hoist device 110 described above. The chain portion 6104 may include an interface to couple to the drive portion 6102 to allow the drive portion to control the movement of a chain 6106 within the chain portion 6104. This can allow for user to quickly modify the hoist device 6100 to have different lengths of chain as needed. This can reduce the need to have multiple hoist devices with multiple chain lengths.

Figure 62:
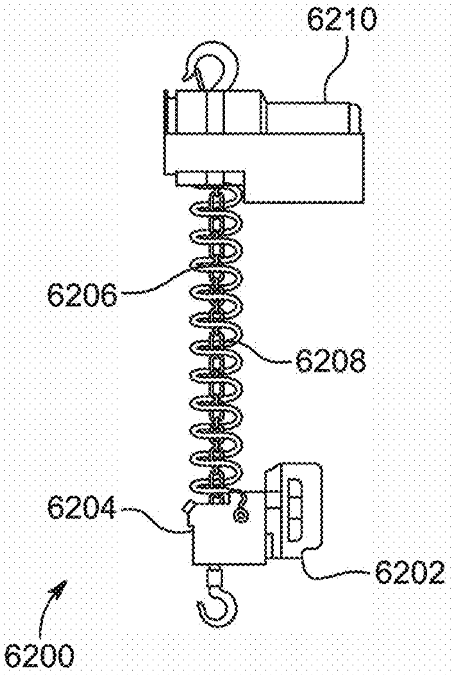
FIG. 62 illustrates a remotely powered hoist system, according to some embodiments.

Turning now to FIG. 62, a remotely powered hoist system 6200 is shown. The remotely powered hoist system 6200 is configured to have the removable power source 6202 (e.g. battery pack) interface with a receptacle 6204 at a load end of the chain 6206. A power cable 6208 may be coupled between the receptacle 6204 and a hoist device 6210. The power cable is configured to provide power from the removable power source 6202 to the host device 6210. By placing the removable power source 6202 at the end of the chain 6206, a user can more easily exchange power sources when needed without having to gain access to the hoist device 6210, which may require ladders, lifts or other equipment to access.

Thus, various embodiments described herein provide for a wireless hoist system. Various features and advantages are set forth in the following claims.

What is claimed is:

1. A wireless hoist system comprising:
a first hoist device including a first motor and a first wireless transceiver;
a second hoist device including a second motor and a second wireless transceiver, wherein the first hoist device and the second hoist device are configured to be coupled to a workpiece to raise or lower the workpiece; and
a controller configured to wirelessly communicate with the first wireless transceiver of the first hoist device and the second wireless transceiver of the second hoist device, the controller configured to:
receive user input,
determine a first operation parameter and a second operation parameter based on the user input, and
provide, wirelessly, a first control signal indicative of the first operation parameter to the first hoist device,
provide, wirelessly, a second control signal indicative of the second operation parameter to the second hoist device, and
receive a level input from a level sensor, the level sensor coupled to the workpiece and configured to indicate an angle of the level with respect to ground;
wherein the first hoist device is configured to operate based on the first control signal and the level input, and
wherein the second hoist device is configured to operate based on the second control signal and the level input.

2. The wireless hoist system of claim 1, wherein the controller is configured to communicate with the first hoist device over a first wireless channel and wherein the controller is configured to communicate with the second hoist device over a second wireless channel.

3. The wireless hoist system of claim 1, wherein the first hoist device further comprises:
a chain connectable to the workpiece to raise and lower the workpiece, the first motor coupled to the chain to release and retract the chain;
a sensor for detecting a chain length of the chain indicative of a length of chain released from the first hoist device; and
a motor drive coupled to the sensor and the motor and configured to:
receive the chain length from the sensor,
receive the first control signal from the controller, and
drive the motor based on the first control signal and the chain length.

4. The wireless hoist system of claim 1, wherein the first operation parameter includes one or more selected from a group consisting of: speed, direction, and chain length.

5. The wireless hoist system of claim 1, wherein the user input is a desired movement of the workpiece.

6. The wireless hoist system of claim 1, wherein the user input includes a position of the first hoist device, a position of the second hoist device, and a desired end position of the workpiece.

7. A wireless hoist system comprising:
a first hoist device having a first motor and a first wireless transceiver;
a second hoist device having a second motor and a second wireless transceiver, wherein the second wireless transceiver is in wireless communication with the first wireless transceiver, and the first hoist device and the second hoist device are configured to be coupled to a workpiece to raise or lower the workpiece, wherein the first hoist device is coupled to the workpiece by a first chain and the second hoist device is coupled to the workpiece by a second chain;
a controller in wireless communication with the first wireless transceiver of the first hoist device, wherein the controller is configured to:
receive user input and determine a first operation parameter based on the user input,
provide, wirelessly, a first control signal to the first hoist device,
provide, wirelessly, a second control signal to the second hoist device, wherein the second control signal is based on the first control signal,
wherein, the first hoist device operates based on the first control signal and the second hoist device operates based on the second control signal, and
wherein the first hoist device further includes:
a sensor for detecting a chain length of the first chain indicative of a length of chain released from the first hoist device; and
a motor drive coupled to the sensor and the first motor and configured to:
receive the detected chain length from the sensor,
receive the first control signal from the controller, and
drive the first motor based on the first control signal and the chain length.

8. The hoist system of claim 7, wherein the first wireless transceiver, the second wireless transceiver, and the controller communicate via an RF communication protocol, wherein the RF communication protocol uses dual identifiers, one broadcast from the controller, and an individual identifier for each of the first wireless transceiver and the second wireless transceiver.

9. A hoist device, comprising:
a power source;
a motor having an output shaft;
a transmission coupled to the output shaft and configured to interface with a chain, wherein the transmission transfers rotational motion of the output shaft of the motor to the chain to one of release or retract the chain; and
a controller configured to:
control an operation of the motor; and
determine a number of lifts remaining in the power source based on one or more parameters of the power source;

wherein the hoist device is configured to one of raise and lower a workpiece coupled to the chain based on a user command signal received at the controller.

10. The hoist device of claim 9, further comprising a limit sensor configured to detect an end of the chain, wherein the limit sensor is further configured to provide an input to the controller to stop the motor in response to detecting the end of the chain.

11. The hoist device of claim 9, further comprising:

a wireless transceiver;

a remote controller in communication with the wireless transceiver.

12. The hoist device of claim 11, wherein the controller is configured to determine a distance between the hoist device and the remote controller using a distance determination protocol, the hoist system configured to:

receive, from the remote controller, a data packet including a sent time message, determine, at the controller, a receive time of the data packet, and determine the distance between the remote controller and the hoist device based on the speed of the transmission and the difference between the receive time and the sent time.

13. The hoist device of claim 12, wherein a first internal clock of the remote controller and a second internal clock of the controller are synchronized.

14. The hoist device of claim 11, wherein the remote controller includes a display device configured to display one or more parameters associated with the hoist device.

15. The hoist device of claim 14, wherein the parameters include one or more of an overload condition, an ability to complete lift condition, a system health, an individual hoist battery charge level, a remote battery charge level, a secured load indication, and a distance between the hoist device and the remote controller.

16. The hoist device of claim 11, wherein the remote controller further comprises an input to provide a variable speed input to the controller for controlling a speed of the motor.

17. The hoist device of claim 9, wherein one or more parameters of the power supply include a current draw during a lifting operation and a voltage drop during the lifting operation.

18. The hoist device of claim 9, wherein the hoist device includes an electro-mechanical brake configured to maintain a position of the workpiece during a lifting operation or a lowering operation.

19. The hoist device of claim 9, wherein the controller is configured to stop operation of the hoist device when a voice command indicating a stop is received by one or more components of the hoist device.

* * * * *